US012677362B2

(12) United States Patent
Miskin et al.

(10) Patent No.: US 12,677,362 B2
(45) Date of Patent: Jul. 7, 2026

(54) HIGH FREQUENCY MULTI-VOLTAGE AND MULTI-BRIGHTNESS LED LIGHTING DEVICES

(71) Applicant: Lynk Labs, Inc., Elgin, IL (US)

(72) Inventors: Michael Miskin, Sleepy Hollow, IL (US); Robert L. Kottritsch, Shefford (GB); James N. Andersen, Elgin, IL (US)

(73) Assignee: Lynk Labs, Inc., Elgin, IL (US)

( * ) Notice: Subject to any disclaimer, the term of this patent is extended or adjusted under 35 U.S.C. 154(b) by 0 days.

(21) Appl. No.: 18/079,618

(22) Filed: Dec. 12, 2022

(65) Prior Publication Data

US 2023/0112968 A1 Apr. 13, 2023

Related U.S. Application Data

(60) Continuation of application No. 17/226,505, filed on Apr. 9, 2021, now Pat. No. 11,528,792, which is a
(Continued)

(51) Int. Cl.
*H05B 45/42* (2020.01)

(52) U.S. Cl.
CPC .................................... *H05B 45/42* (2020.01)

(58) Field of Classification Search
None
See application file for complete search history.

(56) References Cited

U.S. PATENT DOCUMENTS 3,582,932 A 6/1971 Chapman
3,712,706 A 1/1973 Stamm
(Continued)

FOREIGN PATENT DOCUMENTS

AU 2003100206 4/2003
CN 1341966 A 3/2002
(Continued)

OTHER PUBLICATIONS

*Samsung Electronics Co., Ltd.* v. *Lynk Labs, Inc.* U.S. Pat. No. 10,517,149 Petition for Inter Partes Review of U.S. Pat. No. 10,517,149, 98 pages.
(Continued)

*Primary Examiner* — Henry Luong
(74) *Attorney, Agent, or Firm* — K&L Gates LLP

(57) ABSTRACT

A lighting system is disclosed. The example lighting system includes a plurality of LED lighting devices, where at least one of the LED lighting devices includes a same or different colored LED than a LED in at least one of the other LED lighting devices. The lighting system also includes a plurality of data communication circuits, where at least one of the data communication circuits is configured to transmit data signals to or receive data signals from at least one telecommunications device that comprises a circuit configured to detect human touch via capacitive sensing. The at least one data communication circuit is integrated in at least one of the LED lighting devices of the plurality of LED lighting devices. Additionally, the at least one telecommunications device is configured to control a brightness level of at least one of the LED lighting devices via the at least one data communication circuit.

14 Claims, 36 Drawing Sheets

Related U.S. Application Data continuation of application No. 16/460,790, filed on Jul. 2, 2019, now Pat. No. 10,980,092, which is a division of application No. 16/241,897, filed on Jan. 7, 2019, now Pat. No. 10,499,465, which is a continuation of application No. 13/519,487, filed as application No. PCT/US2010/062235 on Dec. 28, 2010, now Pat. No. 10,178,715, which is a continuation-in-part of application No. 12/287,267, filed on Oct. 6, 2008, now Pat. No. 8,179,055.

(60) Provisional application No. 61/335,069, filed on Dec. 31, 2009, provisional application No. 61/284,927, filed on Dec. 28, 2009, provisional application No. 60/997,771, filed on Oct. 6, 2007.

(56) References Cited

U.S. PATENT DOCUMENTS 3,821,662 A 6/1974 Dewinter et al.
3,869,641 A 3/1975 Goldberg
3,981,023 A 9/1976 King et al.
4,104,562 A 8/1978 DiCola
4,145,655 A 3/1979 Caudel et al.
4,170,018 A 10/1979 Runge
4,218,627 A 8/1980 Kiesel
4,246,533 A 1/1981 Chiang
4,271,408 A 6/1981 Teshima et al.
4,298,869 A 11/1981 Okuno
4,350,973 A 9/1982 Petryk, Jr.
4,380,721 A 4/1983 Bullock
4,506,318 A 3/1985 Nilssen
4,530,973 A 7/1985 Koster et al.
4,535,203 A 8/1985 Jenkins et al.
4,563,592 A 1/1986 Yuhasz et al.
4,573,766 A 3/1986 Bournay, Jr. et al.
4,653,895 A 3/1987 Deguchi et al.
4,654,880 A 3/1987 Sontag
4,656,398 A 4/1987 Michael et al.
4,691,341 A 9/1987 Knoble et al.
4,751,398 A 6/1988 Ertz
4,780,621 A 10/1988 Bartleucci et al.
4,797,651 A 1/1989 Havel
4,816,698 A 3/1989 Hook
RE33,285 E 7/1990 Kunen
4,962,347 A 10/1990 Burroughs et al.
5,010,459 A 4/1991 Taylor et al.
5,014,052 A 5/1991 Obeck
5,028,859 A 7/1991 Johnson et al.
5,086,294 A 2/1992 Kasegi
5,180,952 A 1/1993 Nilssen
5,267,134 A 11/1993 Banayan
5,293,494 A 3/1994 Saito et al.
5,309,062 A 5/1994 Perkins et al.
5,324,316 A 6/1994 Schulman et al.
5,353,213 A 10/1994 Paulik et al.
5,408,330 A 4/1995 Squicciarini et al.
5,430,609 A 7/1995 Kikinis
5,442,258 A 8/1995 Shibata
5,457,450 A 10/1995 Deese
5,463,280 A 10/1995 Johnson
5,469,020 A 11/1995 Herrick
5,519,263 A 5/1996 Santana, Jr.
5,521,652 A 5/1996 Shalvi
5,532,641 A 7/1996 Balasubramanian et al.
5,559,681 A 9/1996 Duarte
5,562,240 A 10/1996 Campbell
5,575,459 A 11/1996 Anderson
5,596,567 A 1/1997 DeMuro et al.
5,600,225 A 2/1997 Goto
5,621,225 A 4/1997 Shieh et al.
5,621,913 A 4/1997 Tuttle et al.
5,636,303 A 6/1997 Che et al.
5,640,061 A 6/1997 Bornhorst
5,652,609 A 7/1997 Scholler et al.
5,657,054 A 8/1997 Files et al.
5,661,645 A 8/1997 Hochstein
5,663,719 A 9/1997 Deese et al.
5,675,485 A 10/1997 Seong
5,684,738 A 11/1997 Au et al.
5,699,218 A 12/1997 Kadah
5,728,432 A 3/1998 Imashiro et al.
5,739,639 A 4/1998 Johnson
5,785,418 A 7/1998 Hochstein
5,790,013 A 8/1998 Hauck
5,790,106 A 8/1998 Hirano et al.
5,803,579 A 9/1998 Turnbull et al.
5,806,965 A 9/1998 Deese
5,821,699 A 10/1998 Moisin
5,828,768 A 10/1998 Eatwell et al.
5,847,507 A 12/1998 Butterworth et al.
5,874,803 A 2/1999 Garbuzov et al.
5,923,239 A 7/1999 Krueger et al.
5,936,599 A 8/1999 Reymond
5,946,348 A 8/1999 Mizutani et al.
5,963,012 A 10/1999 Garcia et al.
5,965,907 A 10/1999 Huang et al.
5,973,677 A 10/1999 Gibbons
5,982,103 A 11/1999 Mosebrook et al.
5,998,925 A 12/1999 Shimizu et al.
6,016,038 A 1/2000 Mueller et al.
6,019,493 A 2/2000 Kuo
6,023,073 A 2/2000 Strite
6,028,694 A 2/2000 Schmidt
6,040,663 A 3/2000 Bucks et al.
6,061,259 A 5/2000 DeMichele
6,072,475 A 6/2000 van Ketwich
6,078,148 A 6/2000 Hochstein
6,107,744 A 8/2000 Bavaro et al.
6,113,248 A 9/2000 Mistopoulos et al.
6,118,426 A 9/2000 Albert et al.
6,127,799 A 10/2000 Krishnan
6,157,551 A 12/2000 Barak et al.
6,164,368 A 12/2000 Furukawa et al.
6,183,104 B1 2/2001 Ferrara
6,184,628 B1 2/2001 Ruthenberg
6,227,679 B1 5/2001 Zhang et al.
6,234,648 B1 5/2001 Borner
6,246,169 B1 6/2001 Pruvot
6,265,984 B1 7/2001 Molinaroli
6,292,901 B1 9/2001 Lys et al.
6,300,725 B1 10/2001 Zinkler et al.
6,300,748 B1 10/2001 Miller
6,303,238 B1 10/2001 Thompson et al.
6,307,757 B1 10/2001 Porter et al.
6,319,778 B1 11/2001 Chen et al.
6,323,652 B1 11/2001 Collier et al.
6,324,082 B1 11/2001 Keller
6,329,694 B1 12/2001 Lee et al.
6,353,295 B1 3/2002 Sridhar
6,357,889 B1 3/2002 Duggal et al.
6,361,886 B2 3/2002 Shi et al.
6,362,789 B1 3/2002 Trumbull et al.
6,380,693 B1 4/2002 Kastl
6,396,001 B1 5/2002 Nakamura
6,396,801 B1 5/2002 Upton et al.
6,404,131 B1 6/2002 Kawano et al.
6,411,045 B1 6/2002 Nerone
6,412,971 B1 7/2002 Wojnarowski et al.
6,430,064 B1 8/2002 Tsuchimoto et al.
6,439,731 B1 8/2002 Johnson et al.
6,441,558 B1 8/2002 Muthu et al.
6,456,481 B1 9/2002 Stevenson
6,466,198 B1 10/2002 Feinstein
6,489,724 B1 12/2002 Smith et al.
6,489,754 B2 12/2002 Blom
6,501,100 B1 12/2002 Srivastava et al.
6,507,159 B2 1/2003 Muthu
6,510,995 B2 1/2003 Muthu et al.
6,528,954 B1 3/2003 Lys et al.
6,529,126 B1 3/2003 Henry
6,541,800 B2 4/2003 Thomas et al.
6,541,919 B1 4/2003 Roach et al.
6,548,967 B1 4/2003 Dowling et al.

(56) References Cited

U.S. PATENT DOCUMENTS 6,559,802 B2 5/2003 Goto et al.
6,577,072 B2 6/2003 Saito et al.
6,580,228 B1 * 6/2003 Chen .................. H01L 25/0753 362/240
6,600,243 B1 7/2003 Hara et al.
6,614,103 B1 9/2003 Durocher et al.
6,618,042 B1 9/2003 Powell
6,633,120 B2 10/2003 Salam
6,636,003 B2 10/2003 Rahm et al.
6,636,005 B2 10/2003 Wacyk et al.
6,643,336 B1 11/2003 Hsieh
6,663,246 B2 12/2003 Currens et al.
6,686,697 B2 2/2004 Cho et al.
6,689,626 B2 2/2004 Krijin et al.
6,697,130 B2 2/2004 Weindorf et al.
6,714,348 B2 3/2004 Dunn
6,717,353 B1 4/2004 Mueller et al.
6,722,771 B1 4/2004 Stephens
6,762,562 B2 7/2004 Leong
6,774,582 B1 8/2004 Kwong et al.
6,781,329 B2 8/2004 Mueller et al.
6,781,570 B1 8/2004 Arrigo et al.
6,803,732 B2 10/2004 Kraus et al.
6,814,642 B2 11/2004 Siwinski et al.
6,832,729 B1 12/2004 Perry et al.
6,844,675 B2 1/2005 Yang
6,850,169 B2 2/2005 Manavi et al.
6,856,103 B1 2/2005 Hudson et al.
6,861,658 B2 3/2005 Fise
6,879,319 B2 4/2005 Cok
6,879,497 B2 4/2005 Hua et al.
6,882,128 B1 4/2005 Rahmel et al.
6,891,786 B2 5/2005 Sato
6,907,089 B2 6/2005 Jensen et al.
6,936,936 B2 8/2005 Fischer et al.
6,936,968 B2 8/2005 Cross et al.
6,949,772 B2 9/2005 Shimizu et al.
6,961,190 B1 11/2005 Tamaoki et al.
6,988,053 B2 1/2006 Namaky
7,019,662 B2 3/2006 Shackle
7,038,399 B2 5/2006 Lys et al.
7,038,400 B2 5/2006 Rimmer et al.
7,044,627 B2 5/2006 Mertz et al.
7,053,560 B1 5/2006 Ng
7,061,188 B1 6/2006 Katyl et al.
7,067,992 B2 6/2006 Leong et al.
7,144,131 B2 12/2006 Rains
7,161,590 B2 1/2007 Daniels
7,176,885 B2 2/2007 Troxell et al.
7,180,265 B2 2/2007 Maskali et al.
7,202,613 B2 4/2007 Morgan et al.
7,204,607 B2 4/2007 Yano et al.
7,213,940 B1 5/2007 Van De Ven et al.
7,218,527 B1 5/2007 Jaconsen
7,226,442 B2 6/2007 Sheppard, Jr. et al.
7,226,644 B2 6/2007 Sheppard, Jr. et al.
7,262,559 B2 8/2007 Tripathi et al.
7,264,378 B2 9/2007 Loh
7,271,568 B2 9/2007 Purdy et al.
7,288,902 B1 10/2007 Melanson
7,344,279 B2 3/2008 Mueller et al.
7,348,957 B2 3/2008 Cui et al.
7,350,936 B2 4/2008 Ducharme et al.
7,365,718 B2 4/2008 Tsuchida et al.
7,375,476 B2 5/2008 Scott et al.
7,489,086 B2 2/2009 Miskin et al.
7,521,872 B2 4/2009 Bruning
7,583,901 B2 9/2009 Nakagawa et al.
7,646,029 B2 1/2010 Mueller et al.
7,808,189 B2 10/2010 Hollnberger et al.
7,852,009 B2 12/2010 Coleman et al.
7,859,196 B2 12/2010 Lee et al.
RE42,161 E 2/2011 Hochstein
7,936,132 B2 5/2011 Quek et al.
8,033,686 B2 10/2011 Recker et al.
8,055,310 B2 11/2011 Beart et al.
8,080,819 B2 12/2011 Mueller et al.
8,148,905 B2 4/2012 Miskin et al.
8,179,055 B2 5/2012 Miskin et al.
8,237,581 B2 8/2012 Ries, II
8,272,757 B1 9/2012 Fan et al.
8,314,571 B2 11/2012 Jonsson
8,326,225 B2 12/2012 Oba et al.
8,362,695 B2 1/2013 Aanegola et al.
8,373,363 B2 2/2013 Zdenko
8,400,081 B2 3/2013 Catalano et al.
8,471,495 B2 6/2013 Muguruma et al.
8,531,118 B2 9/2013 Miskin et al.
8,587,205 B2 11/2013 Ter Weeme et al.
8,613,997 B2 12/2013 Day
8,648,539 B2 2/2014 Miskin et al.
8,841,855 B2 9/2014 Miskin
9,198,237 B2 11/2015 Miskin
9,247,597 B2 1/2016 Miskin et al.
9,249,953 B2 2/2016 Miskin
9,516,716 B2 12/2016 Miskin et al.
9,615,420 B2 4/2017 Miskin
9,693,405 B2 6/2017 Miskin
9,750,098 B2 8/2017 Miskin et al.
9,807,827 B2 10/2017 Miskin et al.
10,091,842 B2 10/2018 Miskin et al.
10,154,551 B2 12/2018 Miskin et al.
10,178,715 B2 1/2019 Miskin et al.
10,349,479 B2 7/2019 Miskin et al.
10,492,251 B2 11/2019 Miskin et al.
10,492,252 B2 11/2019 Miskin et al.
10,499,466 B1 12/2019 Miskin et al.
10,506,674 B2 12/2019 Miskin et al.
10,517,149 B2 12/2019 Miskin et al.
10,537,001 B2 1/2020 Miskin et al.
10,575,376 B2 2/2020 Miskin et al.
10,687,400 B2 6/2020 Miskin et al.
10,750,583 B2 8/2020 Miskin et al.
10,757,783 B2 8/2020 Miskin et al.
10,932,341 B2 2/2021 Miskin et al.
10,966,298 B2 3/2021 Miskin et al.
11,019,697 B2 5/2021 Miskin et al.
2001/0005319 A1 6/2001 Ohishi et al.
2001/0054005 A1 12/2001 Hook et al.
2002/0008973 A1 1/2002 Boys et al.
2002/0014630 A1 2/2002 Okazaki et al.
2002/0021573 A1 2/2002 Zhang
2002/0030193 A1 3/2002 Yamazaki et al.
2002/0030194 A1 3/2002 Camras et al.
2002/0030455 A1 3/2002 Ghanem
2002/0047646 A1 4/2002 Lys et al.
2002/0048169 A1 4/2002 Dowling et al.
2002/0048177 A1 4/2002 Rahm et al.
2002/0060526 A1 5/2002 Timmermans et al.
2002/0060530 A1 5/2002 Sembhi et al.
2002/0070914 A1 6/2002 Bruning et al.
2002/0072395 A1 6/2002 Miramontes
2002/0080010 A1 6/2002 Zhang
2002/0081982 A1 6/2002 Schwartz et al.
2002/0086702 A1 7/2002 Lai et al.
2002/0089305 A1 7/2002 Park et al.
2002/0090983 A1 7/2002 Chen
2002/0113244 A1 8/2002 Barnett et al.
2002/0113246 A1 8/2002 Nagai et al.
2002/0114155 A1 8/2002 Katogi
2002/0118557 A1 8/2002 Ohlsson
2002/0130627 A1 9/2002 Morgan
2002/0137258 A1 9/2002 Akram et al.
2002/0145392 A1 10/2002 Hair et al.
2002/0149572 A1 10/2002 Schulz et al.
2002/0158590 A1 10/2002 Saito et al.
2002/0163006 A1 11/2002 Sundar et al.
2002/0167016 A1 11/2002 Hoelen et al.
2002/0175870 A1 11/2002 Gleener
2002/0176259 A1 11/2002 Ducharme
2002/0180344 A1 12/2002 Lichtfuss
2002/0181208 A1 12/2002 Credelle et al.
2002/0181231 A1 12/2002 Luk
2002/0187675 A1 12/2002 McMullin et al.

(56) References Cited

U.S. PATENT DOCUMENTS

2002/0190689 A1 12/2002 Nakamura et al.
2002/0191029 A1 12/2002 Gillespie et al.
2002/0195968 A1 12/2002 Sanford et al.
2003/0001657 A1 1/2003 Worley
2003/0011972 A1 1/2003 Koo
2003/0015968 A1 1/2003 Allen
2003/0020629 A1 1/2003 Swartz et al.
2003/0035075 A1 2/2003 Butler et al.
2003/0038291 A1 2/2003 Cao
2003/0043611 A1 3/2003 Bockle et al.
2003/0057886 A1 3/2003 Lys
2003/0063462 A1 4/2003 Shimuzu et al.
2003/0071259 A1 4/2003 Yoshida
2003/0072145 A1 4/2003 Nolan et al.
2003/0076306 A1 4/2003 Zadesky et al.
2003/0085621 A1 5/2003 Potega
2003/0085870 A1 5/2003 Hinckley
2003/0100837 A1 5/2003 Lys et al.
2003/0102810 A1 6/2003 Cross et al.
2003/0109286 A1 6/2003 Hack et al.
2003/0122502 A1 7/2003 Clauberg et al.
2003/0137258 A1 7/2003 Pipegras et al.
2003/0144034 A1 7/2003 Hack et al.
2003/0146897 A1 8/2003 Hunter
2003/0169014 A1 9/2003 Kadah
2003/0173408 A1 9/2003 Mosher, Jr. et al.
2003/0175004 A1 9/2003 Garito et al.
2003/0179585 A1 9/2003 Lefebvre
2003/0185005 A1 10/2003 Sommers et al.
2003/0219035 A1 11/2003 Schmidt
2003/0230934 A1 12/2003 Cordelli et al.
2003/0231168 A1 12/2003 Bell et al.
2003/0234621 A1 12/2003 Kriparos
2004/0022058 A1 2/2004 Birrell
2004/0041620 A1 3/2004 D'Angelo et al.
2004/0041800 A1 3/2004 Daniels
2004/0070520 A1 4/2004 Sharp
2004/0079953 A1 4/2004 Mednik
2004/0080941 A1 4/2004 Jiang et al.
2004/0105264 A1 6/2004 Spero
2004/0108997 A1 6/2004 Lee
2004/0140771 A1 7/2004 Kim et al.
2004/0150994 A1 8/2004 Kazar et al.
2004/0164948 A1 8/2004 Kabel et al.
2004/0183380 A1 9/2004 Otake
2004/0189218 A1 9/2004 Leong et al.
2004/0196636 A1 10/2004 Kim
2004/0201988 A1 10/2004 Allen
2004/0206970 A1 10/2004 Martin
2004/0207484 A1 10/2004 Forrester et al.
2004/0212321 A1 10/2004 Lys et al.
2004/0218387 A1 11/2004 Gerlach
2004/0256467 A1 12/2004 Clemens et al.
2004/0263084 A1 12/2004 Mor et al.
2004/0264193 A1 12/2004 Okumura
2004/0266349 A1 12/2004 Wang
2005/0001225 A1 1/2005 Yoshimura et al.
2005/0040773 A1 2/2005 Lebens et al.
2005/0078093 A1 4/2005 Peterson, Jr. et al.
2005/0110426 A1 5/2005 Shao
2005/0111234 A1 5/2005 Martin et al.
2005/0116235 A1 6/2005 Schultz et al.
2005/0122062 A1* 6/2005 Hsu ........................ H05B 45/30 315/291
2005/0128751 A1 6/2005 Roberge et al.
2005/0151511 A1 7/2005 Chary
2005/0158590 A1 7/2005 Li
2005/0162096 A1 7/2005 Bertrand
2005/0168156 A1 8/2005 Li et al.
2005/0173990 A1 8/2005 Anderson et al.
2005/0185401 A1 8/2005 Jiang et al.
2005/0218838 A1 10/2005 Lys
2005/0230600 A1 10/2005 Olson et al.
2005/0231133 A1 10/2005 Lys
2005/0276053 A1 12/2005 Nortrup et al.
2006/0017701 A1 1/2006 Marten
2006/0038542 A1 2/2006 Park et al.
2006/0087843 A1 4/2006 Setomoto
2006/0091415 A1 5/2006 Yan
2006/0099994 A1 5/2006 Yang et al.
2006/0103913 A1 5/2006 Handschy et al.
2006/0138971 A1 6/2006 Uang et al.
2006/0158130 A1 7/2006 Furukawa
2006/0163589 A1 7/2006 Fan et al.
2006/0176692 A1 8/2006 Lee et al.
2006/0226795 A1* 10/2006 Walter ................. H05B 45/325 315/312
2007/0024213 A1 2/2007 Shtenyberg et al.
2007/0069663 A1 3/2007 Burdalski et al.
2007/0171145 A1 7/2007 Coleman et al.
2007/0228999 A1 10/2007 Kit
2007/0258231 A1 11/2007 Koerner et al.
2007/0273299 A1 11/2007 Miskin et al.
2007/0290625 A1 12/2007 He
2008/0094005 A1 4/2008 Rabiner et al.
2008/0094837 A1 4/2008 Dobbins et al.
2008/0116816 A1 5/2008 Neuman et al.
2008/0116818 A1 5/2008 Shteynberg et al.
2008/0130288 A1* 6/2008 Catalano ................ H05B 45/10 315/246
2008/0136347 A1 6/2008 Lin et al.
2008/0158915 A1 7/2008 Williams
2008/0198613 A1 8/2008 Cruickshank
2008/0203405 A1 8/2008 Rooymans
2008/0203936 A1 8/2008 Mariyama et al.
2008/0211421 A1* 9/2008 Lee ........................ H05B 45/42 315/250
2008/0218098 A1 9/2008 Lee et al.
2008/0218995 A1 9/2008 Gilkey
2008/0252197 A1 10/2008 Li et al.
2009/0017433 A1 1/2009 Belsky et al.
2009/0079362 A1 3/2009 Shteynberg et al.
2009/0160358 A1 6/2009 Slava
2009/0167202 A1 7/2009 Miskin et al.
2009/0174337 A1 7/2009 Miskin et al.
2009/0221185 A1 9/2009 Verding et al.
2009/0295300 A1 12/2009 King
2010/0039794 A1 2/2010 Ghanem et al.
2010/0109564 A1 5/2010 Shin et al.
2010/0134038 A1 6/2010 Shackle
2010/0141153 A1* 6/2010 Recker ................. H05B 45/357 315/149
2010/0141177 A1 6/2010 George
2010/0163890 A1 7/2010 Miskin
2010/0207536 A1 8/2010 Burdalski et al.
2010/0259183 A1 10/2010 Leshniak
2010/0308738 A1 12/2010 Shteynberg et al.
2011/0115407 A1 5/2011 Wibben et al.
2011/0148327 A1 6/2011 Van de Ven et al.
2011/0193484 A1 8/2011 Harbers et al.
2011/0210670 A1 9/2011 Sauerlander et al.
2011/0234114 A1 9/2011 Miskin et al.
2011/0273098 A1 11/2011 Grajcar
2012/0043897 A1 2/2012 Miskin et al.
2012/0069560 A1 3/2012 Miskin et al.
2012/0081009 A1 4/2012 Shteynberg et al.
2012/0206050 A1 8/2012 Spero
2012/0268008 A1 10/2012 Miskin et al.
2012/0293083 A1 11/2012 Miskin et al.
2013/0051001 A1 2/2013 Miskin
2014/0153232 A1 6/2014 Miskin et al.
2014/0239809 A1 8/2014 Miskin
2014/0268739 A1* 9/2014 Veres ...................... F21K 9/232 362/249.06
2014/0301073 A1 10/2014 Miskin
2014/0301074 A1 10/2014 Miskin
2014/0361697 A1 12/2014 Miskin et al.
2016/0095180 A1 3/2016 Miskin
2016/0143097 A1 5/2016 Miskin
2016/0188426 A1 6/2016 Kousha
2016/0366746 A1* 12/2016 van de Ven ............... F21K 9/60
2017/0105256 A1 4/2017 Miskin
2017/0188426 A1 6/2017 Miskin et al.
2017/0208656 A1 7/2017 Miskin et al.

(56) References Cited

U.S. PATENT DOCUMENTS

| | | | |
|---|---|---|---|
| 2017/0273154 | A1 | 9/2017 | Miskin |
| 2017/0295616 | A1 | 10/2017 | Miskin |
| 2017/0354005 | A1 | 12/2017 | Miskin et al. |
| 2019/0045593 | A1 | 2/2019 | Miskin et al. |
| 2019/0182919 | A1 | 6/2019 | Miskin et al. |
| 2019/0268982 | A1 | 8/2019 | Miskin et al. |
| 2019/0306940 | A1 | 10/2019 | Miskin et al. |
| 2019/0313491 | A1 | 10/2019 | Miskin et al. |
| 2019/0350053 | A1 | 11/2019 | Miskin et al. |

FOREIGN PATENT DOCUMENTS

| | | | | | |
|---|---|---|---|---|---|
| CN | 108167668 | A | * | 6/2018 | ............... F21K 9/20 |
| DE | 4442677 | | | 11/1994 | |
| DE | 19500694 | | | 8/1996 | |
| DE | 10032864 | | | 1/2002 | |
| EP | 0243411 | | | 6/1992 | |
| EP | 0515664 | | | 12/1992 | |
| EP | 0770896 | | | 5/1997 | |
| EP | 0798650 | | | 10/1997 | |
| EP | 0837406 | | | 4/1998 | |
| EP | 0940903 | | | 9/1999 | |
| EP | 1050793 | | | 11/2000 | |
| EP | 1160883 | | | 12/2001 | |
| EP | 1191608 | | | 3/2002 | |
| EP | 1215944 | | | 6/2002 | |
| EP | 1331666 | | | 7/2003 | |
| EP | 1502483 | | | 2/2005 | |
| EP | 1953825 | | | 8/2008 | |
| EP | 1953825 | B1 | | 7/2013 | |
| GB | 2202414 | | | 9/1988 | |
| GB | 2264555 | | | 9/1993 | |
| GB | 2372609 | | | 8/2002 | |
| IL | 123123 | | | 3/2004 | |
| JP | 07283848 | | | 10/1995 | |
| JP | 08-137429 | | | 5/1996 | |
| JP | 10111333 | | | 4/1998 | |
| JP | 3049746 | | | 6/1998 | |
| JP | 3057488 | | | 8/1998 | |
| JP | 3053498 | | | 10/1998 | |
| JP | 11-016683 | | | 1/1999 | |
| JP | 10164659 | | | 3/1999 | |
| JP | 3067620 | | | 9/1999 | |
| JP | 11-330561 | | | 11/1999 | |
| JP | 3064160 | | | 12/1999 | |
| JP | 2000030877 | | | 1/2000 | |
| JP | 3068444 | | | 5/2000 | |
| JP | 2000174857 | | | 6/2000 | |
| JP | 2000260212 | | | 9/2000 | |
| JP | 2001004753 | A | | 1/2001 | |
| JP | 2001176677 | | | 6/2001 | |
| JP | 2001284065 | | | 12/2001 | |
| JP | 2002208301 | A | | 7/2002 | |
| JP | 2003132708 | | | 5/2003 | |
| JP | 2004039415 | | | 2/2004 | |
| JP | 2004-111104 | | | 4/2004 | |
| JP | 2005-524960 | | | 8/2005 | |
| JP | 2011-040701 | | | 2/2011 | |
| JP | 2011159495 | | | 8/2011 | |
| KR | 20060090014 | A | * | 2/2005 | |
| NO | 2011143510 | | | 11/2011 | |
| WO | WO-88/05213 | | | 7/1988 | |
| WO | WO-96/02970 | | | 2/1996 | |
| WO | 9750168 | | | 12/1997 | |
| WO | 1997050168 | | | 12/1997 | |
| WO | WO-99/14705 | | | 3/1999 | |
| WO | WO-99/20085 | | | 4/1999 | |
| WO | 9922338 | | | 5/1999 | |
| WO | 9939319 | | | 8/1999 | |
| WO | 0101385 | | | 1/2001 | |
| WO | 2001001385 | | | 1/2001 | |
| WO | 0215320 | | | 2/2002 | |
| WO | 0221741 | A1 | | 3/2002 | |
| WO | 2002023956 | | | 3/2002 | |
| WO | WO02/23956 | | | 3/2002 | |
| WO | 0231406 | | | 4/2002 | |
| WO | 02062623 | | | 8/2002 | |
| WO | WO-02/093542 | | | 11/2002 | |
| WO | 03009535 | A1 | | 1/2003 | |
| WO | 03/026358 | | | 3/2003 | |
| WO | 2003019072 | | | 3/2003 | |
| WO | WO-03/027970 | | | 4/2003 | |
| WO | WO-03/103157 | | | 12/2003 | |
| WO | 2004055654 | A2 | | 7/2004 | |
| WO | WO-2005048658 | | | 5/2005 | |
| WO | 2005084080 | | | 9/2005 | |
| WO | 2006023149 | | | 3/2006 | |
| WO | WO-2008124701 | | | 10/2008 | |
| WO | 2010016002 | | | 2/2010 | |
| WO | 2010035155 | | | 4/2010 | |
| WO | 2010103480 | | | 9/2010 | |
| WO | WO-2010/106375 | | | 9/2010 | |
| WO | 2010126601 | | | 11/2010 | |
| WO | 20101266011 | | | 11/2010 | |
| WO | 2010138211 | | | 12/2010 | |
| WO | 20100138211 | | | 12/2010 | |
| WO | 2011082168 | | | 7/2011 | |
| WO | 2011143510 | | | 11/2011 | |
| WO | 20110143510 | | | 11/2011 | |
| WO | 2013026053 | | | 2/2013 | |
| WO | 2013082609 | | | 6/2013 | |
| WO | WO-2016164928 | | | 10/2016 | |

OTHER PUBLICATIONS

*Samsung Electronics Co., Ltd.* v. *Lynk Labs, Inc.* U.S. Pat. No. 10,517,149 Power of Attorney for Petitioner Samsung Electronics Co., Ltd. 3 pages.

*Samsung Electronics Co., Ltd. et al.* v. *Lynk Labs, Inc.* Case IPR2022-00098, U.S. Pat. No. 10,4517,149 Notice of Filing Date Accorded to Petition, mailed Nov. 23, 2021, 6 pages.

*Samsung Electronics Co., Ltd.* v. *Lynk Labs, Inc.* Case: IPR2022-00098, U.S. Pat. No. 10,517,149 Patent Owner's Mandatory Notices Pursuant to 37 C.F.R. Section 42.8, 5 pages.

*Samsung Electronics Co., Ltd.* v. *Lynk Labs, Inc.*, U.S. Pat. No. 10,517,149 Declaration of R. Jacob Baker, Ph.D., P.E. In Support of Petition for Inter Partes Review of U.S. Pat. No. 10,517,149, 179 pages—Ex. 1002.

R. Jacob (Jake) Baker, Ph.D., P.E. CV, 37 pages—Ex. 1003.

File History of U.S. Pat. No. 10,517,149, 359 pages—Ex. 1004.

Watson Mastering Electronics, Third Edition, pp. 1-151—Ex. 1018.

PCT File History US/2010/62235, filed Dec. 28, 2010—Ex. 1039.

PCT File History US/2010/001597, filed May 28, 2010—Ex. 1043.

PCT File History US/2010/001269, filed Apr. 30, 2010—Ex. 1044.

U.S. Appl. No. 61/333,963 filed May 12, 2010—Ex. 1046.

U.S. Appl. No. 61/284,927, filed Dec. 28, 2009—Ex. 1047.

U.S. Appl. No. 60/335,963, filed Dec. 31, 2009—Ex. 1048.

U.S. Appl. No. 60/997,771, filed Oct. 6, 2007—Ex. 1049.

U.S. Appl. No. 60/547,653, filed Feb. 25, 2004—Ex. 1050.

U.S. Appl. No. 60/559,867, filed Feb. 25, 2004—Ex. 1051.

U.S. Appl. No. 61/217,215, filed May 28, 2009—Ex. 1052.

U.S. Appl. No. 61/215,144, filed May 1, 2009—Ex. 1053.

Civil Docket for Case# 6:21-cv-02665, Northern District of Illinois, Samsung Electronics. Co., Ltd., filed May 17, 2021, 14 pages—Ex. 1061.

US District Court for the Northern District of Illinois, Estimated Patent Case Schedule, 2 pages—Ex. 1062.

*Samsung Electronics Co., Ltd. and Samsung Electronics America, Inc.*, v. *Lynk Labs, Inc.*, Case No. 1:21-cv-02665—Defendant Lynk Labs, Inc.'s Amended Preliminary Infringement Contentions, Aug. 31, 2021 9 pages—Ex. 1066.

Sedra/Smith, "Microelectronic Circuits," Fourth Edition, Part 1 of 4, pp. 1-161—Ex. 1041, Ex. 1061, Ex. 1054.

Sedra/Smith, "Microelectronic Circuits," Fourth Edition, Part 2 of 4, pp. 162-1048 pages—Ex. 1041, Ex. 1061, Ex. 1054.

Sedra/Smith, "Microelectronic Circuits," Fourth Edition, Part 3 of 4, pp. 1049-1230 pages—Ex. 1041, Ex. 1061, Ex. 1054.

Sedra/Smith, "Microelectronic Circuits," Fourth Edition, Part 4 of 4, pp. 1231-1237 pages—Ex. 1041, Ex. 1061, Ex. 1054.

(56) References Cited

OTHER PUBLICATIONS

*Samsung Electronics Co., Ltd. and Samsung Electronics America, Inc.*, v. *Lynk Labs, Inc.*, Case No. 1:21-cv-02665—Defendant Lynk Labs, Inc.'s Amended Preliminary Infringement Contentions, 9 pages—Ex. 1066.
U.S. Pat. No. 10,517,149 ("the '149 Patent") Exemplary Infringement Contention Claim Charts, Appendix A-5 through 1-3—Ex. 1067.
*Samsung Electronics Co., Ltd. et al.* v. *Lynk Labs, Inc.* Case No. 1:21-cv-02665, Notification of Docket Entry Jul. 27, 2021, 1 page—Ex. 1068.
*Samsung Electronics Co., Ltd et al.* v. *Lynk Labs, Inc.* Case No. 1:21-cv-02665, Scheduling Order dated Aug. 19, 2021, 2 pages—Ex. 1069.
Civil Docket for Case# 6:21-cv-00097-ADA, Western District of Texas (Waco)—Lynk Labs, Inc. filed Jan. 29, 2001, 9 pages—Ex. 1074.
*Samsung Electronics Co., Ltd. et al.* v. *Lynk Labs, Inc.* Case No. 1:21-cv-02665, Notification of Docket Entry Oct. 18, 2021, 1 page—Ex. 1070.
*Samsung Electronics Co., Ltd. and Samsung Electronics America, Inc.*, v. *Lynk Labs, Inc.*, Case No. 1:21-cv-02665—Defendant Lynk Labs, Inc's Answer to Plaintiffs Samsung Electronics Co., Ltd. and Samsung Electronics America, Inc.'s First Amended Complaint and Counterclaims, filed Aug. 3, 2021, 67 pages—Ex. 1071.
*Lynk Labs, Inc.*, v. *Home Dept USA, Inc., The Home Depot Inc., and Home Depot Product Authority, LLC*, Case. No. 6:21-cv-00097, Complaint For Patent Infringement dated Jan. 29, 2021, 88 page—Ex. 1072.
*Lynk Labs, Inc.*, v. *Home Dept USA, Inc., The Home Depot Inc., and Home Depot Product Authority, LLC*, Case. No. 6:21-cv-00097-ADA, First Amended Complaint For Patent Infringement dated Mar. 17, 2021, 94 pages—Ex. 1073.
*Samsung Electronics Co., Ltd. and Samsung Electronics America, Inc.*, v. *Lynk Labs, Inc.*, Case No. 1:21-cv-02665—Supplemental Report of Parties' Planning Meeting, filed Oct. 14, 2021, 11 pages—Ex. 1075.
Tim Williams, The Circuit Designer's Companion, First Published 1991, ISBN 0 7506 1142 1, 314 pages—Ex. 1094.
Petition for Inter Partes Review, *Home Depot USA, Inc.*, Petitioner, v. *Lynk Labs, Inc.*, Patent Owner, Case IPR2021-001368 U.S. Pat. No. 10,757,783, Issue Date Aug. 25, 2020, Title: "Color Temperature Controlled and Low THD LED Lighting Devices and Driving the Same," 95 pages dated Aug. 18, 2021.
Petitioners' Power of Attorney, *Home Depot USA, Inc.*, Petitioner, v. *Lynk Labs, Inc.*, Patent Owner, Case PR2021-001368 U.S. Pat. No. 10,757,783, Issue Date Aug. 25, 2020, Title: "Color Temperature Controlled and Low THD LED Lighting Devices and Driving the Same," 2 pages dated Aug. 17, 2021.
Declaration of Dr. Lebby U.S. Pat. No. 10,757,783 dated Aug. 18, 2021, 187 pages—Ex 1002.
U.S. Appl. No. 16/440,884, filed Jun. 13, 2019, 341 pages—Ex 1003.
Institute of Transportation Engineers, Publication No. ST-017B 300/IG/102, ISBN 0-935403-16-7 (1998), 25 pages—Ex 1007.
Complaint for Patent Infringement *Lynk Labs, Inc.* v. *Home Depot USA Inc., The Home Depot Inc., and Home Depot Product Authority, LLC*, Case No. 6:21-cv-00097, filed Jan. 29, 2021, 86 pages—Ex. 1010.
U.S. Appl. No. 61/630,025, filed Dec. 2, 2011, 39 pages—Ex 1012.
U.S. Appl. No. 61/570,200, filed Dec. 13, 2011, 51 pages—Ex 1013.
Plaintiff Lynk Labs, Inc.'s Amended Preliminary Infringement Contentions, Case No. 6:21-cv-00097-ADA, dated Jun. 23, 2021, 7 pages—Ex 1019.
Okon et al., "The First Practical LED", 14 pages—Ex 1020.
Scheduling Order, Case No. 6:21-cv-00097-ADA filed Aug. 13, 2021, 4 pages—Ex 1021.
U.S. Appl. No. 61/233,829, filed Aug. 14, 2009, 36 pages—Ex 1022.
*Samsung Electronics Co., Ltd.* v. *Lynk Labs, Inc.* U.S. Pat. No. 10,687,400, Declaration of R. Jacob Baker Ph.D., P.E. In Support of Petition for Inter Partes Review of U.S. Pat. No. 10,687,400 dated Nov. 5, 2021—177 pages Ex. 1002.
Baker CV—37 pages Ex. 1003.
File History of U.S. Pat. No. 10,687,400 Parts 1-4 1181 pages Ex. 1004.
Watson Mastering Electronics, Third Edition, pp. 1-151—Ex. 1030, Ex. 1012, Ex. 1018, Ex. 1031.
Sedra/Smith, "Microelectronic Circuits," Fourth Edition, Parts 1-4, 515 pages Ex. 1034, Ex. 1041, Ex. 1061, Ex. 1054.
Chamber Dictionary of Science and Technology, General Editor Professor Peter MB Walker, CBE, FRSE, Chambers Harrap Published Ltd. 1999 ISBN 0 550 14110 3, 4 pages Ex. 1047, Ex. 1024.
McGraw-Hill Dictionary of Scientific and Technical Terms, Sixth Edition, Library of Congress Cataloging in Publication Data , ISBN 0-07-042313-X, p. 4 Ex. 1048, Ex. 1018.
U.S. Appl. No. 61/333,963, filed May 12, 2010 Ex. 1063.
U.S. Appl. No. 61/284,927, filed Dec. 28, 2009 Ex. 1064.
U.S. Appl. No. 61/335,069, filed Dec. 31, 2009 Ex. 1065.
U.S. Appl. No. 60/997,771, filed Oct. 6, 2007 Ex. 1066.
U.S. Appl. No. 60/547,653, filed Mar. 2, 2004 Ex. 1067.
U.S. Appl. No. 60/559,867, filed Apr. 8, 2004 Ex. 1068.
U.S. Appl. No. 61/217,215, filed May 28, 2009 Ex. 1069.
U.S. Appl. No. 61/215,144, filed May 1, 2009 Ex. 1070.
Docket from *Samsung Electronics Co., Ltd. et al* v. *Lynk Labs, Inc.* No. 1:21-cv-02665 printed Nov. 5, 2021—14 pages Ex. 1076.
Estimated Patent Case Schedule in Northern District of Illinois—2 pages Ex. 1079, Ex. 1062.
"Defendant Lynk Labs, Inc.'s Preliminary Infringement Contentions" from *Samsung Electronics Co. Ltd. et al* v. *Lynk Labs, Inc.*, Case No. 1:21-cv-02665 filed Jul. 21, 2021—9 pages Ex. 1080.
U.S. Pat. No. 10,687,400 ("the '400 Patent") Exemplary Infringement Chart ACOM Round (US) as Appendix K-1-9 pages Exs. 1081, 1084.
"Defendant Lynk Labs, Inc.'s Answer to Plaintiffs Samsung Electronics Co., Ltd. and Samsung Electronics America, Inc.'s First Amended Complaint and Counterclaims" from *Samsung Electronics Co. Ltd. et al* v. *Lynk Labs, Inc.*, Case No. 1:21-cv-02665 filed Aug. 3, 2021—67 pages Ex. 1082, Ex. 1071.
"Defendant Lynk Labs, Inc.'s Amended Preliminary Infringement Contentions" from *Samsung Electronics Co. Ltd. et al* v. *Lynk Labs, Inc.*, Case No. 1:21-cv-02665 filed Aug. 31, 2021—9 pages Ex. 1083, Ex. 1066.
"Notification of Docket Entry" from *Samsung Electronics Co. Ltd. et al* v. *Lynk Labs, Inc.*, Case No. 1:21-cv-02665 filed Jul. 27, 2021—1 page Ex. 1085, Ex. 1068.
"Order" from *Samsung Electronics Co. Ltd. et al* v. *Lynk Labs, Inc.*, Case No. 1:21-cv-02665, filed Aug. 19, 2021—2 pages Ex. 1086.
"Supplemental Report of Parties' Planning Meeting" from *Samsung Electronics Co. Ltd. et al* v. *Lynk Labs, Inc.*, Case No. 1:21-cv-02665, filed Oct. 14, 2021—11 pages Ex. 1087, Ex. 1075, Ex. 1080.
"Defendant Lynk Labs, Inc.'s Supplement to Second Amended Preliminary Infringement Contentions ('551 Patent and 979 Patent)" from *Samsung Electronics Co. Ltd. et al* v. *Lynk Labs, Inc.*, Case No. 1:21-cv-02665, filed Sep. 22, 2021—20 pages Ex. 1072.
"Order" from *Samsung Electronics Co. Ltd. et al* v. *Lynk Labs, Inc.*, Case No. 1:21-cv-02665, filed Oct. 18, 2021—1 page Ex. 1088.
Tim Williams, The Circuit Designer's Companion, First Published 1991, ISBN 0 7506 1142 1, 314 pages—Ex. 1089, Ex. 1094.
*Samsung Electronics Co., Ltd.* v. *Lynk Labs, Inc.* U.S. Pat. No. 10,687,400, Petition for Inter Partes Review of U.S. Pat. No. 10,687,400 dated Nov. 12, 2021—96 pages.
*Samsung Electronics Co., Ltd.* v. *Lynk Labs, Inc.* U.S. Pat. No. 10,687,400, Power of Attorney for Petitioner Samsung Electronics Co., Ltd. dated Oct. 8, 2021—3 pages.
*Samsung Electronics Co., Ltd.* v. *Lynk Labs, Inc.* U.S. Pat. No. 10,687,400, Petitioner's Notice Regarding Multiple Petitions dated Nov. 12, 2021—9 pages.
*Samsung Electronics Co., Ltd.* v. *Lynk Labs, Inc.* U.S. Pat. No. 10,687,400, Patent Owner's Mandatory Notices Pursuant to 37 C.F.R. § 42.8 dated Nov. 19, 2021—5 pages.

(56) References Cited

OTHER PUBLICATIONS

*Samsung Electronics Co., Ltd.* v. *Lynk Labs, Inc.* Patent Owner—U.S. Pat. No. 10,154,551 Petition for Inter Partes Review of U.S. Pat. No. 10,154,551—90 pages.
*Samsung Electronics Co., Ltd.* v. *Lynk Labs, Inc.* Patent Owner—U.S. Pat. No. 10,154,551 Power of Attorney for Petitioner Samsung Electronics, Co., Ltd. U.S. Pat. No. 10,154,551—3 pages.
*Samsung Electronics Co., Ltd.* v. *Lynk Labs, Inc.* Patent Owner—U.S. Pat. No. 10,652,979 Petition for Inter Partes Review of U.S. Pat. No. 10,652,979—84 pages.
*Samsung Electronics Co., Ltd.* v. *Lynk Labs, Inc.* Patent Owner—U.S. Pat. No. 10,652,979 Power of Attorney for Petitioner Samsung Electronics, Co., Ltd. U.S. Pat. No. 10,652,979—3 pages.
*Samsung Electronics Co., Ltd.* v. *Lynk Labs, Inc.* Patent Owner—U.S. Pat. No. 10,154,551 Declaration of R. Jacob Baker, PH.D., P.E. In support of Petition For Inter Partes Review of U.S. Pat. No. 10,154,551—175 pages—Ex. 1002.
R. Jacob (Jake) Baker, Ph.D., P.E. CV—36 pages, Patents '252, '298, '466, '551, '674, '697, '979—Ex-1003.
File History US 10154551 U.S. Appl. No. 15/797,806 dated Oct. 30, 2017—Ex. 1004.
Williams, Tim, "The Circuit Designer's Companion," 2021, 314 pages—(Parts 1 and 2), '551 Ex. 1013.
Chambers, Dictionary of Science and Technology, published Chambers Harrap Publishers Ltd 1999, 8 pages, '551—Ex. 1024.
*Samsung Electronics Co. Ltd. and Samsung Electronics America, Inc.* v. *Lynk Labs, Inc.* Defendant Lynk Labs, Inc.'s Supplement to Second Amended Preliminary Infringement Contentions ('551 Patent and '979 Patent), Case No. 1:21-cv-02665, filed Sep. 22, 2021, 14 pages—Ex. 1072.
*Lynk Labs, Inc.* v. *Samsung Electronics Co. Ltd. and Samsung Electronics America, Inc.* Case No. 6:21-cv-00526 Complaint for Patent Infringement filed May 25, 2021, '551 12 pages—Ex. 1074.
*Lynk Labs, Inc.* v. *Samsung Electronics Co. Ltd. and Samsung Electronics America, Inc.* Case No. 6:21-cv-00526 First Amended Complaint for Patent Infringement filed Jun. 9, 2021, 18 pages—Ex. 1075.
*Samsung Electronics Co. Ltd. and Samsung Electronics America, Inc.* v. *Lynk Labs, Inc.* Samsung Electronics Co., Ltd. and Samsung Electronics America, Inc,'s Second Amended Complaint for Declaratory Judgment of Non Infringement, Case No. 1:21-cv-02665, filed Sep. 8, 2021, 44 pages—Ex. 1076.
*Samsung Electronics Co. Ltd. et al.* v. *Lynk Labs, Inc.* Civil Docket for Case #1:21-cv-02665 dated Sep. 27, 2021 '551 12 pages—Ex. 1077.
*Lynk Labs, Inc.* v. *Samsung Electronics Co. Ltd. et al.* Civil Docket for Case #6:21-cv-00526-ADA dated Sep. 27, 2021 '551 8 pages—Ex. 1078.
*Lynk Labs, Inc.* v. *Samsung Electronics Co. Ltd. et al.* Civil Docket for Case #1:21-cv-05126 dated Sep. 29, 2021 '551 8 pages—Ex. 1079.
*Lynk Labs, Inc.* v. *Samsung Electronics Co. Ltd. et al.* Case No. 6:21-cv-00526-ADS Order Granting Plaintiff Lynk Labs, Inc.'s Stipulation to Transfer '551 2 pages—Ex. 1080.
*Samsung Electronics Co., Ltd.* v. *Lynk Labs, Inc.* Patent Owner—U.S. Pat. No. 10,652,979 Declaration of R. Jacob Baker, PH.D., P.E. In support of Petition For Inter Partes Review of U.S. Pat. No. 10,652,979—174 pages—Ex. 1002.
McGraw-Hill Dictionary of Scientific and Technical Term, Sixth Edition, '979—9 pages—Ex. 1018.
Declaration of R. Jacob Baker. Ph.D., P.E. U.S. Pat. No. 10,154,551, Inter Partes Review of U.S. Pat. No. 10,154,551, 176 pages—Ex 1002.
U.S. Pat. No. 10,091,842 ("8'42 Patent")—Exhibit G-01 Bruning.
U.S. Pat. No. 10,091,842 ("'842 Patent")—Exhibit G-02 Ohishi '319.
U.S. Pat. No. 10,091,842 ("'842 Patent")—Exhibit G-03 Ruxton.
U.S. Pat. No. 10,091,842 ("'842 Patent")—Exhibit G-04 Walding.
U.S. Pat. No. 10,091,842 ("'842 Patent")—Exhibit G-05 Bohn.
U.S. Pat. No. 10,091,842 ("'842 Patent")—Exhibit G-06 Dowling.
U.S. Pat. No. 10,537,001 ("'001 Patent")—Exhibit H-01 Dowling.
U.S. Pat. No. 10,537,001 ("'001 Patent")—Exhibit H-02 Lys '321.
U.S. Pat. No. 10,537,001 ("'001 Patent")—Exhibit H-03 Miskin.
U.S. Pat. No. 10,537,001 ("'001 Patent")—Exhibit H-04 Leong '003.
U.S. Pat. No. 10,537,001 ("'001 Patent")—Exhibit H-05 Konno.
U.S. Pat. No. 10,932,341 ("'341 Patent")—Exhibit I-01 Ohishi '009.
U.S. Pat. No. 10,932,341 ("'341 Patent")—Exhibit I-02 Muthu '558.
U.S. Pat. No. 10,932,341 ("'341 Patent")—Exhibit I-03 Dowling.
U.S. Pat. No. 10,932,341 ("'341 Patent")—Exhibit I-04 Konno.
U.S. Pat. No. 10,932,341 ("'341 Patent")—Exhibit I-05 Leong '003.
U.S. Pat. No. 10,932,341 ("'341 Patent")—Exhibit I-06 Reymond.
"White Light Emitting Diode Development for General Illumination Applications" to James Ibbetson, published on May 1, 2006 ("Ibbetson").
Declaration of Dr. Dean Neikirk U.S. Pat. No. 11,297,705 PGR2023-00016—*Home Depot U.S.A., Inc.* v. *Lynk Labs, Inc.*—Part 1 87 Pages—Ex. 1002.
Declaration of Dr. Dean Neikirk U.S. Pat. No. 11,297,705 PGR2023-00016—*Home Depot U.S.A., Inc.* v. *Lynk Labs, Inc.*—Part 2 89 Pages—Ex. 1002.
IEEE 100 The Authoritative Dictionary of IEEE Standards Terms; Seventh Edition—PGR2023-00016 Home Depot 3 pages—Ex. 1028.
*Home Depot U.S.A., Inc.*, v. *Lynk Labs, Inc.* IPR2021-01370 U.S. Pat. No. 10,349,479 B2 Decision, Final Written Decision Determining All Challenged Claims Unpatentable 35U.S.C. Section 318 (a) entered Jan. 18, 2023.
*Home Depot U.S.A., Inc.*, v. *Lynk Labs, Inc.* U.S. Pat. No. 11,297,705 Filing Date Feb. 22, 2021 Issue Date Apr. 5, 2022—PGR2023-00016, Petition for Post-Grant Review of U.S. Pat. No. 11,297,705 dated Jan. 5, 2023—Part 1.
*Home Depot U.S.A., Inc.*, v. *Lynk Labs, Inc.* U.S. Pat. No. 11,297,705 Filing Date Feb. 22, 2021 Issue Date Apr. 5, 2022—PGR2023-00016, Petition for Post-Grant Review of U.S. Pat. No. 11,297,705 dated Jan. 5, 2023—Part 2.
*Lynk Labs, Inc.*, v. *Home Depot USA, Inc. The Home Dept Inc., and Home Depot Product Authority, LLC*, Case No. 6:21-cv-00097-ADA, Home Depot's Preliminary Invalidity Contentions And Additional Disclosure Pursuant to Scheduling Order dated Aug. 18, 2021—22 pages.
U.S. Pat. No. 10,492,251 ('251 Patent)—Exhibit A-01—Takeo '301.
U.S. Pat. No. 10,492,251 ('251 Patent)—Exhibit A-02—Lynam '623.
U.S. Pat. No. 10,492,251 ('251 Patent)—Exhibit A-03—Filipovsky '319.
U.S. Pat. No. 10,492,251 ('251 Patent)—Exhibit A-04 Deese '719.
U.S. Pat. No. 10,492,251 ('251 Patent)—Exhibit A-05 Okuno.
U.S. Pat. No. 10,492,251 ('251 Patent)—Exhibit A-06—Ohishi '319.
U.S. Pat. No. 10,492,251 ('251 Patent)—Exhibit A-07 Teshima.
U.S. Pat. No. 10,349,479 ("'479 Patent")—Exhibit B-01 Dowling.
U.S. Pat. No. 10,349,479 ("'479 Patent")—B-02 Ter Weeme.
U.S. Pat. No. 10,349,479 ("'479 Patent")—Exhibit B-03 Lin.
U.S. Pat. No. 10,349,479 ("'479 Patent")—Exhibit B-04 Lys '483.
U.S. Pat. No. 10,349,479 ("'479 Patent")—Exhibit B-05 Leong '814.
U.S. Pat. No. 10,349,479 ("'479 Patent")—Exhibit B-06 Calon.
U.S. Pat. No. 10,349,479 ("'479 Patent")—Exhibit B-07 Nakagawara.
U.S. Pat. No. 10,757,783 ("'783 Patent")—Exhibit C-01 Grajcar.
U.S. Pat. No. 10,757,783 ("'783 Patent")—Exhibit C-02 Reymond.
U.S. Pat. No. 10,757,783 ("'783 Patent")—Exhibit C-03 Walter.
U.S. Pat. No. 10,757,783 ("'783 Patent")—Exhibit C-04 Lyos '901.
U.S. Pat. No. 10,757,783 ("'783 Patent")—Exhibit C-05 Hair.
U.S. Pat. No. 10,757,783 ("'783 Patent")—Exhibit C-06 Cho.
U.S. Pat. No. 10,757,783 ("'783 Patent")—Exhibit C-07 Coleman.
U.S. Pat. No. 10,757,783 ("'783 Patent")—Exhibit C-08 Shimizu.
U.S. Pat. No. 10,154,551 ("'551 Patent")—Exhibit D-01 Saito.
U.S. Pat. No. 10,154,551 ("'551 Patent")—Exhibit D-02 Hochstein '168.

(56) References Cited

OTHER PUBLICATIONS

U.S. Pat. No. 10,154,551 ("'551 Patent")—Exhibit D-03 Reymond.
U.S. Pat. No. 10,154,551 ("'551 Patent")—Exhibit D-04 Panagotacos.
U.S. Pat. No. 10,154,551 ("'551 Patent")—Exhibit D-05 Liu.
U.S. Pat. No. 10,154,551 ("'551 Patent")—Exhibit D-06 Deese 450.
U.S. Pat. No. 10,154,551 ("'551 Patent")—Exhibit D-07 Lys.
U.S. Pat. No. 10,154,551 ("'551 Patent")—Exhibit D-08 Shimizu.
U.S. Pat. No. 10,517,149 ("'149 Patent")—Exhibit E-01 Takahashi.
U.S. Pat. No. 10,517,149 ("'149 Patent")—Exhibit E-02 Saito '590.
U.S. Pat. No. 10,517,149 ("'149 Patent")—Exhibit E-03 Lys '399.
U.S. Pat. No. 10,517,149 ("'149 Patent")—Exhibit E-04 Catalano '081.
U.S. Pat. No. 10,517,149 ("'149 Patent")—Exhibit E-05 Deese 719.
U.S. Pat. No. 10,652,979 ("'979 Patent")—Exhibit F-01 Coats '555.
U.S. Pat. No. 10,652,979 ("'979 Patent")—Exhibit F-02 Birrell '406.
U.S. Pat. No. 10,652,979 ("'979 Patent")—Exhibit F-03 Muthu '159.
U.S. Pat. No. 10,652,979 ("'979 Patent")—Exhibit F-04 Teshima '408.
U.S. Pat. No. 10,652,979 ("'979 Patent")—Exhibit F-05 Takeo.
U.S. Pat. No. 10,652,979 ("'979 Patent")—Exhibit F-06 Deese '719.
U.S. Appl. No. 60/839,453, filed Aug. 23, 2006, entitled "Lighting Device and Lighting Method" to Van de Ven and Negley, ("453 Provisional").
U.S. Appl. No. 60/793,524, filed Apr. 20, 2006, entitled "Lighting Device and Lighting Method" to Van de Ven and Negley, ("524 Provisional").
U.S. Appl. No. 60/844,325, filed Sep. 13, 2006, entitled "Boost/Flyback Power Supply Topology With Low Side MOSFET Current Control" to Myers ("Myers").
Interim LED Purchase Specifications of the Institute of Transportation Engineers, Jul. 1998 ("1998 Specification").
"Comparison of Control Options in Private Offices in an Advanced Lighting Controls Testbed," by Judith D. Jennings et al., and published in Apr. 1999 ("Jennings").
Vehicle Detection Using a Magetic Field Sensor, by Stanely V. Marshall, and published in May 1978 ("Marshall").
U.S. Appl. No. 61/333,963, filed May 12, 2010, 52 pages—IPR2021-01299 Ex 1036; IPR2021-10347 Ex 1055' IPR2021-01346 Ex 1036, IPR2021-01345 Ex 1037; IPR2021-01300 Ex 1036.
U.S. Appl. No. 61/284,927, filed Dec. 28, 2009, 54 pages—IPR2021-01299 Ex 1037; IPR2021-10347 Ex 1056; IPR2021-01346 Ex 1037, IPR2021-01345 Ex 1037; IPR2021-01300 Ex 1037.
U.S. Appl. No. 61/335,069, filed Dec. 31, 2009, 65 pages—IPR2021-01299 Ex 1038; IPR2021-10347 Ex 1057; IPR2021-01346 Ex 1038, IPR2021-01345 Ex 1038, IPR2021-01300 Ex 1038.
U.S. Appl. No. 60/997,771, filed Oct. 6, 2007, 26 pages—IPR2021-01299 Ex 1039; IPR2021-10347 Ex 1058; IPR2021-01346 Ex 1039, IPR2021-01345 Ex 1039; IPR2021-01300 Ex 1039.
U.S. Appl. No. 60/547,653, filed Feb. 25, 2004, 84 pages—IPR2021-01299 Ex 1040; IPR2021-10347 Ex 1059; IPR2021-01346 Ex 1040, IPR2021-01345 Ex 1040; IPR2021-01300 Ex 1040.
U.S. Appl. No. 60/559,867, filed Feb. 25, 2004, 90 pages—IPR2021-01299 Ex 1041; IPR2021-10347 Ex 1060; IPR2021-01346 Ex 1041, IPR2021-01345 Ex 1041; IPR2021-01300 Ex 1041.
U.S. Appl. No. 61/217,215, filed May 28, 2008, 47 pages—IPR2021-01299 Ex 1042; IPR2021-10347 Ex 1061; IPR2021-01346 Ex 1042, IPR2021-01345 Ex 1042; IPR2021-01300 Ex 1042.
U.S. Appl. No. 61/215,144, filed May 1, 2009, 11 pages—IPR2021-01299 Ex 1043; IPR2021-10347 Ex 1062; IPR2021-01346 Ex 1043, IPR2021-01345 Ex 1043; IPR2021-01300 Ex 1043.
Watson, John, Mastering Electonics, Third Ed., McGraw Hill Inc., published in 1990—IPR2021-01299 Ex 1080; IPR2021-10347 Ex 1026; IPR2021-01346 Ex 1062; IPR2021-01345 Ex 1060; IPR2021-01300 Ex 1006.
Sedra, A., et al., Microelectronic Circuits, Fourth Ed., Oxford University Press, published in 1998—IPR2021-01299 Ex 1081; IPR2021-10347 Ex 1027; IPR2021-01346 Ex 1063; IPR2021-01345 Ex 1061 (4 parts); IPR2021-01300 Ex 1007.
Compaq Comp. Corp et al., Universal Serial Bus Specification Revision 2.0 published in 2000, 650 pages—IPR2021-01299 Ex 1091; IPR2021-10347 Ex 1095; IPR2021-01346 Ex 1069; IPR2021-01345 Ex 1072; IPR2021-01300 Ex 1055.
Declaration of R. Jacob Baker. Ph.D., P.E. U.S. Pat. No. 10,966,298, Inter Partes Review No. IPR2021-01347, 152 pages—Ex 1002.
Gilbisco, Stan, Handbook of Radio & Wireless Technology, published in 1999, 188 pages, McGraw-Hill—IPR2021-10347 Ex 1013.
Petition for Inter Partes Review, *Samsung Electronics Co., Ltd.*, Petitioner, v. *Lynk Labs, Inc.*, Patent Owner, Case IPR2021-01347 U.S. Pat. No. 10,966,298, Issue Date Dec. 3, 2019, Title: "AC Light Emitting Diode and AC LED Drive Methods and Apparatus," 70 pages dated Sep. 7, 2021.
Petition for Inter Partes Review, *Samsung Electronics Co., Ltd.*, Petitioner, v. *Lynk Labs, Inc.*, Patent Owner, Case IPR2021-01346 U.S. Pat. No. 10,499,466, Issue Date Dec. 10, 2019, Title: "AC Light Emitting Diode and AC LED Drive Methods and Apparatus," 70 pages dated Sep. 7, 2021.
Petition for Inter Partes Review, *Samsung Electronics Co., Ltd.*, Petitioner, v. *Lynk Labs, Inc.*, Patent Owner, Case IPR2021-01345 U.S. Pat. No. 10,492,252, Issue Date Nov. 26, 2019, Title: "AC Light Emitting Diode and AC LED Drive Methods and Apparatus," 65 pages dated Sep. 7, 2021.
Petition for Inter Partes Review, *Samsung Electronics Co., Ltd.*, Petitioner, v. *Lynk Labs, Inc.*, Patent Owner, Case IPR2021-01300 U.S. Pat. No. 11,019,697, Issue Date May 25, 2019, Title: "AC Light Emitting Diode and AC LED Drive Methods and Apparatus," 71 pages dated Sep. 7, 2021.
Petition for Inter Partes Review, *Samsung Electronics Co., Ltd.*, Petitioner, v. *Lynk Labs, Inc.*, Patent Owner, Case IPR2021-01299 U.S. Pat. No. 10,506,674, Issue Date Dec. 10, 2019, Title: "AC Light Emitting Diode and AC LED Drive Methods and Apparatus," 70 pages dated Sep. 7, 2021.
Plaintiff's First Amended Complaint for Patent Infringement, Case No. 6:21-cv-00526-ADA, *Lynk Labs, Inc.* v. *Samsung ElectronicsCo., Ltd. and Samsung Electronics America, Inc.* dated Jun. 9, 2021, 18 pages—IPR2021-01346 Ex 1080, IPR2021-01345 Ex 1056; IPR2021-01300 Ex 1086.
Defendant's Preliminary Infringement Contentions, Case No. 1:21-cv-2655, *Samsung Electronics Co., Ltd. and Samsung Electronics America, Inc.* v. *Lynk Labs, Inc.*, dated Jul. 21, 2021, 9 pages—IPR2021-01346 Ex 1081, IPR2021-01345 Ex 1057, IPR2021-01300 Ex 1080.
Defendant's Answer and Counterclaims, Case No. 1:21-cv-2665, *Samsung Electronics Co., Ltd. and Samsung Electronics America, Inc.* v. *Lynk Labs, Inc.*, dated Aug. 3, 2021, 67 pages—IPR2021-01346 Ex 1083, IPR2021-01345 Ex 1077, IPR2021-01300 Ex 1082.
Defendant's Amended Preliminary Infringement Contentions, Case No. 1:21-cv-2665, *Samsung Electronics Co., Ltd. and Samsung Electronics America, Inc.* v. *Lynk Labs, Inc.*, dated Aug. 31, 2021, 9 pages—IPR2021-01346 Ex 1086; IPR2021-01345 Ex 1086; IPR2021-01300 Ex 1087.
Scheduling Order, Case No. 1:21-cv-2665, *Samsung Electronics Co., Ltd. and Samsung Electronics America, Inc.* v. *Lynk Labs, Inc.*, dated Aug. 19, 2021—IPR2021-01346 Ex 1085, IPR2021-01345 Ex 1085, IPR2021-01300 Ex 1084.
Notification of Docket Entry, Case No. 1:21-cv-2665, *Samsung Electronics Co., Ltd. and Samsung Electronics America, Inc.* v. *Lynk Labs, Inc.*, dated Jul. 27, 2021, 1 page—IPR2021-01346 Ex 1084, IPR2021-01345 Ex 1084, IPR2021-01300 Ex 1083.
Declaration of R. Jacob Baker. Ph.D., P.E. U.S. Pat. No. 10,499,466, 187 pages, Inter Partes Review No. IPR2021-01346—Ex 1002.
Declaration of R. Jacob Baker. Ph.D., P.E. U.S. Pat. No. 10,492,252, 148 pages, Inter Partes Review No. IPR2021-01345—Ex 1002.
Declaration of R. Jacob Baker. Ph.D., P.E. U.S. Pat. No. 11,019,697, 261 pages, Inter Partes Review No. IPR2021-01300—Ex 1002.
Declaration of R. Jacob Baker. Ph.D., P.E. U.S. Pat. No. 10,506,674, 172 pages, Inter Partes Review No. IPR2021-01299—Ex 1002.
Declaration of R. Jacob Baker. Ph.D., P.E. U.S. Pat. No. 10,999,298, 152 pages, Inter Partes Review No. IPR2021-01347—Ex 1002.

(56) References Cited

OTHER PUBLICATIONS

Plaintiff's Complaint, Case No. 1:21-cv-2665, *Lynk Labs, Inc.* v. *Samsung Electronics Co., Ltd. and Samsung Electronics America, Inc.*, dated May 25, 2021, 12 pages—IPR2021-01300 Ex 1074.
Plaintiff's First Amended Complaint, Case No. 1:21-cv-2665, *Samsung Electronics Co., Ltd. and Samsung Electronics America, Inc.* v. *Lynk Labs, Inc.*, dated May 25, 2021, 33 pages—IPR2021-01300 Ex 1075.
Plaintiff's Complaint, Case No. 1:21-cv-2665, *Samsung Electronics Co., Ltd. and Samsung Electronics America, Inc.* v. *Lynk Labs, Inc.*, dated May 17, 2021, 30 pages—IPR2021-01300 Ex 1076.
The Microarchitecture of the Pentium 4 Processor by Hinton et al., published in 2001, 13 pages—IPR2021-01300 Ex 1017.
Wireless Medium Access Control (MAC) and Physical Layer (PHY) Specifications for Wireless Personal Area Networks (WPANs) by IEEE Computer Society, 1018 IEEE 812.15.1, published in 2002, 1168 pages—IPR2021-01300 Ex 1018.
*Samsung Electronics Co., Ltd.*, v. *Lynk Labs, Inc.* Patent Owner—Power of Attorney for Petitioner Samsung Electronics Co., Ltd. U.S. Pat. No. 10,492,252, dated Jul. 21, 2021—3 pages.
*Samsung Electronics Co., Ltd.*, v. *Lynk Labs, Inc.*, Case IPR2021-01345 ,U.S. Pat. No. 10,492,252—Notice of Filing Date Accorded to Petition and Time for Filing Patent Owner Preliminary Response filed Sep. 7, 2021—5 pages.
*Samsung Electronics Co., Ltd.*, v. *Lynk Labs, Inc.*, Case IPR2021-01345 , U.S. Pat. No. 10,492,252—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc.* Patent Owner—Power of Attorney for Petitioner Samsung Electronics Co., Ltd. U.S. Pat. No. 10,966,298 dated Jul. 21, 2021—3 pages.
*Samsung Electronics Co., Ltd.*, v. *Lynk Labs, Inc.*, Case IPR2021-01347, U.S. Pat. No. 10,966,298—Notice of Filing Date Accorded to Petition and Time for Filing Patent Owner Preliminary Response filed Sep. 7, 2021—5 pages.
*Samsung Electronics Co., Ltd.*, v. *Lynk Labs, Inc.*, Case IPR2021-01347 , U.S. Pat. No. 10,966,298—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc.* Patent Owner—Power of Attorney for Petitioner Samsung Electronics Co., Ltd. U.S. Pat. No. 10,499,466 dated Jul. 21, 2021—3 pages.
*Samsung Electronics Co., Ltd.*, v. *Lynk Labs, Inc.*, Case IPR2021-01346, U.S. Pat. No. 10,499,466—Notice of Filing Date Accorded to Petition and Time for Filing Patent Owner Preliminary Response filed Sep. 7, 2021—5 pages.
*Samsung Electronics Co., Ltd.*, v. *Lynk Labs, Inc.*, Case IPR2021-01346 , U.S. Pat. No. 10,499,466—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc.* Patent Owner—Power of Attorney for Petitioner Samsung Electronics Co., Ltd. U.S. Pat. No. 11,019,697 dated Jul. 21, 2021—3 pages.
*Samsung Electronics Co., Ltd.*, v. *Lynk Labs, Inc.*, Case IPR2021-01300, U.S. Pat. No. 11,019,697—Notice of Filing Date Accorded to Petition and Time for Filing Patent Owner Preliminary Response filed Sep. 7, 2021—6 pages.
*Samsung Electronics Co., Ltd.*, v. *Lynk Labs, Inc.*, Case IPR2021-01300 , U.S. Pat. No. 11,019,697—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc.*, Case IPR2021-01300 , U.S. Pat. No. 11,019,697—Petitioner's Response to Notice of Filing Date Accorded To Petition and Time for Filing Patent Owner Preliminary Response (Paper No. 3) dated Sep. 20, 2021—3 pages.
*Samsung Electronics Co., Ltd.*, v. *Lynk Labs, Inc.*, Case IPR2021-01300 , U.S. Pat. No. 11,019,697—Notice of Accepting Corrected Petition filed Sep. 20, 2021—2 pages.
*Samsung Electronics Co., Ltd.*, v. *Lynk Labs, Inc.* Patent Owner—Power of Attorney for Petitioner Samsung Electronics Co., Ltd. U.S. Pat. No. 10,506,674 dated Jul. 21, 2021—3 pages.
*Samsung Electronics Co., Ltd.*, v. *Lynk Labs, Inc.*, Case IPR2021-01299, U.S. Pat. No. 10,506,674—Notice of Filing Date Accorded to Petition and Time for Filing Patent Owner Preliminary Response filed Sep. 7, 2021—6 pages.
*Home Depot USA, Inc.*, v. *Lynk Labs, Inc.* Case IPR2021-01540, U.S. Pat. No. 10,091,842—Declaration of Dr. Lebby; Issue Date Oct. 2, 2018—158 pages—Ex. 1002.
U.S. Appl. No. 15/334,029, filed Oct. 25, 2016—646 pages—Ex. 1003.
*Lynk Labs, Inc.* v. *Home Depot USA, Inc., The Home Depot Inc. and Home Depot Product Authority, LLC*, Case No. 6:21-cv-00097-ADA, Complaint for Patent Infringement filed Jan. 29, 2021—88 pages—Ex. 1004.
*Lynk Labs, Inc.* v. *Home Depot USA, Inc., The Home Depot Inc. and Home Depot Product Authority, LLC*, Case No. 6:21-cv-00097-ADA, Scheduling Order filed Aug. 13, 2021—4 pages—Ex. 1006.
Signalized Intersection Safety in Europe, Dec. 2003, Publication No. FHWA-PL-02-020, Office of International Programs; international@fhwa.dot.gov; www.international.fhwa.dot.gov—126 pages—Ex. 1010.
Ohno et al., "Traffic Light Queues with Departure Headway Depending Upon Positions," Kyoto University, J. Operations Research So. of Japan, vol. 17, No. 3, Sep. 1974—pp. 146-169—Ex. 1011.
U.S. Appl. No. 61/333,963, filed May 12, 2010—52 pages—Ex. 1021.
U.S. Appl. No. 61/284,927, filed Dec. 28, 2009—26 pages—Ex. 1022.
U.S. Appl. No. 61/335,069, filed Dec. 31, 2009—36 pages—Ex. 1023.
U.S. Appl. No. 60/997,771, filed Oct. 6, 2007—24 pages—Ex. 1024.
U.S. Appl. No. 60/547,653, filed Feb. 25, 2004—83 pages—Ex. 1025.
U.S. Appl. No. 60/559,867, filed Feb. 25, 2004—89 pages—Ex. 1026.
U.S. Appl. No. 61/217,215, filed May 28, 2009—32 pages—Ex. 1027.
U.S. Appl. No. 61/215,144 filed May 1, 2009—11 pages—Ex. 1028.
E. Fred Schubert, "Light Emitting Diodes," Rensselaer Polytechnic Institute, Cambridge University Press, 2002—327 page—Ex. 1030.
IEEE 100 The Authoritative Dictionary of IEEE Standards Terms, Seventh Edition—4 pages—Ex. 1032.
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 264 pages—Ex. 1005 (excerpts).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 100 pages—Ex. 1012 (Part 1).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 102 pages—Ex. 1012 (Part 2).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 102 pages—Ex. 1012 (Part 3).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 142 pages—Ex. 1012 (Part 4).
*Home Depot USA, Inc.*, v. *Lynk Labs, Inc.*, Case No. IPR2021-01540, U.S. Pat. No. 10,091,842, Petition for Inter Partes Review, Issue Date Oct. 2, 2018—74 pages.
*Home Depot USA, Inc.*, v. *Lynk Labs, Inc.*, Case No. IPR2021-01540, U.S. Pat. No. 10,091,842, Notice of Filing Date Accorded to Petition and Time for Filing Patent Owner Preliminary Response—mailed Oct. 15, 2021—6 pages.

(56) References Cited

OTHER PUBLICATIONS

*Home Depot USA, Inc.*, v. *Lynk Labs, Inc.*, Case No. IPR2021-01540, U.S. Pat. No. 10,091,842, Petitioner's Power of Attorney, Issue Date Oct. 2, 2018—2 pages.
*Home Depot USA, Inc.*, v. *Lynk Labs, Inc.*, Case No. IPR2021-01540, U.S. Pat. No. 10,091,842, Patent Owner's Mandatory Notices Pursuant to 37 C.F.R. Section 42.8 filed Oct. 22, 2021—6 pages.
*Home Depot USA, Inc.*, v. *Lynk Labs, Inc.*, Case No. IPR2021-01541, U.S. Pat. No. 10,537,001, Declaration of Dr. Dena Neikirk, Filing Date Feb. 12, 2019, Issue Date Jan. 14, 2020.
U.S. Appl. No. 16/274,164, filed Feb. 12, 2019—543 pages—Ex. 1003.
*Lynk Labs, Inc.*, v. *Home Depot USA, Inc., The Home Depot Inc., and Home Depot Product Authority, LLC*, Case No. 6:21-cv-00097, Complaint for Patent Infringement Case dated Jan. 29, 2021—88 pages—Ex. 1011.
*Lynk Labs, Inc.*, v. *Home Depot USA, Inc., The Home Depot Inc., and Home Depot Product Authority, LLC*, Case No. 6:21-cv-00097-ADA, Scheduling Order filed Aug. 13, 2021—4 pages—Ex. 1013.
U.S. Appl. No. 61/217,215, filed May 28, 2009—32 pages—Ex. 1014.
U.S. Appl. No. 60/997,771, filed Oct. 6, 2007—24 pages—Ex. 1015.
*Lynk Labs, Inc.*, v. *Home Depot USA, Inc., The Home Depot Inc., and Home Depot Product Authority, LLC*, Case No. 6:21-cv-00097-ADA, Defendants' Opening Claim Construction Brief on the Terms of U.S. Pat. Nos. 10,091,842, 10,154,551, 10,349,479, 10,492,251, 10,517,149, 10,537,001, 10,562,979, 10,757,783, and 10,932,341 filed Oct. 6, 2021—38 pages—Ex. 1019.
Response to Final Office Action U.S. Appl. No. 15/369,218, filed Jun. 13, 2018, 10 pages—Ex. 1020.
Non-Final Office Action U.S. Appl. No. 156/369,218 dated Oct. 2, 2018, 11 pages—Ex. 1021.
Non-Final Office Action U.S. Appl. No. 16/440,884 dated Jul. 23, 2019, 10 pages—Ex. 1023.
U.S. Appl. No. 16/369,218—original claims—Ex. 1024.
Response to Office Action U.S. Appl. No. 16/440,884, 11 pages—Ex. 1026.
*Home Depot USA, Inc.*, v. *Lynk Labs, Inc.*, Case No. IPR2021-01541, Filing Date Feb. 12, 2019, Issue Date Jan. 14, 2020, Petition for Inter Partes Review of U.S. Pat. No. 10,537,001 Under 35 U.S.C. Section 311-319 and 37 C.F.R. Section 42.1-100, et Seq., 82 pages.
*Home Depot USA, Inc.*, v. *Lynk Labs, Inc.*, Case No. IPR2021-01541, U.S. Pat. No. 10,537,001, Petitioner's Power of Attorney, Issue Date Jan. 14, 2020—2 pages.
*Home Depot USA, Inc.*, v. *Lynk Labs, Inc.*, Case No. IPR2021-01541, U.S. Pat. No. 10,537,001, Patent Owner's Mandatory Notices Pursuant to 37 C.F.R. Section 42.8 filed Nov. 10, 2021—6 pages.
U.S. Appl. No. 15/797,806, filed Oct. 30, 2017 inventors Michael Miskin, and James N. Andersen, 59 pages.
Master Thesis of Srinivasa M. Baddela titled "High Frequency AC Operation of LEDs to Resolve the Current Sharing Problem When Connected in Parallel".
M. Rico-Secades, et al., "Driver for high efficiency LED based on flyback stage with current mode control for emergency lighting system," Industry Applications Conference, Oct. 2004.
Patent Owners Preliminary Response under 37 CFR 42.107 for Case IPR2016-01116 for Inter Partes Review of U.S. Pat. No. 8,531,118, 66 pages.
Lynk Labs, Inc.'s Initial Response to Invalidity Contentions, Northern District of Illinois Civil Action No. 15-cv-04833, 88 pages.
Decision on Institution of Inter Partes Review under 37 CFR 42.108 for U.S. Pat. No. 8,531,118, 47 pages.
Office Action, U.S. Appl. No. 16/460,790, mailed Aug. 5, 2019, 17 pages.
Office Action, U.S. Appl. No. 16/460,790, mailed Sep. 26, 2019, 22 pages.
Office Action received in U.S. Appl. No. 16/443,759, mailed Aug. 8, 2019, 7 pages.
Srinivasa M. Baddela and Donald S. Zinger, "Parallel Connected LEDs Operated at High Frequency to Improve Current Sharing," IAS 2004, pp. 1677-1681.
Written Opinion and International Search Report for International App. No. PCT/US2005/006146, 12 pages.
Robert W. Erickson & Dragen Maksimovic, "Fundamentals of Power Electronics" (Kluwer Academic Publishers, 2nd ed.), p. 576.
Petition for Inter Partes Review, *Home Depot USA, Inc.*, Petitioner, v. *Lynk Labs, Inc.*, Patent Owner, Case IPR2021-01369 U.S. Pat. No. 10,492,251, Issue Date Nov. 26, 2019, Title: "AC Light Emitting Diode and AC LED Drive Methods and Apparatus," 53 pages dated Aug. 18, 2021.
Petitioners' Power of Attorney, *Home Depot USA, Inc.*, Petitioner, v. *Lynk Labs, Inc.*, Patent Owner, Case IPR2021-01369 U.S. Pat. No. 10,492,251, Issue Date Nov. 26, 2019, Title: "AC Light Emitting Diode and AC LED Drive Methods and Apparatus," 53 pages dated Aug. 17, 2021.
Declaration of Dr. Lebby U.S. Pat. No. 10,492,251dated Aug. 18, 2021, 134 pages—Ex 1002.
U.S. Appl. No. 16/148,945, filed Oct. 1, 2018—Ex. 1003.
Complaint for Patent Infringement, *Lynk Labs, Inc.* v. *Home Depot USA, Inc., The Home Depot Inc., and Home Depot Product Authority, LLC*, Case No. 6:21-cv-00097 dated Jan. 29, 2021, 88 pages—Ex. 1010.
Plaintiff Lynk Labs, Inc.'s Amended Preliminary Infringement Contentions, *Lynk Labs, Inc.* v. *Home Depot USA, Inc., The Home Depot Inc., and Home Depot Product Authority, LLC*, Case No. 6:21-cv-00097-ADA, dated Jun. 23, 2021, 7 pages—Ex. 1011.
Scheduling Order, *Lynk Labs, Inc.* v. *Home Depot USA, Inc., The Home Depot Inc., and Home Depot Product Authority, LLC*, Case No. 6:21-cv-00097-ADA, filed Aug. 13, 2021, 4 pages—Ex. 1012.
Petition for Inter Partes Review, *Home Depot USA, Inc.*, Petitioner, v. *Lynk Labs, Inc.*, Patent Owner, Case IPR2021-001367 U.S. Pat. No. 10,154,551, Issue Date Dec. 11, 2018, Title: "AC Light Emitting Diode and AC LED Drive Methods and Apparatus," 93 pages dated Aug. 18, 2021.
Petitioners' Power of Attorney, *Home Depot USA, Inc.*, Petitioner, v. *Lynk Labs, Inc.*, Patent Owner, Case IPR2021-001367 U.S. Pat. No. 10,154,551, Issue Date Dec. 11, 2018, Title: "AC Light Emitting Diode and AC LED Drive Methods and Apparatus," 2 pages dated Aug. 17, 2021.
Declaration of Dr. Dean Neikirk—U.S. Pat. No. 10,154,551, Claims 1, 3, 4, 5, 7, 8—141 pages—Ex 1002.
U.S. Appl. No. 15/797,806—Now U.S. Pat. No. 10,154,551—Ex 1003.
U.S. Appl. No. 11/066,414—Now U.S. Pat. No. 7,489,086 issued Feb. 10, 2009—Ex 1005.
IEEE 100, The Authoritative Dictionary of IEEE Standards Terms—Seventh Edition, 3 pages—Ex 1010.
Complaint for Patent Infringement *Lynk Labs, Inc.* Plaintiff v. *Home Depot USA, Inc., The Home Depot Inc., and Home Depot Product Authority, LLC* Defendants, Case No. 6:21-cv-00097, filed Jan. 20, 2021—Ex. 1011.
Azazi et al., "Review of Passive and Active Circuits for Power Factor Correction in Single Phase, Low Power AC-DC Converters," Proceedings of the 14th International Middle East Power Systems Conference (MEPCON'10) Cairo University, Egypt, Dec. 19-21, 2010, Paper ID 154, 8 pages—Ex 1016.
U.S. Appl. No. 60/547,653, filed Feb. 25, 2004—Ex 1017.
U.S. Appl. No. 60/559,867, filed Feb. 25, 2004—Ex 1018.
U.S. Appl. No. 60/997,771, filed Oct. 6, 2007—Ex 1019.
U.S. Appl. No. 61/215,144, filed May 1, 2009—Ex 1022.
U.S. Appl. No. 61/217,215, filed May 28, 2009—Ex 1023.
U.S. Appl. No. 61/284,927, filed Dec. 28, 2009—Ex 1024.
U.S. Appl. No. 61/335,069, filed Dec. 31, 2009—Ex 1025.
U.S. Appl. No. 61/333,963, filed May 12, 2010—Ex 1026.
Plaintiff Lynk Labs, Inc.'s Amended Preliminary Infringement Contentions, Case No. 6:21-cv-00097-ADA filed Jun. 23, 2021, 7 pages—Ex 1034.
U.S. Appl. No. 60/379,079, filed May 9, 2002—Ex 1035.
U.S. Appl. No. 60/391,627, filed Jun. 26, 2002—Ex 1036.

(56) References Cited

OTHER PUBLICATIONS

Institute of Transportation Engineers Publication No. ST-017B, 1997 ISBN: 0-935403-16-7, ITE Specification (183369415.1), Chapter 2 Vehicle Traffic Control Signal Heads, 25 pages—Ex 1038.
Osorno, "Fourier Analysis of a Single-Phase Full Bridge Rectifier Using Matlab," California State University Northridge, 2002-774, 9 pages—Ex 1039.
Scheduling Order *Lynk Labs, Inc.* Plaintiff v. *Home Depot USA, Inc., The Home Depot Inc., and Home Depot Product Authority, LLC* Defendants, Case No. 6:21-cv-00097, filed Aug. 13, 2021—Ex. 1040.
Vachak et al., "Power Factor Correction Circuits: Active Filters," International Journal of Engineering Research and General Science, vol. 2, Issue 5, Aug.-Sep. 2014, ISSAN 2091-2730, 9 pages—Ex 1041.
*Samsung Electronics Co., Ltd.* v. *Lynk Labs, Inc.* U.S. Pat. No. 10,750,583, Petition for Inter Partes Review of U.S. Pat. No. 10,750,583 dated Oct. 28, 2021—79 pages.
*Samsung Electronics Co., Ltd.* v. *Lynk Labs, Inc.* U.S. Pat. No. 10,750,583, Power of Attorney for Petitioner Samsung Electronics Co., Ltd.,—3 pages.
*Samsung Electronics Co., Ltd.* v. *Lynk Labs, Inc.* U.S. Pat. No. 10,750,583, Petitioner's Notice Regarding Multiple Petitions—8 pages.
*Samsung Electronics Co., Ltd.* v. *Lynk Labs, Inc.* Case: IPR2022-00100, U.S. Pat. No. 10,750,583, Patent Owner's Mandatory Notices Pursuant to 37 C.F.R Section 42.8—5 pages.
*Samsung Electronics Co., Ltd.* v. *Lynk Labs, Inc.* U.S. Pat. No. 10,750,583, Declaration of R. Jacob Baker, PH.D., P.E. In Support of Petition for Inter Partes Review of U.S. Pat. No. 10,750,583 Ex. 1002.
U.S. Appl. No. 16/449,273, filed Jun. 21, 2019 Ex. 1004.
Sedra/Smith, "Microelectronic Circuits," Fourth Edition, Parts 1—4, pp. Exs. 1041, 1061, 1054, 1034.
Watson Mastering Electronics, Third Edition, pp. 1-151—Exs. 1012, 1018, 1031.
Tim Williams, The Circuit Designer's Companion, First Published 1991, ISBN 0 7506 1142 1, 314 pages—Ex. 1042, 1094.
Chamber Dictionary of Science and Technology, General Editor Professor Peter MB Walker, CBE, FRSE, Chambers Harrap Published Ltd. 1999 ISBN 0 550 14110 3, 4 pages—Ex. 1047, 1024.
McGraw-Hill Dictionary of Scientific and Technical Terms, Sixth Edition, Library of Congress Cataloging in Publication Data , ISBN 0-07-042313-X, pp. 4—Ex. 1048, 1018.
"Supplemental Report of Parties' Planning Meeting", from *Samsung Electronics Co. Ltd. et al* v. *Lynk Labs, Inc.*, Case No. 1:21-cv-02665, filed Oct. 14, 2021—11 pages Ex. 1075, Ex. 1080.
Docket from *Samsung Electronics Co. Ltd. et al* v. *Lynk Labs, Inc.*, Case No. 1:21-cv-02665 printed Oct. 25, 2021—14 pages Ex. 1076, Ex. 1061.
U.S. Pat. No. 10,750,583 Exemplary Infringement Chart Samsung SmartThings Hub (as Appendix J-2)—11 pages Ex. 1084.
"Order" as scheduling order from *Samsung Electronics Co. Ltd. et al* v. *Lynk Labs, Inc.*, Case No. 1:21-cv-02665, filed Aug. 19, 2021—2 pages Ex. 1086.
"Notification of Docket Entry" from *Samsung Electronics Co. Ltd. et al* v. *Lynk Labs, Inc.*, Case No. 1:21-cv-02665, filed Oct. 18, 2021—1 page Ex. 1087, Ex. 1070.
*Home Depot U.S.A., Inc.* v. *Lynk Labs, Inc.* Case IPR 2022-00023 U.S. Pat. No. 10,517,149, Issue Date Dec. 24, 2019, Declaration of Dr. Lebby dated Oct. 20, 2021, 157 pages—Ex. 1002.
*Lynk Labs, Inc.*, v. *Home Depot USA, Inc., The Home Dept Inc., and Home Depot Product Authority, LLC* Case No. 6:21-cv-00097-ADA Scheduling Order filed Aug. 13, 2021, 4 pages—Ex. 1003.
*Lynk Labs, Inc.*, v. *Home Depot USA, Inc., The Home Dept Inc., and Home Depot Product Authority, LLC* Case No. 6:21-cv-00097 Complaint for Patent Infringement dated Jan. 29, 2021, 88 pages—Ex. 1004.
*Lynk Labs, Inc.* v. *Home Depot USA, Inc., The Home Dept Inc., and Home Depot Product Authority, LLC* Case No. 6:21-cv-00097-ADA Plaintiff Lynk Labs, Inc,'s Amended Preliminary Infringement Contentions '149 Patent dated Jun. 23, 2021, 154 pages—Ex. 1005.
U.S. Appl. No. 16/215,502, filed Dec. 10, 2018, 359 pages—Ex. 1006.
IEEE 100 The Authoritative Dictionary of IEEE Standards Terms, Seventh Edition, Published by Standards Informaiton Network IEEE Press, pp. 1-4—Ex. 1007.
*Lynk Labs, Inc.* v. *Home Depot USA, Inc., The Home Dept Inc., and Home Depot Product Authority, LLC* Case No. 6:21-cv-00097-ADA Defendants' Opening Claim Construction Brief on the Terms of U.S. Pat. Nos. 10,091,842, 10,154,551, 10,349,479, 10,492,251, 10,517,149, 10,537,001, 10,652,979, 10,757,783 and 10,932,341 filed Oct. 6, 2021, 38 pages—Ex. 1015.
U.S. Appl. No. 16/274,164, filed Feb. 12, 2019, 543 pages—Ex. 1016.
Heat Sink, Merriam-Webster; Examples of heat sink in a sentence, http://wwwmerriam-webster.com/dictionary/heat%20sink, 7 pages—Ex. 1017.
Insulator, Britannica Online Encylopedia Full Article, http://www.britannica.com/print/article/289459, 2 pages—Ex. 1018.
*Home Depot USA, Inc.*, v. *Lynk Labs, Inc.* Case IPR2022-00023 U.S. Pat. No. 10,517,149 Issue Date Dec. 24, 2019, Petition for Inter Partes Review dated Oct. 20, 2021, 74 pages.
*Home Depot USA, Inc.*, v. *Lynk Labs, Inc.* Case IPR2022-00023 U.S. Pat. No. 10,517,149 Issue Date Dec. 24, 2019, Petitioner's Power of Attorney dated Oct. 20, 2021, 2 pages.
*Home Depot USA, Inc.*, v. *Lynk Labs, Inc.* Case IPR2022-00023 U.S. Pat. No. 10,517,149 Issue Date Dec. 24, 2019, Patent Owner's Mandatory Notices Pursuant to 37 C.F.R. Section 42.8 dated Nov. 10, 2021, 5 pages.
*Samsung Electronics Co., Ltd.* v. *Lynk Labs, Inc.* U.S. Pat. No. 10,492,251 Petition for Inter Partes Review of U.S. Pat. No. 10,492,251, 95 pages.
*Samsung Electronics Co., Ltd.* v. *Lynk Labs, Inc.* U.S. Pat. No. 10,492,251 Power of Attorney for Petitioner Samsung Electronics Co., Ltd. 3 pages.
*Samsung Electronics Co., Ltd.* v. *Lynk Labs, Inc.* U.S. Pat. No. 10,492,251 Petitioner's Notice Regarding Multiple Petitions, 9 pages.
*Samsung Electronics Co., Ltd.* v. *Lynk Labs, Inc.* Case: IPR2022-00051, U.S. Pat. No. 10,492,251 Patent Owner's Mandatory Notices Pursuant to 37 C.F.R. Section 42.8, 5 pages.
*Samsung Electronics Co., Ltd.* v. *Lynk Labs, Inc.*, U.S. Pat. No. 10,492,251 Declaration of R. Jacob Baker, Ph.D., P.E. In Support of Petition for Inter Partes Review of U.S. Pat. No. 10,492,251, 173 page—Ex. 1002.
U.S. Appl. No. 16/148,945, filed Feb. 15, 2019, 309 pages—Ex. 1004.
U.S. Appl. No. 61/331,225, filed May 4, 2010, 63 pages—Ex. 1010.
Watson Mastering Electronics, Third Edition, pp. 1-151—Ex. 1012 and Ex. 1018.
Stan Gibilisco, Handbook of Radio & Wireless Technology, pp. 1-188—Ex. 1013.
Defendant Lynk Labs, Inc.'s Response to Plaintiffs' Initial Non-Infringement, Unenforceability, and Invalidity Contentions, 51 pages—Ex. 1038.
File History for U.S. Pat. No. 9,198,237 Issued May 18, 2011—Part 2, 321 pages—Ex. 1039.
Tim Williams, The Circuit Designer's Companion, First Published 1991, ISBN 0 7506 1142 1, 314 pages—Ex. 1042, Ex. 1094.
McGraw-Hill Dictionary of Scientific and Technical Terms, Sixth Edition, Library of Congress Cataloging in Publication Data , ISBN 0-07-042313-X, pp. 4—Ex. 1048, Ex. 1018.
PCT File History US/2011/36359, filed May 12, 2011—Ex. 1050.
PCT File History US/2010/62235, filed Dec. 28, 2010—Ex. 1052, Ex. 1039.
U.S. Provisional Application filed May 12, 2010—Ex. 1063.
U.S. Provisional Application filed Dec. 28, 2009—Ex. 1064.
U.S. Provisional Application filed Dec. 31, 2009—Ex. 1065.
U.S. Appl. No. 60/547,653, filed Feb. 25, 2004—Ex. 1067.
U.S. Appl. No. 60/559,867, filed Feb. 25, 2004—Ex. 1068.

(56) References Cited

OTHER PUBLICATIONS

Civil Docket for Case# 6:21-cv-02665, Northern District of Illinois, Samsung Electronics. Co., Ltd., filed May 17, 2021, 14 pages—Ex. 1076, Ex. 1061.
Civil Docket for Case# 6:21-cv-00097-ADA, Western District of Texas (Waco)—Lynk Labs, Inc. filed Jan. 29, 2001, 9 pages—Ex. 1077, Ex. 1074.
US District Court for the Northern District of Illinois, Estimated Patent Case Schedule, 2 pages—Ex. 1079, Ex. 1062.
*Samsung Electronics Co., Ltd. and Samsung Electronics America, Inc.*, v. *Lynk Labs, Inc.*, Case No. 1:21-cv-02665—Supplemental Report of Parties' Planning Meeting, filed Oct. 14, 2021, 11 pages—Ex. 1080, Ex. 1075.
*Samsung Electronics Co., Ltd. and Samsung Electronics America, Inc.*, v. *Lynk Labs, Inc.*, Case No. 1:21-cv-02665—Defendant Lynk Labs, Inc's Answer to Plaintiffs Samsung Electronics Co., Ltd. and Samsung Electronics America, Inc.'s First Amended Complaint and Counterclaims, filed Aug. 3, 2021, 67 pages—Ex. 1082, Ex. 1071.
*Samsung Electronics Co., Ltd. and Samsung Electronics America, Inc.*, v. *Lynk Labs, Inc.*, Case No. 1:21-cv-02665—Defendant Lynk Labs, Inc.'s Amended Preliminary Infringement Contentions, 9 pages—Ex. 1083, Ex. 1066.
U.S. Pat. No. 10,492,251 ("the '251 Patent") Exemplary Infringement Contention Claim Charts, Appendix A-1 through J-1—Ex. 1084.
*Samsung Electronics Co., Ltd. et al.* v. *Lynk Labs, Inc.* Case No. 1:21-cv-02665, Notification of Docket Entry Jul. 27, 2021, 1 page—Ex. 1085, Ex. 1068.
*Samsung Electronics Co., Ltd., and Samsung Electronics America, Inc.* v. *Lynk Labs, Inc.*, No. 21 C 2665, Order dated Aug. 19, 2021—Ex. 1086.
*Samsung Electronics Co., Ltd. et al.* v. *Lynk Labs, Inc.* Case No. 1:21-cv-02665, Notification of Docket Entry Oct. 18, 2021, 1 page—Ex. 1087, Ex. 1070.
*Lynk Labs, Inc.*, v. *Home Dept USA, Inc., The Home Depot Inc., and Home Depot Product Authority, LLC*, Case. No. 6:21-cv-00097, Complaint For Patent Infringement dated Jan. 29, 2021, 88 page—Ex. 1088, Ex. 1072.
*Lynk Labs, Inc.*, v. *Home Dept USA, Inc., The Home Depot Inc., and Home Depot Product Authority, LLC*, Case. No. 6:21-cv-00097-ADA, First Amended Complaint For Patent Infringement dated Mar. 17, 2021, 94 pages—Ex. 1089, Ex. 1073.
*Samsung Electronics Co., Ltd. et al.* v. *Lynk Labs, Inc.* Case IPR2022-00051, U.S. Pat. No. 10,492,251 Notice of Filing Date Accorded to Petition, mailed Dec. 9, 2021, 5 pages.
*Lynk Labs, Inc.* v. *Home Depot USA, Inc. The Home Depot, Inc., and Home Depot Product Authority, LLC*, Case No. 6:21-cv-00097-ADA, Defendants' Corrected Reply Claim Construction Brief on the Terms of U.S. Pat. Nos. 10,091,842, 10,154,551, 10,349,479, 10,492,251, 10,517,149, 10,537,001, 10,652,979, 10,757,783, and 10,932,341 filed Nov. 10, 2021—60 pages.
*Lynk Labs, Inc.* v. *Home Depot USA, Inc. The Home Depot, Inc., and Home Depot Product Authority, LLC*, Case No. 6:21-cv-00097-ADA, Plaintiff Lynk Labs, Inc.'s Responsive Claim Construction Brief filed Oct. 27, 2021, Part 1.
*Lynk Labs, Inc.* v. *Home Depot USA, Inc. The Home Depot, Inc., and Home Depot Product Authority, LLC*, Case No. 6:21-cv-00097-ADA, Plaintiff Lynk Labs, Inc.'s Responsive Claim Construction Brief filed Oct. 27, 2021, Part 2.
Petition for Inter Partes Review, *Home Depot USA, Inc.*, Petitioner, v. *Lynk Labs, Inc.*, Patent Owner, Case IPR2021-01370 U.S. Pat. No. 10,349,479, Issue Date Jul. 9, 2019, Title: "Color Temperature Controlled and Low THD LED Lighting Devices and Systems and Methods of Driving the Same," 52 pages dated Aug. 18, 2021.
Petitioners' Power of Attorney, *Home Depot USA, Inc.*, Petitioner, v. *Lynk Labs, Inc.*, Patent Owner, Case PR2021-01370 U.S. Pat. No. 10,349,479, Issue Date Jul. 9, 2019, Title: "Color Temperature Controlled and Low THD LED Lighting Devices and Systems and Methods of Driving the Same," 2 pages dated Aug. 17, 2021.
Declaration of Dr. Dean Neikirk U.S. Pat. No. 10,349,479, Inter Partes Review No. IPR2021-01370, 98 pages—Ex 1002.
U.S. Appl. No. 15/369,218, filed Dec. 5, 2016, 617 pages—Ex 1003.
U.S. Appl. No. 61/630,025, filed Dec. 2, 2011, 39 pages—Ex 1011.
U.S. Appl. No. 61/570,200, filed Dec. 13, 2011, 51 pages—Ex 1012.
Complaint for Patent Infringement, Case No. 6:21-cv-00097, *Lynk Labs, Inc.* v. *Home Depot USA, Inc., The Home Depot Inc., and Home Depot Product Authority, LLC*, dated Jan. 29, 2021, 88 pages—Ex 1014.
Plaintiff Amended Preliminary Infringement Contentions, Lynk Lab's, Inc.'s, Case No. 6:21-cv-00097-ADA, *Lynk Labs, Inc.* v. *Home Depot USA, Inc., The Home Depot Inc., and Home Depot Product Authority*, LLC, dated Jun. 23, 2021, 7 pages—Ex 1015.
Scheduling Order, Case No. 6:21-cv-00097-ADA, *Lynk Labs, Inc.* v. *Home Depot USA, Inc., The Home Depot Inc., and Home Depot Product Authority, LLC*, filed Aug. 13, 2021, 4 pages—Ex 1016.
*Home Depot U.S.A., Inc.*, v. *Lynk Labs, Inc.*, U.S. Pat. No. 10,932,341, Filing Date: Jan. 10, 2020, Issue Date: Feb. 23, 2021—PGR2022-00009; Declaration of Dr. Dean Neikirk U.S. Pat. No. 10,932,341, 140 pages—Ex. 1002.
*Home Depot U.S.A., Inc.*, v. *Lynk Labs, Inc.*, U.S. Pat. No. 10,932,341, Filing Date: Jan. 10, 2020, Issue Date: Feb. 23, 2021—PGR2022-00009; Petition for Post Grant Review of U.S. Pat. No. 10,932,341, 94 pages.
U.S. Appl. No. 16/740,295, filed Jan. 10, 2020 (Part 1) 768 pages—Ex. 1003.
U.S. Appl. No. 16/740,295, filed Jan. 10, 2020 (Part 2) 466 pages—Ex. 1003.
*Lynk Labs, Inc.*, v. *Home Depot USA, Inc., The Home Depot Inc., and Home Depot Product Authority, LLC*, Case No. 6:21-cv-00097, Complaint for Patent Infringement dated Jan. 29, 2021—Ex. 1011.
*Lynk Labs, Inc.*, v. *Home Depot USA, Inc., The Home Depot Inc., and Home Depot Product Authority, LLC*, Case No. 6:21-cv-00097-ADA, Plaintiff Lynk Labs, Inc.'s Amended Preliminary Infringement Contentions, dated Jun. 23, 2021, 241 pages—Ex. 1012.
*Lynk Labs, Inc.*, v. *Home Depot USA, Inc., The Home Depot Inc., and Home Depot Product Authority, LLC*, Case No. 6:21-cv-00097-ADA, Defendants' Opening Claim Construction Brief on the Terms of U.S. Pat. Nos. 10,091,842, 10,154,551, 10,349,479, 10,492,251, 10,517,149, 10,537,001, 10,652,979, 10, 757,783, and 10,932,341 filed Oct. 6, 2021, 38 pages—Ex. 1021.
*Lynk Labs, Inc.*, v. *Home Depot USA, Inc., The Home Depot Inc., and Home Depot Product Authority, LLC*, Case No. 6:21-cv-00097-ADA, Plaintiff Lynk Labs, Inc.'s Responsive Claim Construction Brief filed Oct. 27, 2021, 47 pages—Ex. 1022.
Application Multi-Voltage and Multi-Brightness LED Lighting Devices And Methods Of Using Same, Remarks filed Jun. 13, 2019 12 pages—Ex. 1023.
U.S. Appl. No. 15/369,218 Non-Final Office Action dated Oct. 2, 2018—Ex. 1024.
Response to Office Action U.S. Appl. No. 16/440,884, filed Aug. 22, 2019, 11 pages—Ex. 1026.
IEEE 100 The Authoritative Dictionary of IEEE Standards Terms Seventh Edition, Published by Standards Information Network IEEE Press, 3 pages—Ex. 1028.
Response to Office Action U.S. Appl. No. 16/440,884, filed Jun. 16, 2020, 8 pages—Ex. 1029.
*Home Depot USA, Inc.*, v. *Lynk Labs, Inc.*, Case PGR2022-00009, U.S. Pat. No. 10,932,341, Patent Owner's Mandatory Notices Pursuant to 37 C.F.R. Section 42.8 dated Nov. 19, 2021, 5 pages.
*Home Depot USA, Inc.*, v. *Lynk Labs, Inc.*, Case PGR2022-00009, U.S. Pat. No. 10,932,341, Issue Date Feb. 23, 2021, Petitioner's Power of Attorney dated Nov. 5, 2021, 2 pages.
*Home Depot U.S.A., Inc.*, v. *Lynk Labs, Inc.*, U.S. Pat. No. 10,932,341, Filing Date: Jan. 10, 2020, Issue Date: Feb. 23, 2021, IPR 2022-00143, Petition for Inter Partes Review of U.S. Pat. No. 10,932,341 dated Nov. 24, 2021, 81 pages.
*Home Depot U.S.A., Inc.*, v. *Lynk Labs, Inc.*, IPR2021-01367 U.S. Pat. No. 10,154,551 B2 Judgment, Final Written Decision Determining All Challenged Claims Unpatentable 35U.S.C. Section 318 (a) entered Feb. 14, 2023—30 pages.
*Home Depot U.S.A., Inc.*, v. *Lynk Labs, Inc.*, IPR2021-01368 U.S. Pat. No. 10,757,783 B2 Decision, Final Written Decision Deter-

(56) References Cited

OTHER PUBLICATIONS mining All Challenged Claims Unpatentable 35U.S.C. Section 318 (a) entered Jan. 27, 2023—36 pages.

*Home Depot U.S.A., Inc.*, v. *Lynk Labs, Inc.*, IPR2021-01369 U.S. Pat. No. 10,492,251 B2 Judgment, Final Written Decision Determining All Challenged Claims Unpatentable 35U.S.C. Section 318 (a) entered Feb. 14, 2023—36 pages.

*Home Depot U.S.A., Inc.*, v. *Lynk Labs, Inc.*, IPR2021-01370 U.S. Pat. No. 10,349,479 B2 Decision, Final Written Decision Determining All Challenged Claims Unpatentable 35 U.S.C. Section 318 (a) entered Jan. 18, 2023, Paper 46—60 pages.

*Samsung Electronics Co., Ltd.*, v. *Lynk Labs, Inc.* IPR2021-01299 U.S. Pat. No. 10,506,674 B2 Decision, Final Written Decision Determining All Challenged Claims Unpatentable 35U.S.C. Section 318 (a) entered Mar. 7, 2023—58 pages.

*Samsung Electronics Co., Ltd.*, Petitioner v. *Lynk Labs, Inc.* Patent Owner IPR 2021-01347, U.S. Pat. No. 10,966,298 B2; Judgment Final Written Decision Determining All Challenged Claims Unpatentable 35 USC Section 318(a) dated Mar. 13, 2023 Paper 27—57 pages.

*Samsung Electronics Co., Ltd.*, Petitioner v. *Lynk Labs, Inc.* Patent Owner IPR 2021-01345, U.S. Pat. No. 10,492,252 B2; Decision Final Written Decision Determining All Challenged Claims Unpatentable 35 USC Section 318(a) dated Mar. 15, 2023 Paper 28—50 pages.

*Samsung Electronics Co., Ltd.*, Petitioner v. *Lynk Labs, Inc.* Patent Owner IPR 2021-01346, U.S. Pat. No. 10,499,466 B1; Decision Final Written Decision Determining All Challenged Claims Unpatentable 35 USC Section 318(a) dated Mar. 15, 2023 Paper 29—64 pages.

*Samsung Electronics Co., Ltd.*, Petitioner v. *Lynk Labs, Inc.* Patent Owner IPR 2021-01576, U.S. Pat. No. 10,652,979 B2; Judgment Final Written Decision Determining All Challenged Claims Unpatentable 35 USC Section 318(a) dated Apr. 19, 2023 Paper 34—57 pages.

*Samsung Electronics Co., Ltd.*, Petitioner v. *Lynk Labs, Inc.* Patent Owner IPR 2021-01300, U.S. Pat. No. 11,019,697 B2; Judgment Final Written Decision Determining All Challenged Claims Unpatentable 35 USC Section 318(a) dated Mar. 13, 2023 Paper 35—54 pages.

*Home Depot USA, Inc.*, Petitioner v. *Lynk Labs, Inc.* Patent Owner IPR 2021-01540, U.S. Pat. No. 10,091,842 B2; Judgment Final Written Decision Determining All Challenged Claims Unpatentable 35 USC Section 318(a) dated Mar. 29, 2023 Paper 46—31 pages.

*Home Depot USA, Inc.*, Petitioner v. *Lynk Labs, Inc.* Patent Owner IPR 2021-01541, U.S. Pat. No. 10,537,001 B2; Judgment Final Written Decision Determining All Challenged Claims Unpatentable 35 USC Section 318(a) dated Apr. 26, 2023 Paper 39—40 pages.

*Home Depot USA, Inc.*, Petitioner v. *Lynk Labs, Inc.* Patent Owner IPR 2022-00023, U.S. Pat. No. 10,517,149 B2; Judgment Final Written Decision Determining Some Challenged Claims Unpatentable 35 USC Section 318(a) dated May 5, 2023 Paper 40—55 pages.

*Samsung Electronics Co., Ltd.*, Petitioner v. *Lynk Labs, Inc.* Patent Owner IPR 2022-00098, U.S. Pat. No. 10,517,149 B2 Judgment Final Written Decision Determining Some Challenged Claims Unpatentable 35 USC Section 318(a) dated May 5, 2023 Paper 29—46 pages.

* cited by examiner

120/240 VAC SINGLE CHIP

2-WAY SINGLE CHIP AC LED FOR 2-WAY LAMP

2-WAY SINGLE CHIP 12V AC LED FOR 2-WAY LAMP

3-WAY SINGLE CHIP AC LED FOR 3-WAY BULB

VOLTAGE SOURCE

VOLTAGE SOURCE

AC VOLTAGE REGULATOR WITH VOLTAGE MEASUREMENT

228

230

HIGH FREQUENCY MULTI-VOLTAGE AND MULTI-BRIGHTNESS LED LIGHTING DEVICES

PRIORITY CLAIM

The present application is a continuation of U.S. patent application Ser. No. 17/226,505, filed Apr. 9, 2021, now U.S. Pat. No. 11,528,792, which is a continuation of U.S. patent application Ser. No. 16/460,790, filed Jul. 2, 2019, now U.S. Pat. No. 10,980,092, which is a divisional of U.S. patent application Ser. No. 16/241,897, filed Jan. 7, 2019, now U.S. Pat. No. 10,499,465, which is a continuation of U.S. patent application Ser. No. 13/519,487, filed Jun. 27, 2012, now U.S. Pat. No. 10,178,715, which is a 35 U.S.C. 371 national phase filing of International Application No. PCT/US2010/062235, filed Dec. 28, 2010, which claims priority to U.S. Provisional Application No. 61/284,927, filed Dec. 28, 2009 and U.S. Provisional Application No. 61/335,069 filed Dec. 31, 2009; and is a continuation-in-part of U.S. patent application Ser. No. 12/287,267, now U.S. Pat. No. 8,179,055, filed Oct. 6, 2008, which claims priority to U.S. Provisional Application No. 60/997,771, filed Oct. 6, 2007.

TECHNICAL FIELD

The present invention generally relates to light emitting diodes ("LEDs") for AC operation. The present invention specifically relates to multiple voltage level, multiple brightness level, and voltage selectable LED devices, packages and lamps, high frequency driven LED circuits and high frequency drivers and drive methods for LEDs.

FEDERALLY SPONSORED RESEARCH OR DEVELOPMENT

None.

BACKGROUND OF THE INVENTION

Field of the Invention

The present invention generally relates to light emitting diodes ("LEDs") for high frequency and selectable voltage, multi-voltage level and/or multi-brightness level operation. The present invention specifically relates to high frequency operation, voltage selectable, multiple voltage level and multiple brightness level light emitting diode circuits, single chips, packages and lamps "devices" for direct AC voltage power source operation or bridge rectified AC voltage power source operation.

Description of the Related Art

LEDs are semiconductor devices that produce light when a current is supplied to them. LEDs are intrinsically DC devices that only pass current in one polarity and historically have been driven by DC voltage sources using resistors, current regulators and voltage regulators to limit the voltage and current delivered to the LED. Some LEDs have resistors built into the LED package providing a higher voltage LED typically driven with 5V DC or 12V DC.

Some standard AC voltages in the world include 12 VAC, 24 VAC, 100 VAC, 110 VAC, 120 VAC, 220 VAC, 230 VAC, 240 VAC and 277 VAC. Therefore, it would be advantageous to have a single chip LED or multi-chip single LED packages and/or devices that could be easily configured to operate at multiple voltage levels and/or multiple brightness levels by simply selecting a voltage and/or current level when packaging the multi-voltage and/or multi-current single chip LEDs or by selecting a specific voltage and/or current level when integrating the LED package onto a printed circuit board or within a finished lighting product. It would also be advantageous to have multi-current LED chips and/or packages for LED lamp applications in order to provide a means of increasing brightness in LED lamps by switching in additional circuits just as additional filaments are switched in for standard incandescent lamps.

U.S. Pat. No. 7,525,248 discloses a chip-scale LED lamp including discrete LEDs capable of being built upon electrically insulative, electrically conductive, or electrically semi conductive substrates. Further, the construction of the LED lamp enables the lamp to be configured for high voltage AC or DC power operation. The LED based solid-state light emitting device or lamp is built upon an electrically insulating layer that has been formed onto a support surface of a substrate. Specifically, the insulating layer may be epitaxially grown onto the substrate, followed by an LED buildup of an n-type semiconductor layer, an optically active layer, and a p-type semiconductor layer, in succession. Isolated mesa structure of individual, discrete LEDs are formed by etching specific portions of the LED buildup down to the insulating layer, thereby forming trenches between adjacent LEDs. Thereafter, the individual LEDs are electrically coupled together through conductive elements or traces being deposited for connecting the n-type layer of one LED and the p-type layer of an adjacent LED, continuing across all of the LEDs to form the solid-state light emitting device. The device may therefore be formed as an integrated AC/DC light emitter with a positive and negative lead for supplied electrical power. For instance, the LED lamp may be configured for powering by high voltage DC power (e.g., 12V, 24V, etc.) or high voltage AC power (e.g., 110/120V, 220/240V, etc.).

U.S. Pat. No. 7,213,942 discloses a single-chip LED device through the use of integrated circuit technology, which can be used for standard high AC voltage (110 volts for North America, and 220 volts for Europe, Asia, etc.) operation. The single-chip AC LED device integrates many smaller LEDs, which are connected in series. The integration is done during the LED fabrication process and the final product is a single-chip device that can be plugged directly into house or building power outlets or directly screwed into incandescent lamp sockets that are powered by standard AC voltages. The series connected smaller LEDs are patterned by photolithography, etching (such as plasma dry etching), and metallization on a single chip. The electrical insulation between small LEDs within a single-chip is achieved by etching light emitting materials into the insulating substrate so that no light emitting material is present between small LEDs. The voltage crossing each one of the small LEDs is about the same as that in a conventional DC operating LED fabricated from the same type of material (e.g., about 3.5 volts for blue LEDs).

Accordingly, single chip LEDs have been limited and have not been integrated circuits beyond being fixed series, fixed parallel or series parallel circuit configurations until the development of AC LEDs. The AC LEDs have still however been single circuit or parallel circuit fixed single voltage designs.

LED packages have historically not been integrated circuits beyond being fixed series, fixed parallel or fixed series parallel LED circuit configurations.

The art is deficient in that it does not provide a multi-voltage and/or multi-current circuit monolithically integrated on a single substrate which would be advantageous.

It would further be advantageous to have a multi-voltage and/or multi-brightness circuit that can provide options in voltage level, brightness level and/or AC or DC powering input power preference.

It would further be advantageous to provide multiple voltage level and/or multiple brightness level light emitting LED circuits, chips, packages and lamps "multi-voltage and/or multi-brightness LED devices" that can easily be electrically configured for at least two forward voltage drive levels with direct AC voltage coupling, bridge rectified AC voltage coupling or constant voltage DC power source coupling. This invention comprises circuits and devices that can be driven with more than one AC or DC forward voltage "multi-voltage" at 6V or greater based on a selectable desired operating voltage level that is achieved by electrically connecting the LED circuits in a series or parallel circuit configuration and/or more than one level of brightness "multi-brightness" based on a switching means that connects and/or disconnects at least one additional LED circuit to and/or from a first LED circuit. The desired operating voltage level and/or the desired brightness level electrical connection may be achieved and/or completed at the LED packaging level when the multi-voltage and/or multi-brightness circuits and/or single chips are integrated into the LED package, or the LED package may have external electrical contacts that match the integrated multi-voltage and/or multi-brightness circuits and/or single chips within, thus allowing the drive voltage level and/or the brightness level select-ability to be passed on through to the exterior of the LED package and allowing the voltage level or brightness level to be selected at the LED package user, or the PCB assembly facility, or the end product manufacturer.

It would further be advantageous to provide at least two integrated circuits having a forward voltage of at least 12 VAC or 12 VDC or greater on a single chip or within a single LED package that provide a means of selecting a forward voltage when packaging a multi-voltage and/or multi-brightness circuit using discrete die (one LED chip at a time) and wire bonding them into a circuit at the packaging level or when packaging one or more multi-voltage and/or multi-brightness level single chips within a LED package.

It would further be advantageous to provide multi-voltage and/or multi-brightness level devices that can provide electrical connection options for either AC or DC voltage operation at preset forward voltage levels of 6V or greater.

It would further be advantageous to provide multi-brightness LED devices that can be switched to different levels of brightness by simply switching additional circuits on or off in addition to a first operating circuit within a single chip and or LED package. This would allow LED lamps to switch to higher brightness levels just like 2-way or 3-way incandescent lamps do today.

The benefits of providing multi-voltage circuits of 6V or greater on a single chip is that an LED packager can use this single chip as a platform to offer more than one LED packaged product with a single chip that addresses multiple voltage levels for various end customer design requirements. This also increase production on a single product for the chip maker and improves inventory control. This also improves buying power and inventory control for the LED packager when using one chip.

It would further be advantageous to have a LED lighting assembly which includes LED circuitry for AC or DC drive and a high frequency AC voltage transformer or inverter that could be used to convert low frequency voltages, like for example mains voltage or some other low voltage at 50/60 Hz, to a high frequency without a change in the voltage provided. For example, it would be advantageous to have a LED lighting power supply and/or driver capable of receiving 120 VAC at 60 Hz and be able to provide a high frequency AC output directly to an AC driven LED circuit(s), or alternatively to a DC driven LED circuit(s) through an AC-to-DC rectifier at a voltage equal to or different from the original input voltage to the power supply and/or driver.

It would be further advantageous to combine multiple-voltage LED chips, packages, circuits, lamps, etc., high frequency AC voltage power supplies and/or transformers to drive LEDs by either directly connecting a high frequency transformer or inverter to an AC driven LED circuit(s), or by operably connecting an AC-to-DC rectifier between the high frequency transformer or inverter and a DC driven LED circuit. With proper design considerations LEDs may be driven more efficiently with direct AC or rectified AC than with constant voltage or constant current DC drive schemes. High frequency AC transformers or inverters can be made smaller and more cost effective than constant current or constant voltage DC drivers or power supplies currently being used to power LEDs. The higher the frequency, the smaller the transformer can be made. With proper design consideration and based on the wattage and the frequency of the AC voltage output of the power supply, a high frequency AC voltage transformer can be made small enough to be mounted directly onto a LED lighting PCB assembly.

The present invention provides for these advantages and solves the deficiencies in the art.

SUMMARY OF THE INVENTION

According to one aspect of the invention at least two single voltage AC LED circuits are formed on a single chip or on a substrate providing a multi-voltage AC LED device for direct AC power operation. Each single voltage AC LED circuit has at least two LEDs connected to each other in opposing parallel relation.

According to another aspect of the invention, each single voltage AC LED circuit is designed to be driven with a predetermined forward voltage of at least 6 VAC and preferably each single voltage AC LED circuit has a matching forward voltage of 6 VAC, 12 VAC, 24 VAC, 1 20 VAC, or other AC voltage levels for each single voltage AC LED circuit.

According to another aspect of the invention, each multi-voltage AC LED device would be able to be driven with at least two different AC forward voltages resulting in a first forward voltage drive level by electrically connecting the two single voltage AC LED circuits in parallel and a second forward voltage drive level by electrically connecting the at least two single voltage level AC LED circuits in series. By way of example, the second forward voltage drive level of the serially connected AC LED circuits would be approximately twice the level of the first forward voltage drive level of the parallel connected AC LED circuits. The at least two parallel connected AC LED circuits would be twice the current of the at least two serially connected AC LED circuits. In either circuit configuration, the brightness would be approximately the same with either forward voltage drive selection of the multi-voltage LED device.

According to another aspect of the invention, at least two single voltage series LED circuits, each of which have at least two serially connected LEDs, are formed on a single chip or on a substrate providing a multi-voltage AC or DC operable LED device.

According to another aspect of the invention, each single voltage series LED circuit is designed to be driven with a predetermined forward voltage of at least 6V AC or DC and preferably each single voltage series LED circuit has a matching forward voltage of 6V, 12V, 24V, 120V, or other AC or DC voltage levels. By way of example, each multi-voltage AC or DC LED device would be able to be driven with at least two different AC or DC forward voltages resulting in a first forward voltage drive level by electrically connecting the two single voltage series LED circuits in parallel and a second forward voltage drive level by electrically connecting the at least two single voltage level series LED circuits in series. The second forward voltage drive level of the serially connected series LED circuits would be approximately twice the level of the first forward voltage drive level of the parallel connected series LED circuits. The at least two parallel connected series LED circuits would be twice the current of the at least two serially connected series LED circuits. In either circuit configuration, the brightness would be approximately the same with either forward voltage drive selection of the multi-voltage series LED device.

According to another aspect of the invention, at least two single voltage AC LED circuits are formed on a single chip or on a substrate providing a multi-voltage and/or multi-brightness AC LED device for direct AC power operation.

According to another aspect of the invention, each single voltage AC LED circuit has at least two LEDs connected to each other in opposing parallel relation. Each single voltage AC LED circuit is designed to be driven with a predetermined forward voltage of at least 6 VAC and preferably each single voltage AC LED circuit has a matching forward voltage of 6 VAC, 12 VAC, 24 VAC, 120 VAC, or other AC voltage levels for each single voltage AC LED circuit. The at least two AC LED circuits within each multi-voltage and/or multi current AC LED device would be able to be driven with at least two different AC forward voltages resulting in a first forward voltage drive level by electrically connecting the two single voltage AC LED circuits in parallel and a second forward voltage drive level by electrically connecting the at least two single voltage level AC LED circuits in series. The second forward voltage drive level of the serially connected AC LED circuits would be approximately twice the level of the first forward voltage drive level of the parallel connected AC LED circuits. The at least two parallel connected AC LED circuits would be twice the current of the at least two serially connected AC LED circuits. In either circuit configuration, the brightness would be approximately the same with either forward voltage drive selection of the multi-voltage LED device.

According to another aspect of the invention at least two single voltage LED circuits are formed on a single chip or on a substrate, and at least one bridge circuit made of LEDs is formed on the same single chip or substrate providing a multi-voltage and/or multi-brightness LED device for direct DC power operation. Each single voltage LED circuit has at least two LEDs connected to each other in series. Each single voltage LED circuit is designed to be driven with a predetermined forward voltage and preferably matching forward voltages for each circuit such as 12 VDC, 24 VDC, 120 VDC, or other DC voltage levels for each single voltage LED circuit. Each multi-voltage and/or multi-brightness LED device would be able to be driven with at least two different DC forward voltages resulting in a first forward voltage drive level when the two single voltage LED circuits are connected in parallel and a second forward voltage drive level that is twice the level of the first forward voltage drive level when the at least two LED circuits are connected in series.

According to another aspect of the invention at least two single voltage LED circuits are formed on a single chip or on a substrate providing a multi-voltage and/or multi-brightness LED device for direct DC power operation. Each single voltage LED circuit has at least two LEDs connected to each other in series. Each single voltage LED circuit is designed to be driven with a predetermined forward voltage and preferably matching forward voltages for each circuit such as 12 VAC, 24 VAC, 120 VAC, or other DC voltage levels for each single voltage LED circuit. Each multi-voltage and/or multi-brightness LED device would be able to be driven with at least two different DC forward voltages resulting in a first forward voltage drive level when the two single voltage LED circuits are connected in parallel and a second forward voltage drive level that is twice the level of the first forward voltage drive level when the at least two LED circuits are connected in series.

According to another aspect of the invention at least two single voltage LED circuits are formed on a single chip or on a substrate, and at least one bridge circuit made of standard diodes, LEDs or some combination thereof is provided separate of the LED circuit or formed on the same single chip or substrate providing a multi-voltage and/or multi-brightness LED device for direct DC power operation. Each single voltage LED circuit has at least two LEDs connected to each other in series. Each single voltage LED circuit is designed to be driven with a predetermined forward voltage and preferably matching forward voltages for each circuit such as 12 VDC, 24 VDC, 120 VDC, or other DC voltage levels for each single voltage LED circuit. Each multi-voltage and/or multi-brightness LED device would be able to be driven with at least two different DC forward voltages resulting in a first forward voltage drive level when the two single voltage LED circuits are connected in parallel and a second forward voltage drive level that is twice the level of the first forward voltage drive level when the at least two LED circuits are connected in series.

According to another aspect of the invention a multi-voltage and/or multi-current AC LED circuit is integrated within a single chip LED. Each multi-voltage and/or multi-current single chip AC LED comprises at least two single voltage AC LED circuits. Each single voltage AC LED circuit has at least two LEDs in anti-parallel configuration to accommodate direct AC voltage operation. Each single voltage AC LED circuit may have may have at least one voltage input electrical contact at each opposing end of the circuit or the at least two single voltage AC LED circuits may be electrically connected together in series on the single chip and have at least one voltage input electrical contact at each opposing end of the two series connected single voltage AC LED circuits and one voltage input electrical contact at the center junction of the at least two single voltage AC LED circuits connected in series. The at least two single voltage AC LED circuits are integrated within a single chip to form a multi-voltage and/or multi-current single chip AC LED.

According to another aspect of the invention, at least one multi-voltage and/or multi-brightness LED devices may be integrated within a LED lamp. The at least two individual LED circuits within the multi-voltage and/or multi-brightness LED device(s) may be wired in a series or parallel circuit configuration by the LED packager during the LED packaging process thus providing for at least two forward voltage drive options, for example 12 VAC and 24 VAC or 120 VAC and 240 VAC that can be selected by the LED packager.

According to another aspect of the invention a multi-voltage and/or multi-current AC LED package is provided, comprising at least one multi-voltage and/or multi-current single chip AC LED integrated within a LED package. The multi-voltage and/or multi-current AC LED package provides matching electrical connectivity pads on the exterior of the LED package to the electrical connectivity pads of the at least one multi-voltage and/or multi-current single chip AC LED integrated within the LED package thus allowing the LED package user to wire the multi-voltage and/or multi-current AC LED package into a series or parallel circuit configuration during the PCB assembly process or final product integration process and further providing a AC LED package with at least two forward voltage drive options.

According to another aspect of the invention multiple individual discrete LED chips are used to form at least one multi-voltage and/or multi-current AC LED circuit within a LED package thus providing a multi-voltage and/or multi current AC LED package. Each multi-voltage and/or multi-current AC LED circuit within the package comprises at least two single voltage AC LED circuits. Each single voltage AC LED circuit has at least two LEDs in anti-parallel configuration to accommodate direct AC voltage operation The LED package provides electrical connectivity pads on the exterior of the LED package that match the electrical connectivity pads of the at least two single voltage AC LED circuits integrated within the multi-voltage and/or multi-current AC LED package thus allowing the LED package to be wired into a series or parallel circuit configuration during the PCB assembly process and further providing a LED package with at least two forward voltage drive options.

According to another aspect of the invention a multi-voltage and/or multi-current single chip AC LED and/or multi-voltage and/or multi current AC LED package is integrated within an LED lamp. The LED lamp having a structure that comprises a heat sink, a lens cover and a standard lamp electrical base. The multi-voltage and/or multi-current single chip AC LED and/or package is configured to provide a means of switching on at least one additional single voltage AC LED circuit within multi-voltage and/or multi-current AC LED circuit to provide increased brightness from the LED lamp.

According to anther broad aspect of the invention at least one multi-current AC LED single chip is integrated within a LED package.

According to another aspect of the invention, at least one single chip multi-current bridge circuit having standard diodes, LEDs, or some combination thereof is integrated within a LED lamp having a standard lamp base. The single chip multi-current bridge circuit may be electrically connected together in parallel configuration but left open to accommodate switching on a switch to the more than one on the single chip and have at least one accessible electrical contact at each opposing end of the two series connected circuits and one accessible electrical contact at the center junction of the at least two individual serially connected LED circuits. The at least two individual circuits are integrated within a single chip.

According to another aspect of the invention when the at least two circuits are left unconnected on the single chip and provide electrical pads for connectivity during the packaging process, the LED packager may wire them into series or parallel connection based on the desired voltage level specification of the end LED package product offering.

According to another aspect of the invention, a high frequency transformer or inverter may provide power to at least one multi-voltage and/or multi-brightness LED device or chip. The high frequency transformer or inverter may be either packaged with the LED device or chip and may provide direct AC voltage to the LED device or chip, or as a separate driver or power supply for the LED device or chip capable of being electrically connected to the LED device or chip. The high frequency transformer or inverter is designed to receive a voltage at a low frequency, like for example a voltage at 50/60 Hz like a mains voltage, and output a voltage at a high frequency. The high frequency transformer or inverter may also be configured to step-up or step-down the voltage provided to the transformer or inverter from a source voltage.

According to another aspect of the invention, a high-frequency transformer or inverter may provide power to a DC driven-LED circuit, chip, or device or an LED circuit, chip or device containing one or more series strings of LEDs through a rectifier having standard diodes, LEDs, or some combination thereof may be electrically connected between the high-frequency transformer or inverter and. The rectifier may be provided independently from the high-frequency transformer or inverter and the LED circuit, chip, or device and electrically connected at its input to the high-frequency transformer or inverter and at its output to the LED circuit, chip or device. Alternatively, the rectifier may be packaged with the high-frequency transformer or inverter forming a power supply or driver for the LED circuit, chip, or device. The rectifier may likewise be packaged directly with, or as part of, an LED circuit, chip, or device. As should be appreciated by those having skill in the art, packaging the rectifier directly with the LED circuit, chip, or device allows for an LED package containing a DC-driven LED circuit, chip, or device, or one or more series strings of LEDs, to be directly plugged into any power supply or driver providing an AC voltage output and operate. As a further alternative, a high-frequency inverter, rectifier, and LED circuit, chip, or device may be packaged into a single lighting device capable of being directly incorporated into a lighting element, or may be incorporated directly into a lamp or other OEM product utilizing LED light.

According to another aspect of the invention, a two-way or three-way switch may be provided directly between a-high-frequency inverter providing power to a LED circuits, chip, or device and the LED circuits, chip or device, or in the alternative between a LED circuits, chip, or device and a rectifier having standard diodes, LEDs, or some combination thereof electrically connected to a high-frequency transformer or inverter.

DETAILED DESCRIPTION OF PREFERRED EMBODIMENTS

Figure 1:
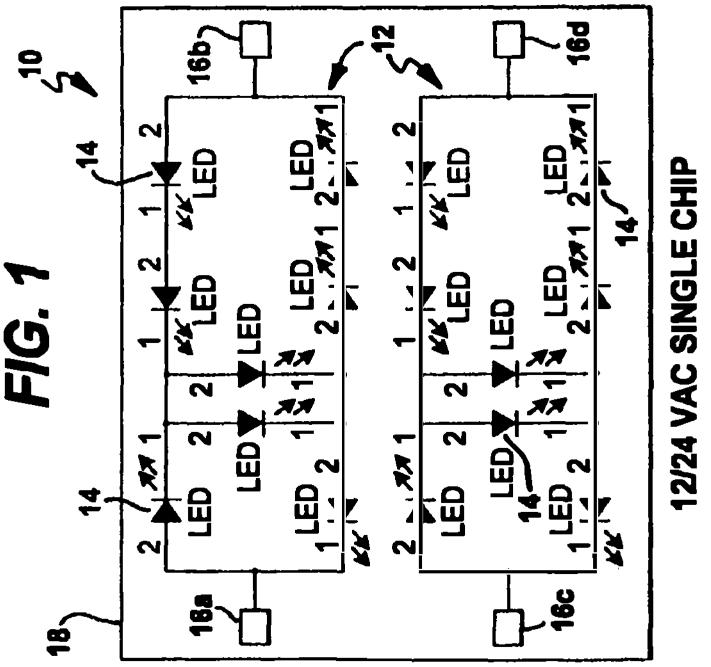
FIG. 1 shows a schematic view of a preferred embodiment of the invention.

FIG. 1 discloses a schematic diagram of a multi-voltage and/or multi-brightness LED lighting device 10. The multi-voltage and/or multi-brightness LED lighting device 10 comprises at least two AC LED circuits 12 configured in an imbalanced bridge circuit, each of which have at least two LEDs 14. The at least two AC LED circuits have electrical contacts 16*a*, 16*b*, 16*c*, and 16*d* at opposing ends to provide various connectivity options for an AC voltage source input. For example, if 16*a* and 16*c* are electrically connected together and 16*b* and 16*d* are electrically connected together and one side of the AC voltage input is applied to 16*a* and 16*c* and the other side of the AC voltage input is applied to 16*b* and 16*d*, the circuit becomes a parallel circuit with a first operating forward voltage. If only 16*a* and 16*c* are electrically connected and the AC voltage inputs are applied to electrical contacts 16*b* and 16*d*, a second operating forward voltage is required to drive the single chip 18. The single chip 18 may also be configured to operate at more than one brightness level "multi-brightness" by electrically connecting for example 16*a* and 16*b* and applying one side of the line of an AC voltage source to 16*a* and 16*b* and individually applying the other side of the line from the AC voltage source a second voltage to 26*b* and 26*c*.

Figure 2:
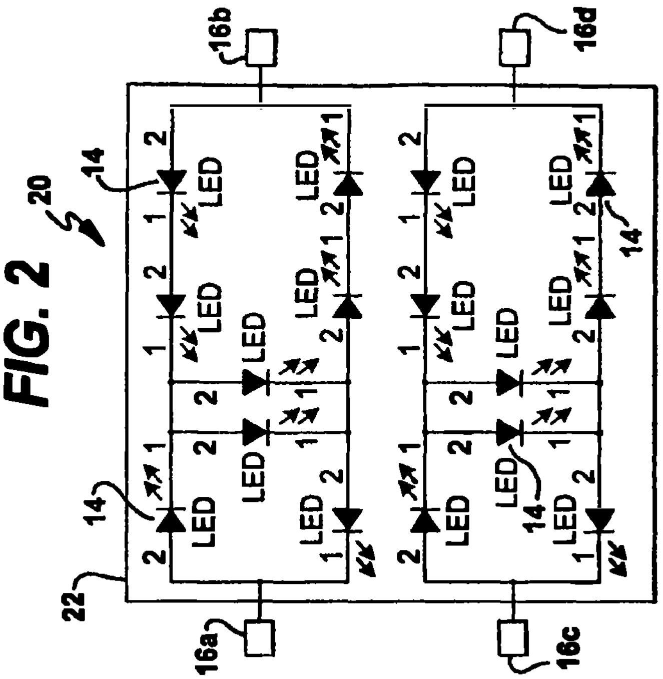
FIG. 2 shows a schematic view of a preferred embodiment of the invention.

FIG. 2 discloses a schematic diagram of a multi-voltage and/or multi-brightness LED lighting device 20 similar to the multi-voltage and/or multi-brightness LED lighting device 10 described above in FIG. 1. The at least two AC LED circuits 12 are integrated onto a substrate 22. The at least two AC LED circuits 12 configured in a imbalanced bridge circuit, each of which have at least two LEDs 14. The at least two AC LED circuits have electrical contacts 16*a*, 16*b*, 16*c*, and 16*d* on the exterior of the substrate 22 and can be used to electrically configure and/or control the operating voltage and/or brightness level of the multi-voltage and/or multi-brightness LED lighting device.

Figure 3:
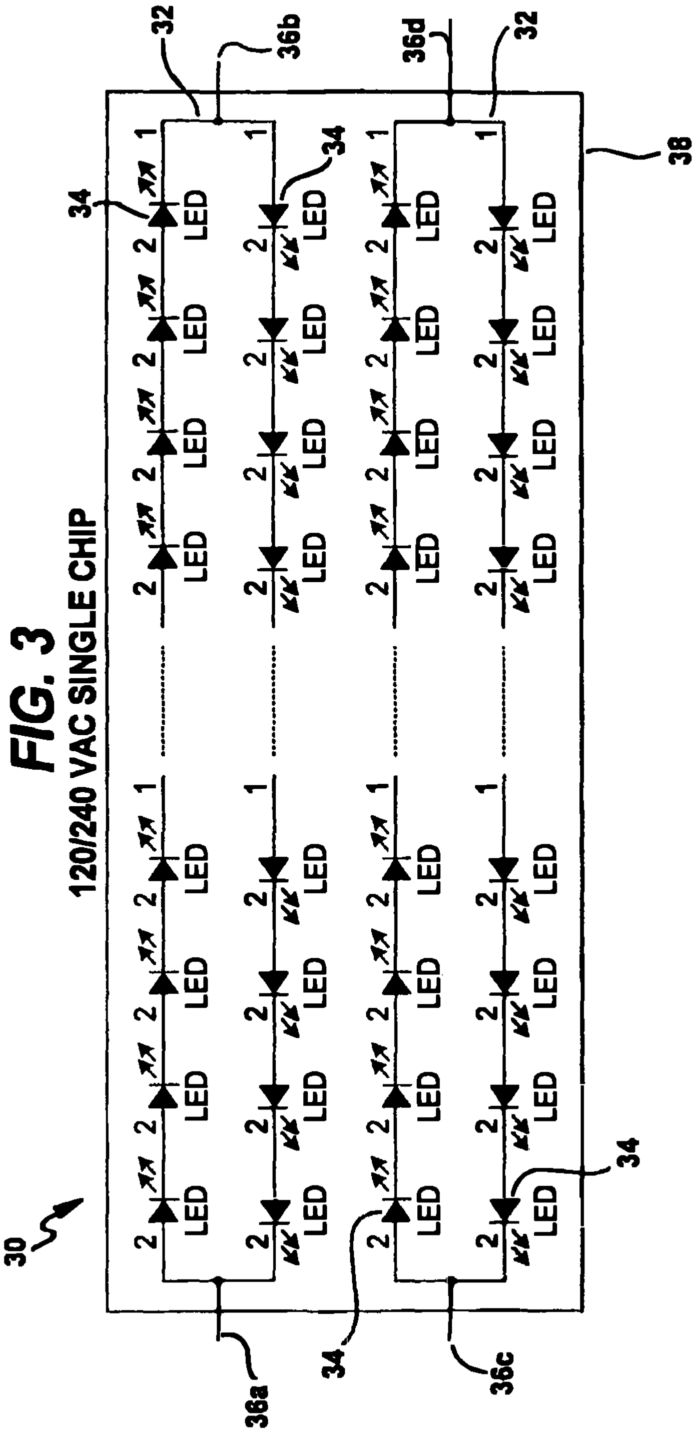
FIG. 3 shows a schematic view of a preferred embodiment of the invention.

FIG. 3 discloses a schematic diagram of a multi-voltage and/or multi-brightness LED lighting device 30 similar to the multi-voltage and/or multi-brightness LED lighting device 10 and 20 described in FIGS. 1 and 2. The multi-voltage and/or multi-brightness LED lighting device 30 comprises at least two AC LED circuits 32 having at least two LEDs 34 connected in series and anti-parallel configuration. The at least two AC LED circuits 32 have electrical contacts 36*a*, 36*b*, 36*c*, and 36*d* at opposing ends to provide various connectivity options for an AC voltage source input. For example, if 36*a* and 36*c* are electrically connected together and 36*b* and 36*d* are electrically connected together and one side of the AC voltage input is applied to 36*a* and 36*c* and the other side of the AC voltage input is applied to 36*b* and 36*d*, the circuit becomes a parallel circuit with a first operating forward voltage. If only 36*a* and 36*c* are electrically connected and the AC voltage inputs are applied to electrical contacts 36*b* and 36*d*, a second operating forward voltage is required to drive the multi-voltage and/or multi-brightness lighting device 30. The multi-voltage and/or multi-brightness lighting device 30 may be a monolithically integrated single chip 38, a monolithically integrated single chip integrated within a LED package 38 or a number of individual discrete die integrated onto a substrate 38 to form a multi-voltage and/or multi-brightness lighting device 30.

Figure 4:
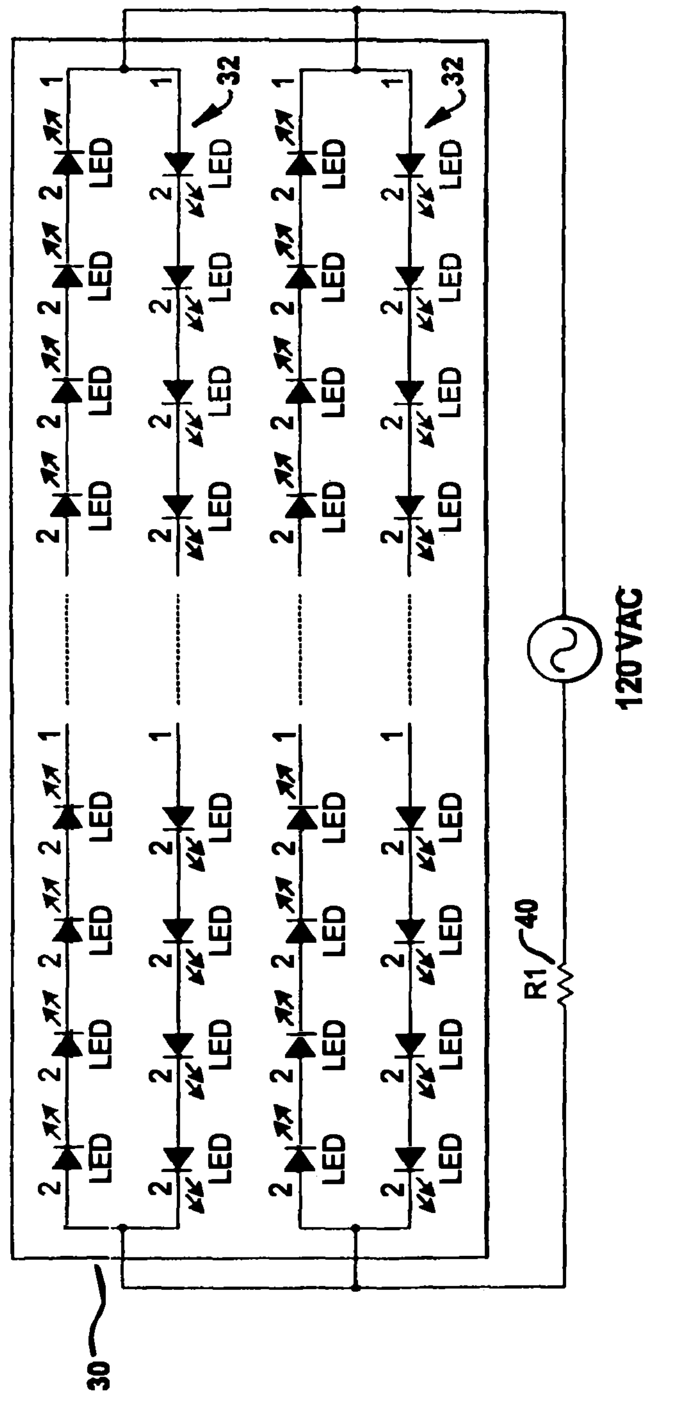
FIG. 4 shows a schematic view of a preferred embodiment of the invention.

FIG. 4 discloses a schematic diagram of the same multi-voltage and/or multi-brightness LED device 30 as described in FIG. 3 having the at least two AC LED circuits 32 connected in parallel configuration to an AC voltage source and operating at a first forward voltage. A resistor 40 may be used to limit current to the multi-voltage and/or multi-brightness LED lighting device 30.

Figure 5:
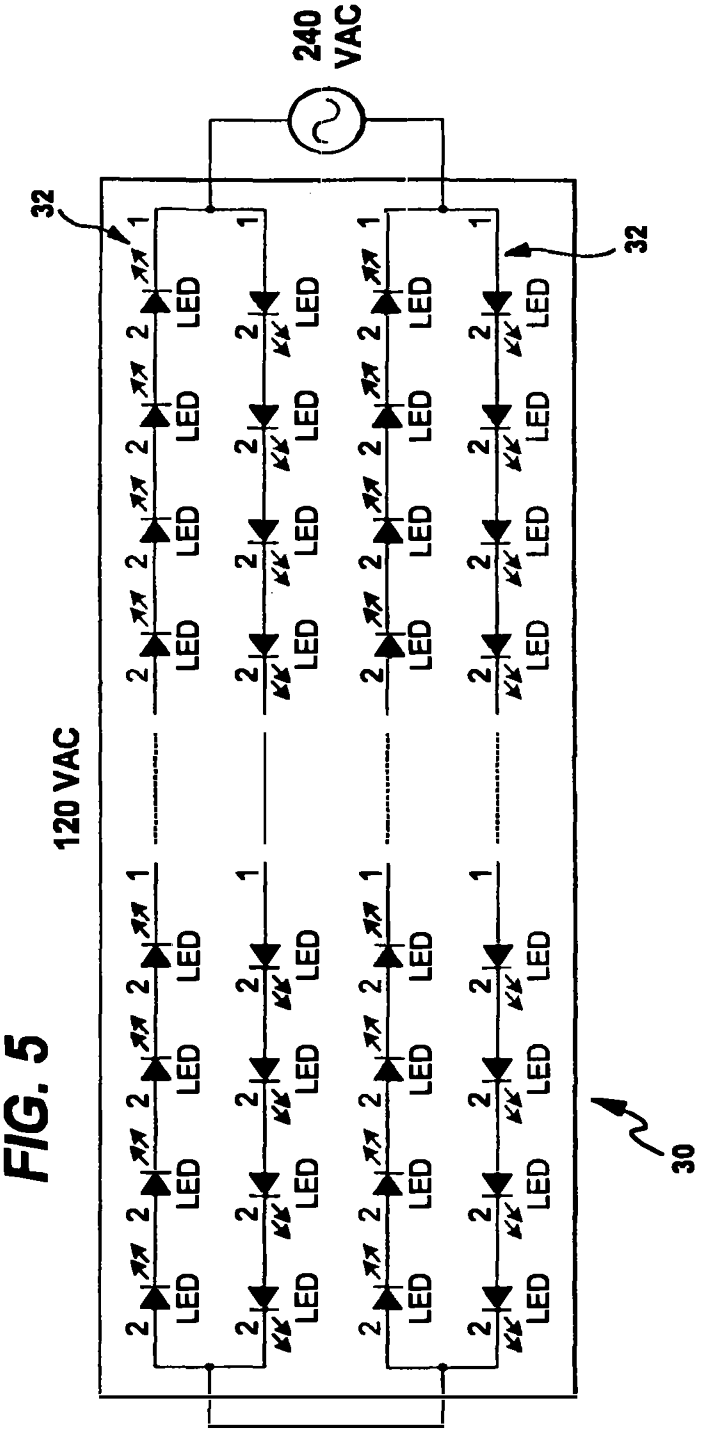
FIG. 5 shows a schematic view of a preferred embodiment of the invention.

FIG. 5 discloses a schematic diagram of the same multi-voltage and/or multi-brightness LED device 30 as described in FIG. 3 having the at least two AC LED circuits 32 connected in series configuration to an AC voltage source and operating at a second forward voltage that is approximately two times greater than the first forward voltage of the parallel circuit as described in FIG. 4. A resistor may be used to limit current to the multi-voltage and multi-brightness LED lighting device.

Figure 6B:
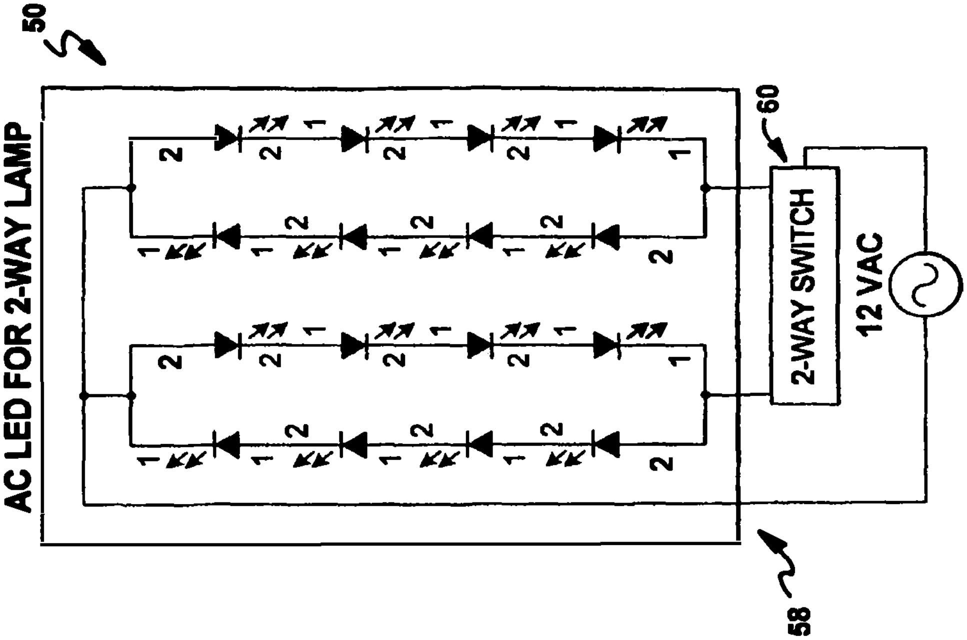
FIG. 6*b* shows a schematic view of a preferred embodiment of the invention.
Figure 6A:
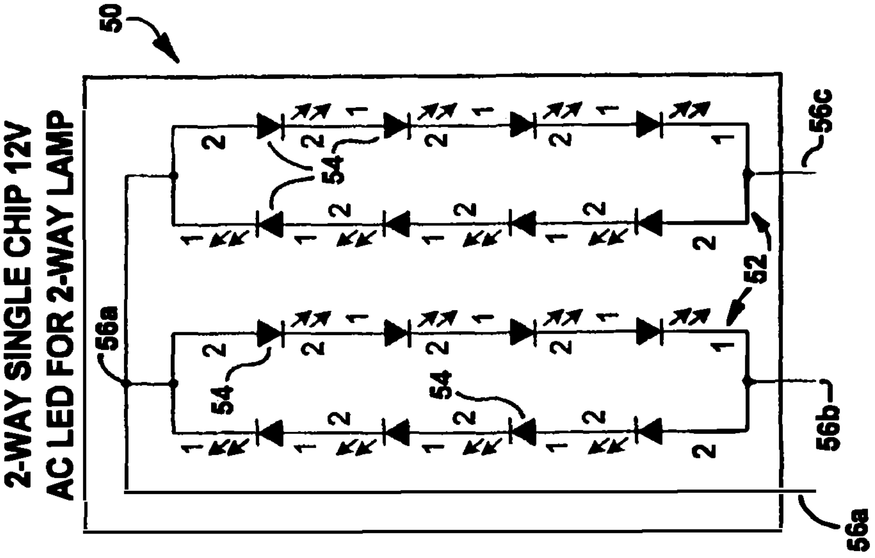
FIG. 6*a* shows a schematic view of a preferred embodiment of the invention.
Figure 7A:
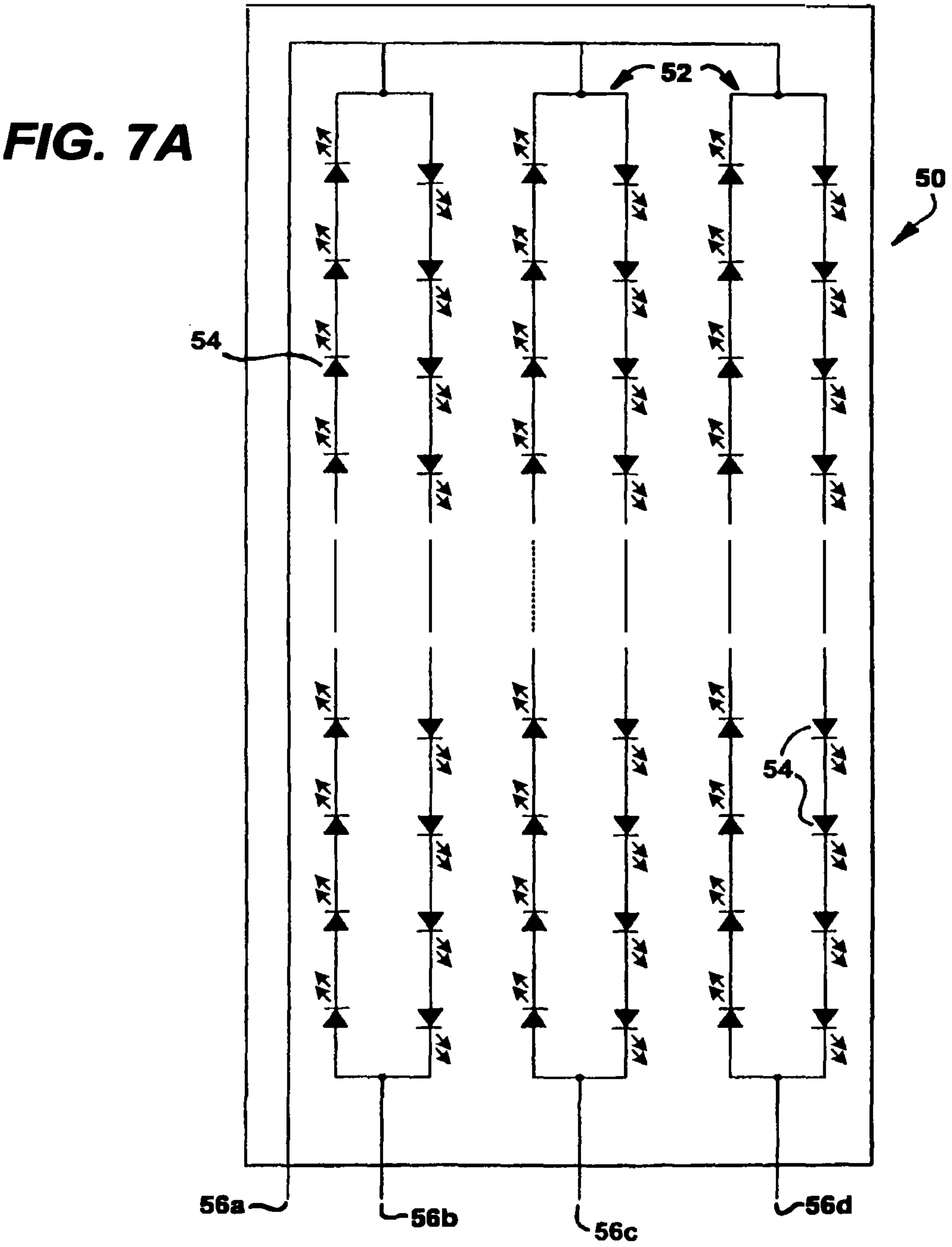
FIG. 7*a* shows a schematic view of a preferred embodiment of the invention.

FIGS. 6*a* and 7*a* disclose schematic diagrams of a multi-voltage and/or multi-brightness LED lighting devices 50. The multi-voltage and/or multi-brightness LED lighting devices 50 comprises at least two AC LED circuits 52, each of which have at least two LEDs 54 in series and anti-parallel relation. The at least two AC LED circuits 52 have at least three electrical contacts 56*a*, 56*b* and 56*c*, and in the case of FIG. 7*a* a fourth electrical contact 56*d*. The at least two AC LED circuits 52 are electrically connected together in parallel at one end 56*a* and left unconnected at the opposing ends of the electrical contacts 56*b* and 56*c*, and in the case of FIG. 7*a*, 56*d*. One side of an AC voltage source line is electrically connected to 56*a* and the other side of an AC voltage source line is individually electrically connected to 56*b*, 56*c*, and 56*d* with either a fixed connection or a switched connection thereby providing a first brightness when AC voltage is applied to 56*a* and 56*b* and a second brightness when an AC voltage is applied to 56*a*, 56*b* and 56*c*, and a third brightness when an AC voltage is applied to 56*a*, 56*b*, 56*c*, and 56*d*. It is contemplated that the multi-voltage and/or multi-brightness LED lighting devices 50 are a single chip, an LED package, an LED assembly or an LED lamp.

Figure 7B:
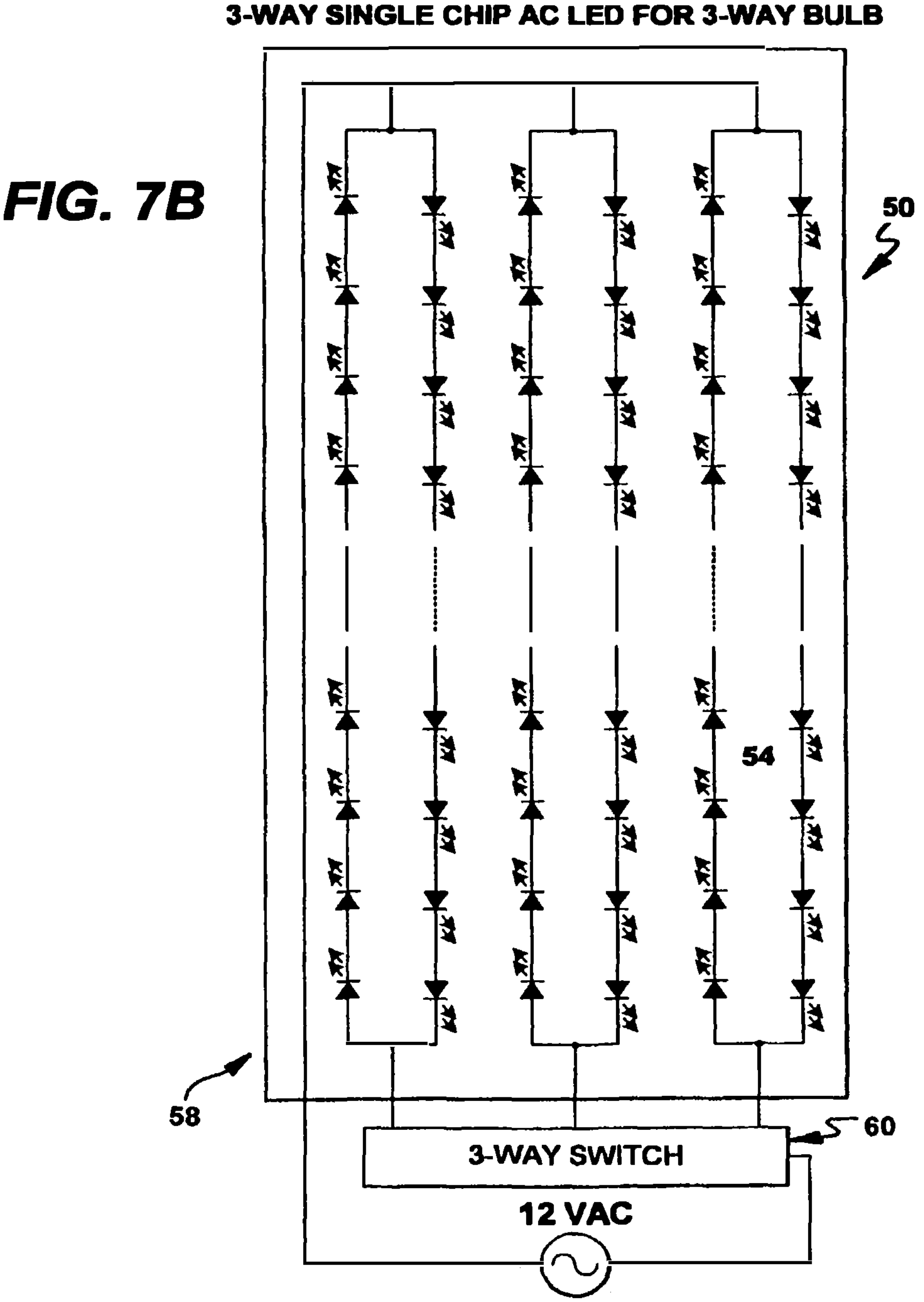
FIG. 7*b* shows a schematic view of a preferred embodiment of the invention.

FIGS. 6*b* and 7*b* disclose a schematic diagram similar to the multi-voltage and/or multi-brightness LED device 50 shown in FIGS. 6*a* and 7*a* integrated within a lamp 58 and connected to a switch 60 to control the brightness level of the multi-voltage and/or multi-brightness LED lighting device 50.

Figure 8:
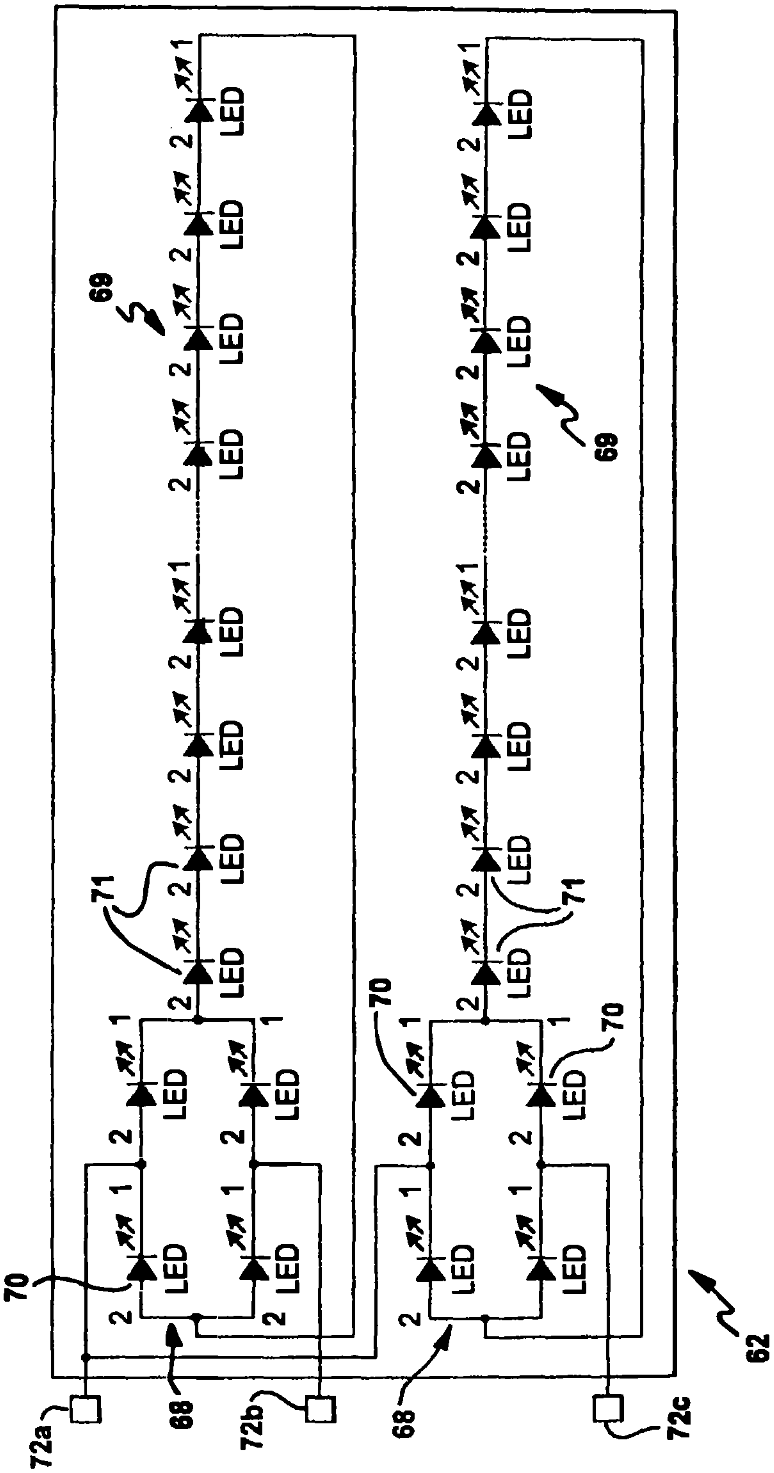
FIG. 8 shows a schematic view of a preferred embodiment of the invention.

FIG. 8 discloses a schematic diagram of a multi-brightness LED lighting device 62 having at least two bridge rectifiers 68 in series with LED circuits 69. Each of the at least two bridge rectifiers 68 in series with LED circuits 69 comprise four LEDs 70 configured in a bridge circuit 68. LED circuits 69 have at least two LEDs 71 connected in series and electrical contacts 72*a*, 72*b* and 72*c*. When one side of an AC voltage is applied to 72*a* and the other side of an AC voltage line is applied to 72*b* and 72*c* individually, the brightness level of the multi-brightness LED lighting device 62 can be increased and/or decreased in a fixed manner or a switching process.

Figure 9:
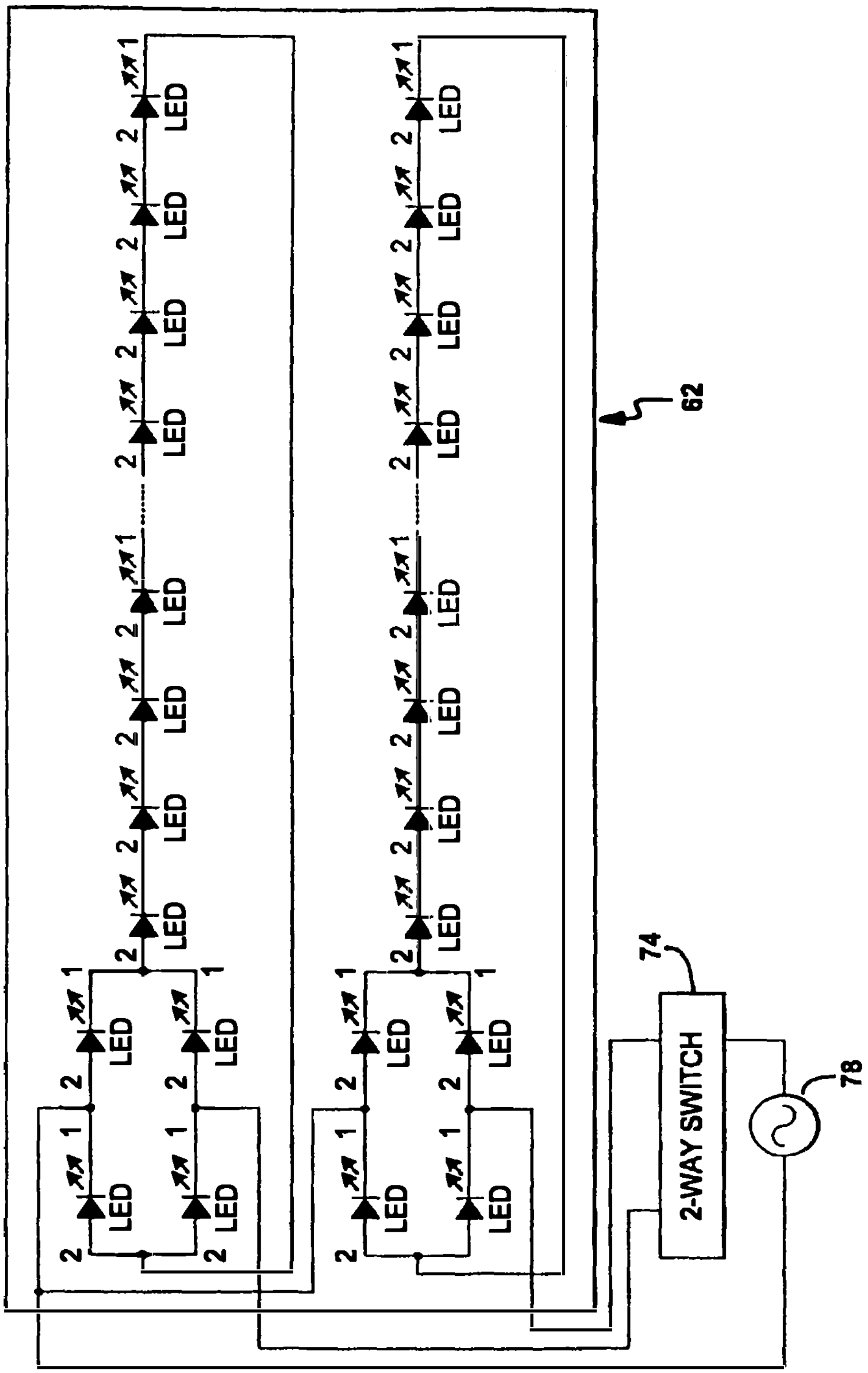
FIG. 9 shows a schematic view of a preferred embodiment of the invention.

FIG. 9 discloses a schematic diagram the multi-brightness LED lighting device 62 as shown above in FIG. 8 with a switch 74 electrically connected between the multi-brightness LED lighting device 62 and the AC voltage source 78.

FIG. 9 discloses a schematic diagram of at least two single voltage LED circuits integrated with a single chip or within a substrate and forming a multi-voltage and/or multi-brightness LED device.

Figure 10:
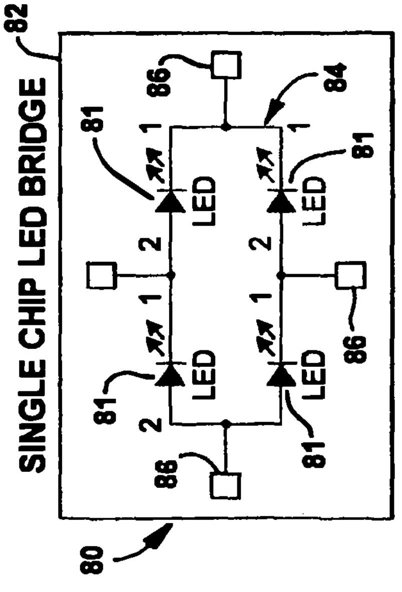
FIG. 10 shows a schematic view of a preferred embodiment of the invention.

FIG. 10 discloses a schematic diagram of a single chip LED bridge circuit 80 having four LEDs 81 configured into a bridge circuit and monolithically integrated on a substrate 82. The full wave LED bridge circuit has electrical contacts 86 to provide for AC voltage input connectivity and DC voltage output connectivity.

Figure 11:
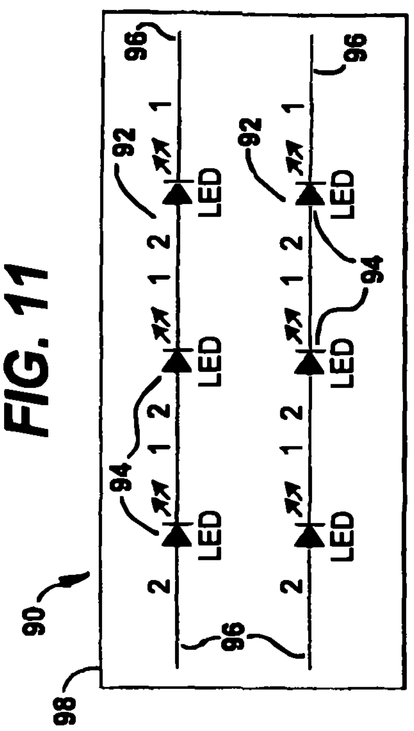
FIG. 11 shows a schematic view of a preferred embodiment of the invention.

FIG. 11 discloses a schematic diagram of another embodiment of a single chip multi-voltage and/or multi-brightness LED lighting device 90. The multi-voltage and/or multi-brightness LED lighting device 90 has at least two series LED circuits 92 each of which have at least two LEDs 94 connected in series. The at least two series LED circuits 92 have electrical contacts 96 at opposing ends to provide a means of electrical connectivity. The at least two series LED circuits are monolithically integrated into a single chip 98. The electrical contacts 96 are used to wire the at least two series LEDs circuit 92 into a series circuit, a parallel circuit or an AC LED circuit all within a single chip.

Figure 12:
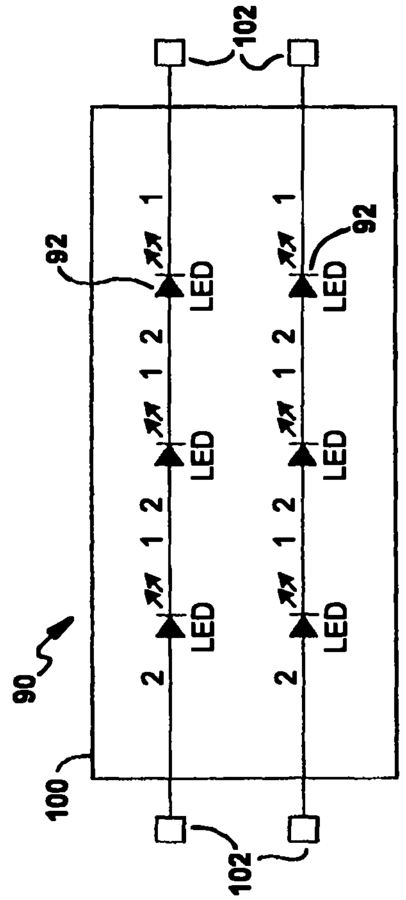
FIG. 12 shows a schematic view of a preferred embodiment of the invention.

FIG. 12 discloses a schematic diagram of the same multi-voltage and/or multi-brightness LED lighting device 90 as shown above in FIG. 11. The multi-voltage and/or multi-brightness LED lighting device 90 has at least two series LED circuits 92 each of which have at least two LEDs 94 connected in series. The at least two series LED circuits can be monolithically integrated within a single chip or discrete individual die can be integrated within a substrate to form an LED package 100. The LED package 100 has electrical contacts 102 that are used to wire the at least two series LEDs circuit into a series circuit, a parallel circuit or in anti-parallel to form an AC LED circuit all within a single LED package.

Figure 13:
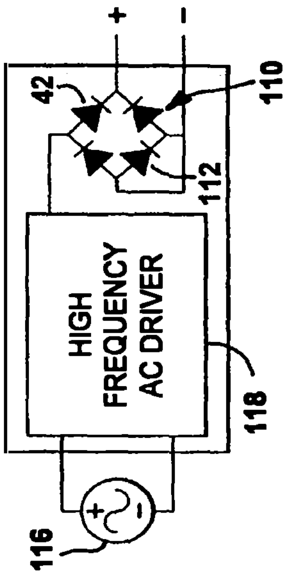
FIG. 13 shows a schematic view of a preferred embodiment of the invention.
Figure 14:
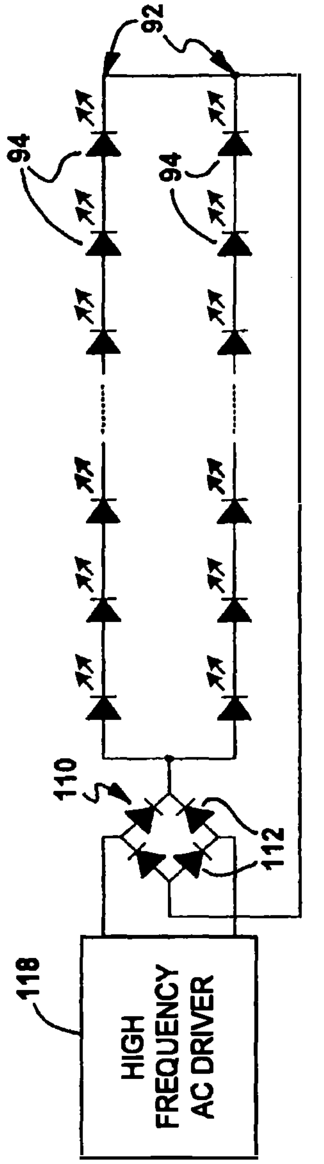
FIG. 14 shows a schematic view of a preferred embodiment of the invention.
Figure 15:
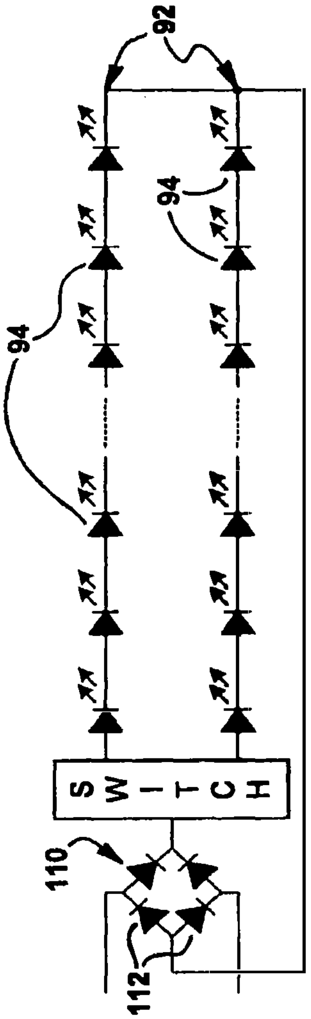
FIG. 15 shows a schematic view of a preferred embodiment of the invention.

As seen in FIGS. 13-15, a single rectifier 110 may be provided for two or more LED circuits 92, each containing at least two LEDs 94 connected in series. The single rectifier 110 comprises standard diodes 112 connected to an AC voltage source 116, or in the alternative may be connected to a driver or power supply which ultimately provides an AC voltage, like for example a high frequency AC driver 118. The single rectifier 110 is electrically connected to the LED circuits 92. Specifically, the rectifier 110 connects to a common junction of an anode of at least one LED 94 in each LED circuit 92, and to the cathode of at least one LED 94 in each LED circuit 92. As shown in FIG. 15, the rectifier may instead be connected to a switch, allowing for either one or both of LED circuits 92 to be operative at any given time.

It is contemplated by the invention that diodes 112 in FIGS. 13-15 are interchangeable with LEDs 70 in rectifiers 68 in FIGS. 8 and 9 and vice versa. As should be appreciated by those having skill in the art, any combination of LEDs 70 and diodes 112 can be used in rectifiers 68 and 110, so long as rectifiers 68 and 110 provide DC power from an AC source.

As shown in FIGS. 13 and 14, and further shown in FIGS. 16-20, any lighting devices, chips, or AC LED or DC LED circuits contemplated by the present invention may be powered through a high-frequency AC driver, inverter or transformer 118. As shown in FIG. 13, any AC source 116 may be connected to the high-frequency driver or inverter or transformer 118, however, as shown in FIGS. 16-20 it is contemplated that low frequency voltage 124, like for example a mains voltage, is provided to the high-frequency driver or transformer or inverter 118.

Figure 16:
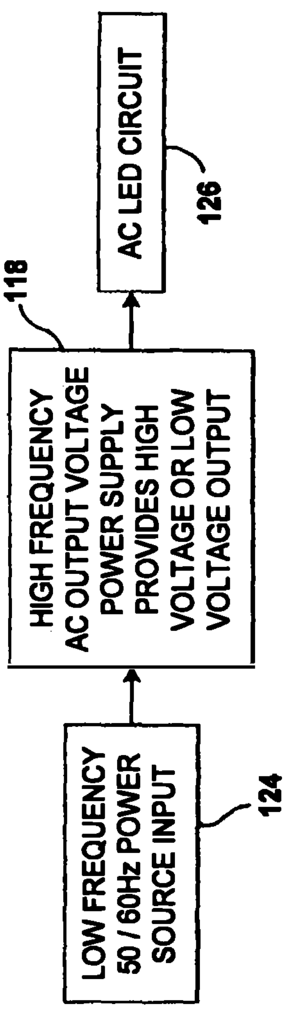
FIG. 16 shows a block diagram of a preferred embodiment of the invention.
Figure 17:
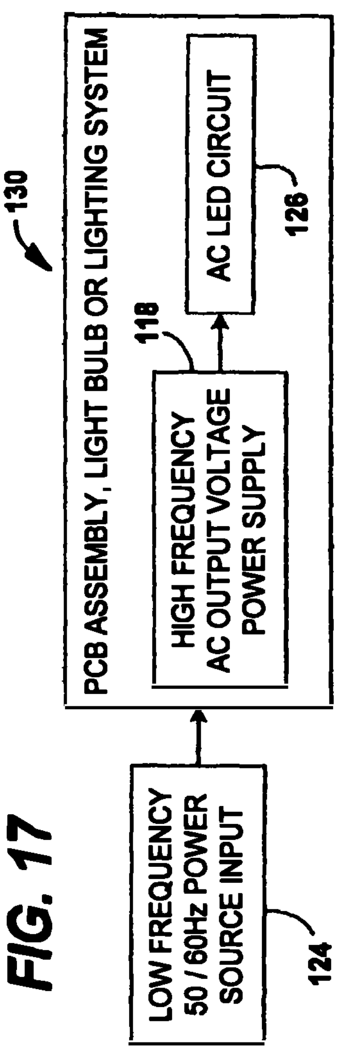
FIG. 17 shows a block diagram of a preferred embodiment of the invention.

FIGS. 16 and 17 show two embodiments of an AC LED lighting system 140 wherein a high-frequency AC driver, inverter, or transformer 118 for provides a high-frequency voltage to an AC LED circuit, lighting device, or chip 126. AC LED circuit, lighting device, or chip 126 may be any of the devices, circuits, or chips shown and described in FIGS. 1-7, like for example LED lighting devices 10, 20, 30 and/or AC LED circuits 12, 32, or any combination thereof. When multiple AC LED circuits, lighting devices, or chips are connected to the high-frequency driver in combination, such AC LED circuit(s), lighting device(s), or chip(s) may be connected together in either a series relationship, a parallel relationship, or a series-parallel relationship.

As shown in FIG. 16, the high-frequency AC driver, inverter or transformer 118 may be packaged separately from an (or multiple) AC LED circuit, device, or chip 126. In such embodiments a power source 128 provides voltage to the high-frequency AC driver; inverter or transformer 118 which steps up the frequency of the voltage to a higher frequency and provides the higher-frequency voltage to the AC LED circuit(s), device(s), or chip(s) 126. High-frequency AC driver, inverter, or transformer 118 may further include necessary circuitry, for example a transformer, for stepping-up or stepping-down the AC voltage provided by the power source 128.

As shown in FIG. 17, high-frequency AC driver, inverter, or transformer 118 may be packaged with AC LED circuit(s), device(s), or chip(s) 126 in a unitary AC LED light bulb, lighting element 130. It is contemplated by the invention that a switch may be configured between the high-frequency driver, inverter, or transformer 118 and the AC LED circuit(s), device(s), or chip(s) 126 for selectively operating one or more AC LED circuit, lighting device, or chip. For example, as shown in FIGS. 6A, 6B, 7A, and 7B a 2-way or 3-way switch may be attached at the input side of the AC LED circuit(s), lighting device(s), or chip(s). Such a switch may be located between the high-frequency AC driver, inverter, or transformer 118, and the AC LED circuit(s), lighting device(s), or chip(s).

FIGS. 14 and 18-20 show a DC LED lighting system 142 having a DC LED circuit(s), device(s), or chip(s) 92, 132 being powered by a high-frequency AC driver, inverter, or transformer 118 through a rectifier 110. In operation, the combination of AC sources 116, 128, high-frequency AC driver, inverter or transformer 118, and DC LED circuit, device, or chip 92, 132 operate in substantially the same manner as that described with respect to FIGS. 16 and 17. However, in each system shown in FIGS. 14 and 18-20, rectifier 110 rectifies the high-frequency AC voltage output of the high-frequency AC driver, inverter, or transformer before a voltage is provided to the DC LED circuit(s), device(s), or chip(s) 92, 132. DC LED circuit(s), device(s), or chip(s) 132 are not limited in form to just circuit 92, and instead may take the form of any of the lighting devices, circuits, or chips shown and described, for example, in FIGS. 8-12. When multiple DC LED circuits, lighting devices, or chips are connected to the high-frequency driver in combination, such DC LED circuit(s), lighting device(s), or chip(s) may be connected together in either a series relationship, a parallel relationship, or a series-parallel relationship. Additionally, as shown in FIG. 15, a switch, like for example a 2-way switch or a 3-way switch, may also be attached at the input side of DC LED circuit(s), device(s), or chip(s).

Figure 18:
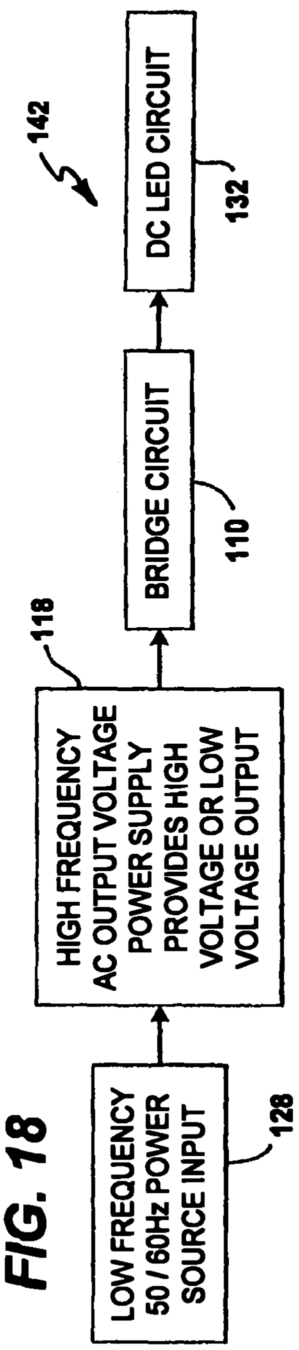
FIG. 18 shows a block diagram of a preferred embodiment of the invention.
Figure 19:
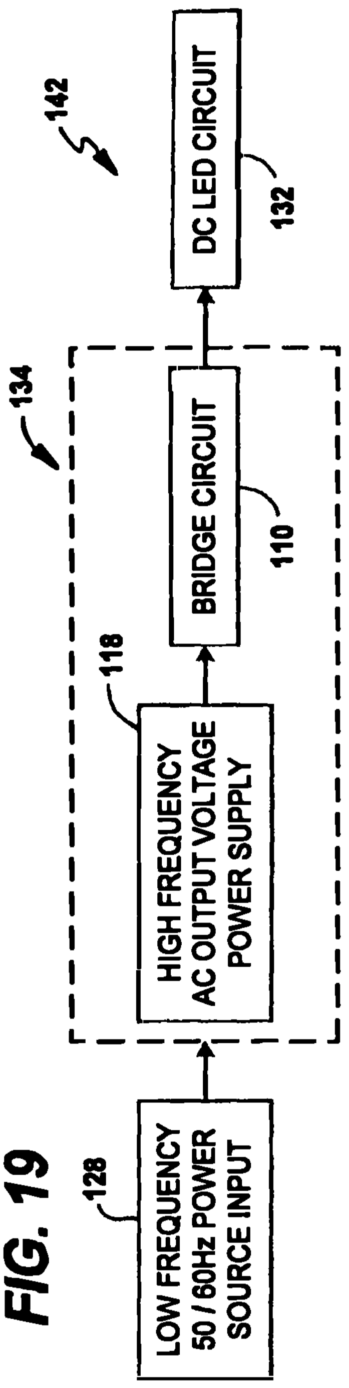
FIG. 19 shows a block diagram of a preferred embodiment of the invention.
Figure 20:
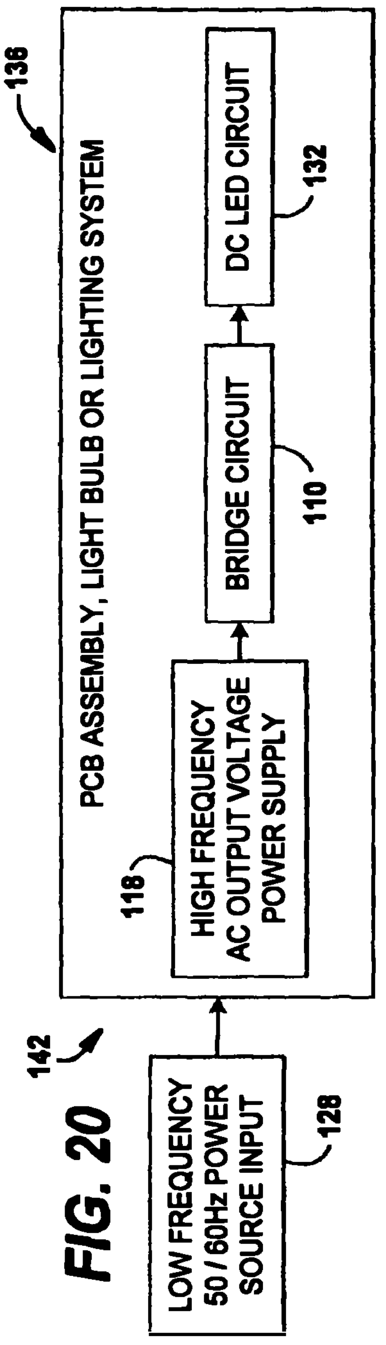
FIG. 20 shows a block diagram of a preferred embodiment of the invention.

As shown in FIGS. 18-20, like in an AC embodiment, AC driver, inverter, or transformer 118, rectifier 110, and DC LED circuit(s), device(s), or chip(s) 132 may be packaged in any number of ways. As shown in FIG. 18, each element may be packaged separately and electrically connected together in series. Alternatively, as shown in FIG. 19, a DC LED driver 134 may be formed by combining the high-frequency AC driver, inverter, or transformer 118 with rectifier 110. As shown in FIG. 20, an additional alternative contemplated by the invention is forming a DC LED lighting element 136, which may be embodied as a light bulb, lighting system, lamp, etc., wherein the DC LED lighting element 136 includes each of a high-frequency AC driver, inverter, or transformer 118, a rectifier 110, and a DC LED circuit(s), lighting device(s), or chip(s) 132. It should be appreciated by those having skill in the art that a lighting element containing only rectifier 110 and a DC LED circuit(s), lighting device(s), or chip(s) 132 may also be designed. Such lighting elements have the advantage of being able to be plugged into any AC source, whether it is a high-frequency AC driver, inverter, or transformer, or a simple mains voltage, and provide a light output in the same manner as the imbalanced circuit shown in, for example FIGS. 1-7.

Figure 21:
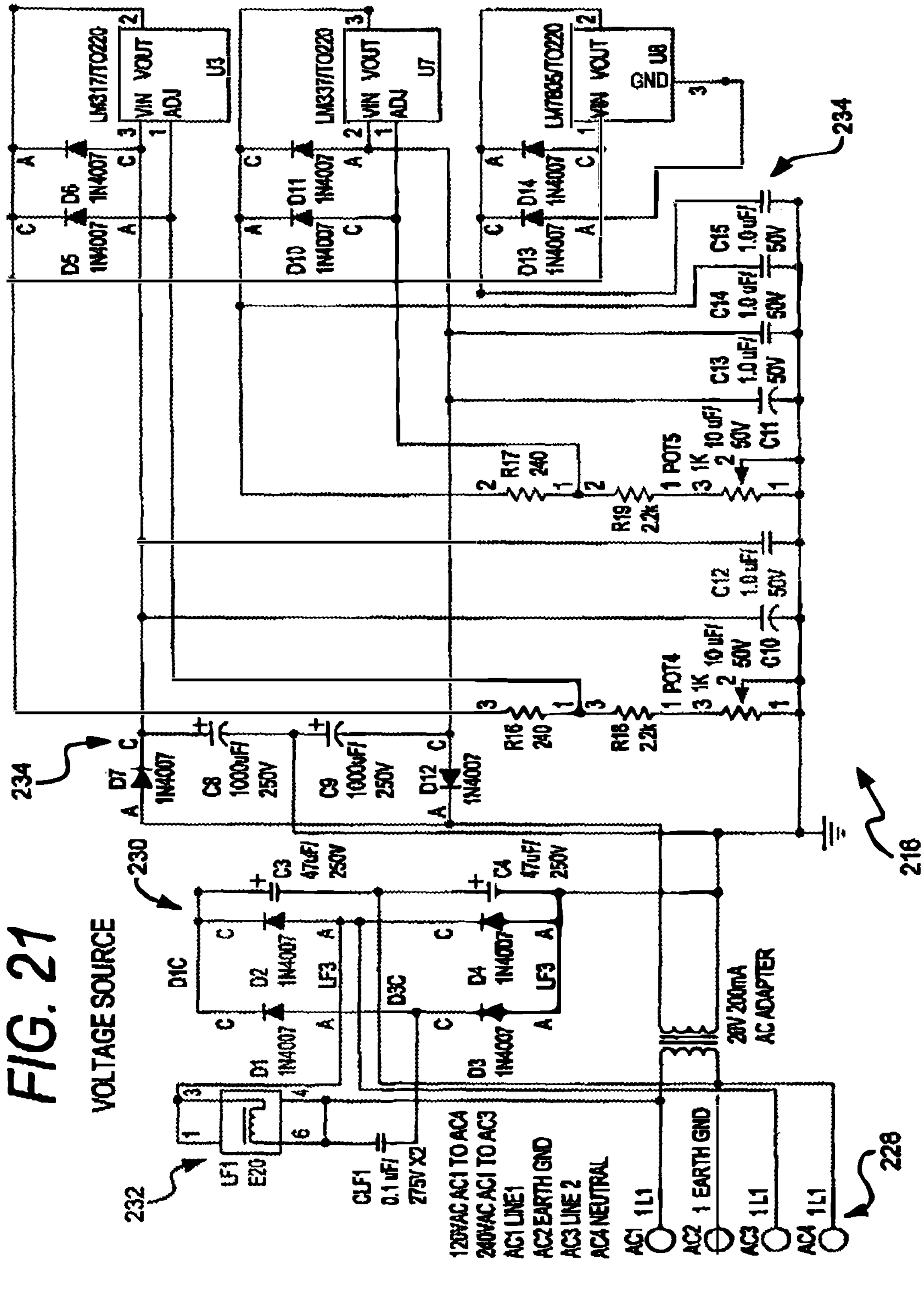
FIG. 21 shows a schematic view of a preferred embodiment of the invention.

FIG. 21 shows a schematic diagram of the voltage source stage 216. The voltage source stage 216 provides universal AC mains inputs 228 that drive a diode bridge 230 used to deliver DC to the LED circuit driver system 214. Direct DC could eliminate the need for the universal AC input 228. Power factor correction means 232 may be integrated into the LED circuit driver 216 as part of the circuit. The voltage source stage 216 includes a low voltage source circuit 234 that may include more than one voltage and polarity.

Figure 22:
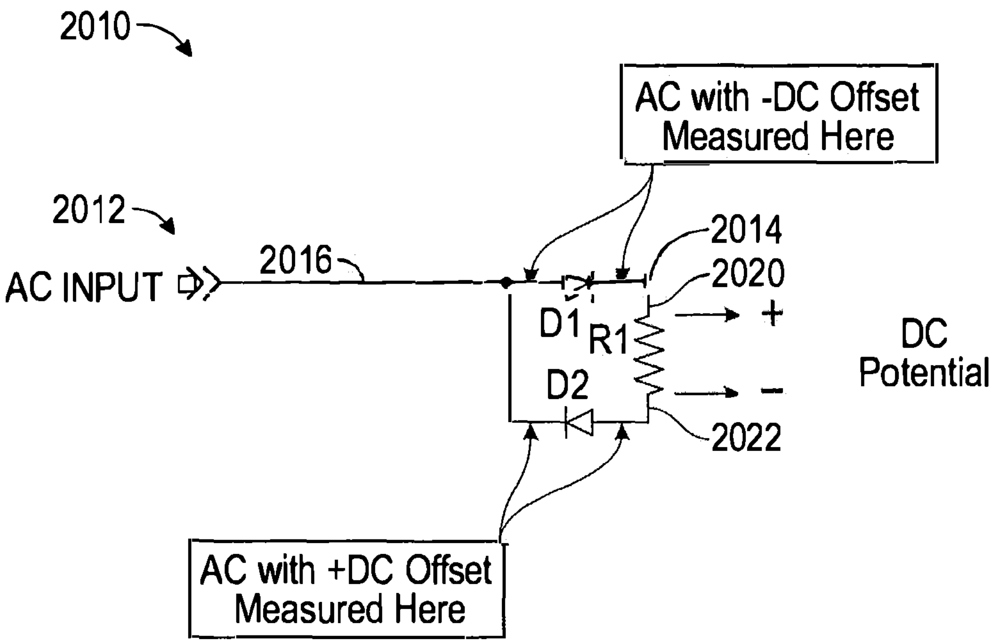
FIG. 22 shows a schematic view of a preferred embodiment of the invention.

FIG. 22 discloses a preferred circuit 2010 according to the invention. The circuit 2010 includes a first source for providing an alternating electric field. The source may be 120V or 240V line power, RF energy or the output of a standard AC signal generator such as generator 2012 of FIG. 22. This generator 2012 may produce its signal with reference to ground as indicated in FIG. 22. Circuit 2010 also discloses a directional circuit 2014 connected to the generator 2012 by a transmission conductor 2016. According to the invention the conductor 2016 may be any form of conventional conductive path whether twisted wire bundles, single wires, etc. The point is that the transmission conductor 2016 provides a single transmission path to the directional circuit 2014. Important to the invention is the fact that there is no conductive return path provided back from the directional circuit 2016 to the generator 2012.

In the broad sense, the directional circuit 2014 is a loop circuit which includes one or more circuit elements causing the loop circuit to be asymmetric to current flow. Again it is important that the directional circuit 2014 has no continuous conductive path to earth ground, or a battery ground. As such, and as disclosed in FIG. 22 the directional circuit 2014 develops a DC potential across a load, such as resistor R1 in response to the alternating electric field. This DC potential is not referenced to ground but merely to the potential differences created by the circulation of current (see FIG. 23) in the loop across the load (resistor R1 of FIG. 22). Accordingly, the DC potential is self referencing. As far as the resistor R1 is concerned, circuit 2010 presents it with a relatively higher DC potential output at 2020 and a relatively lower potential output at 2022.

Figure 23:
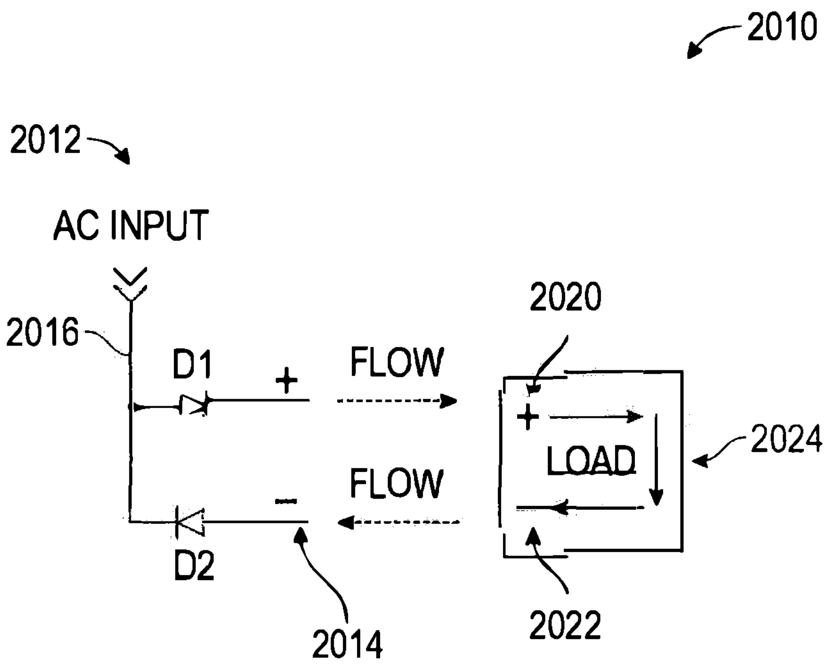
FIG. 23 shows a schematic view of a preferred embodiment of the invention.

FIG. 23 discloses circuit 2010 with the load represented as a generic load 2024 (rather than resistor R1) to show the circulation path of current flow (indicated by the arrows) in any generic load circuit utilizing the DC potential of circuit 2010.

FIGS. 22 and 23 disclose that the loads connected to the directional circuit 2014 do not have a continuous conductive path to earth ground or a battery ground. They also disclose that the directional circuit 2014 has circuit elements causing the directional circuit to be asymmetric to current flow. In the preferred embodiment disclosed, these circuit elements are diodes D1 and D2. However, it is contemplated that numerous other circuit elements could provide the same functionality, in particular, semiconductors with "pn" junctions; electrets, plasma, organic; or combinations thereof.

Figure 46:
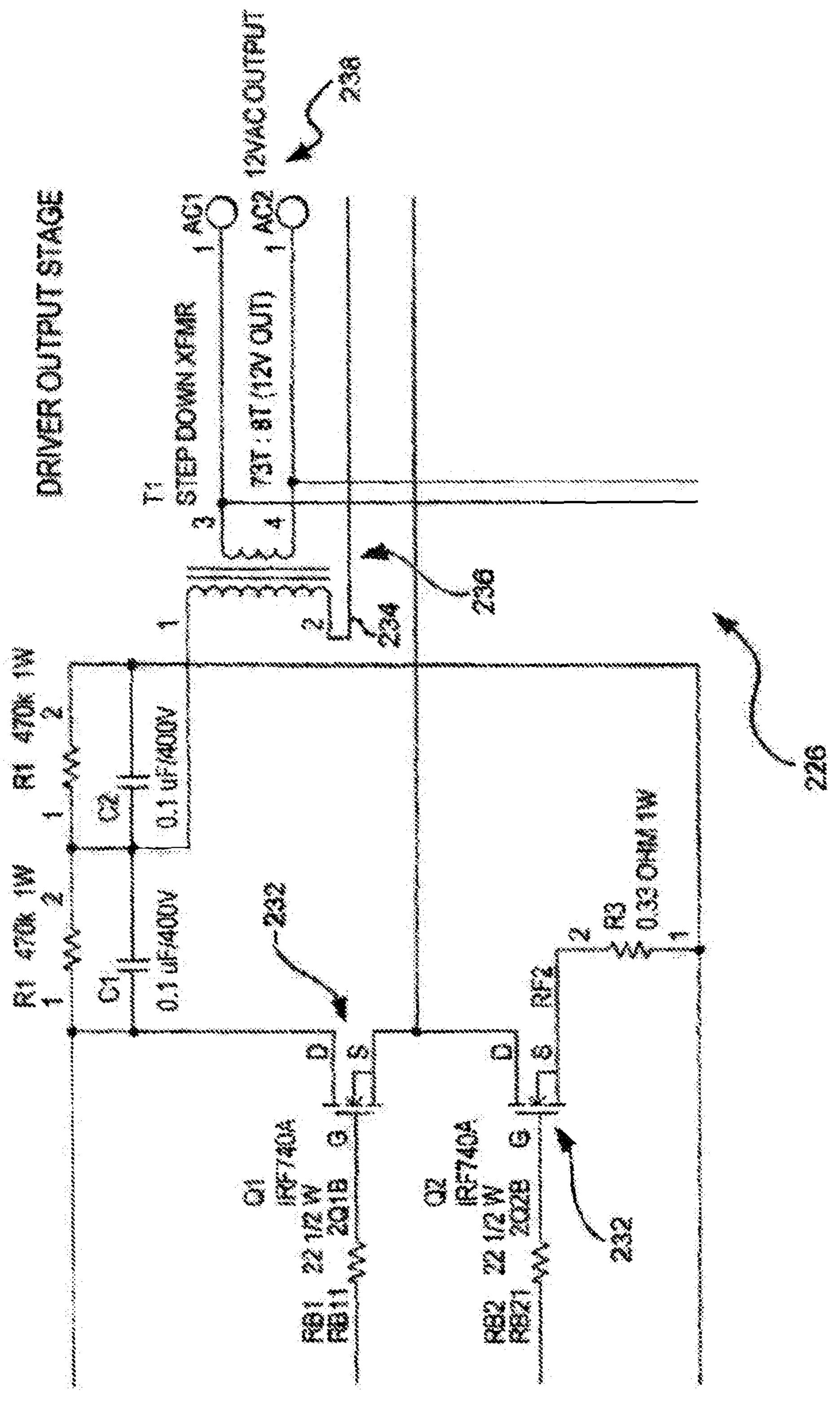
FIG. 46 shows a schematic view of a preferred embodiment of the invention.

The circuit 2010 is preferably used for delivering power and sensing proximity. The circuit 2010 is also preferably useful in TTL logic applications as disclosed in FIG. 46 showing a standard TTL logic output circuit 2026 powered by circuit 2010. In that application, the DC voltages necessary range from 0V to +/−5V.

Figure 24:
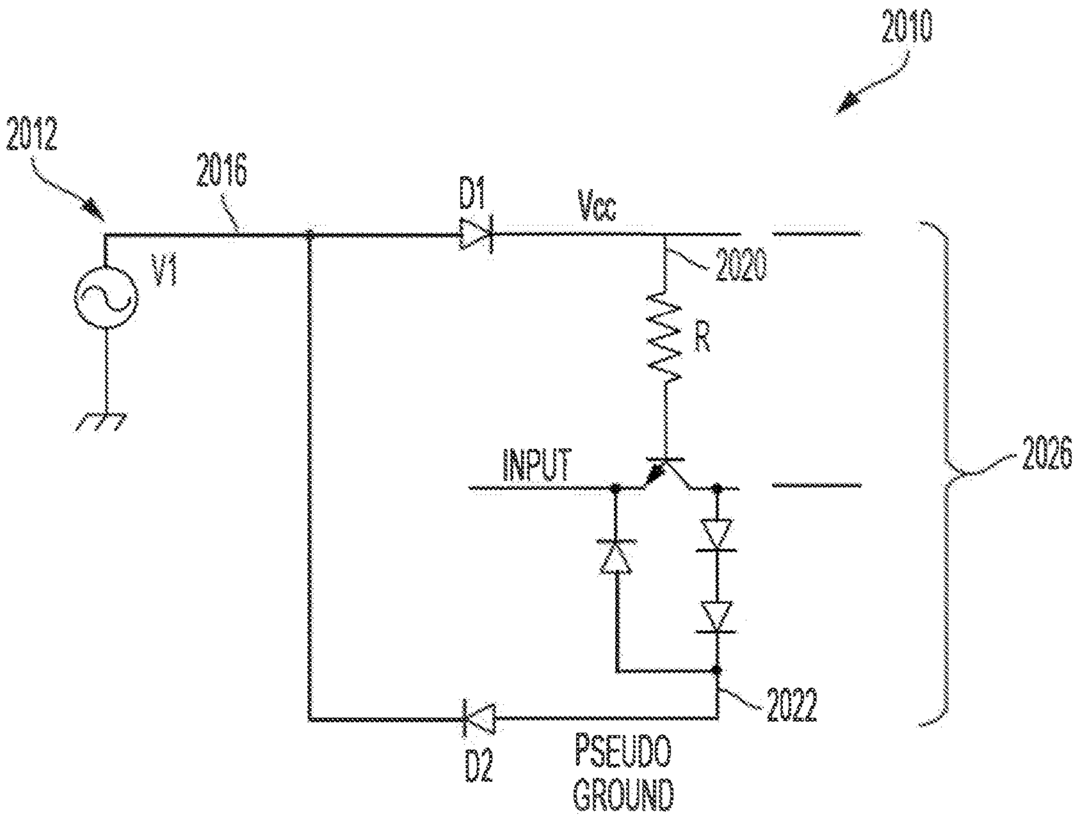
FIG. 24 shows a schematic view of a preferred embodiment of the invention.

FIGS. 22-24 each disclose that directional circuit 2014 includes first and second diodes D1 and D2, with D1 having an anode and diode D2 having a cathode which are commonly connected to the transmission conductor 2016. the cathode of the first diode D1 is connected to the relatively more positive side of the load 2020 while the anode of the second diode is connected to the relatively less positive side load 2022 to form the directional loop circuit among the diodes and the load.

Figure 25:
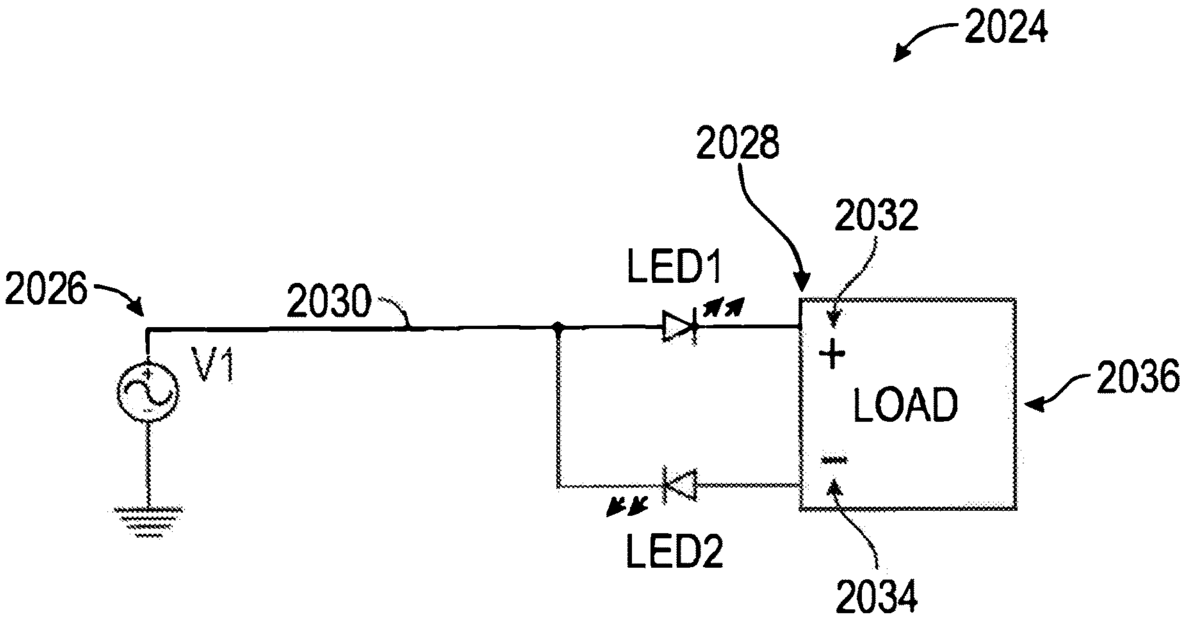
FIG. 25 shows a schematic view of a preferred embodiment of the invention.

FIG. 25 discloses a circuit 2024 according to the invention having a standard AC signal generator 2026 and a directional circuit 2028 includes first and second light emitting diodes (LEDs), the first LED 1 has an anode and the second LED 2 has a cathode, which are commonly connected to the conductor 2030 from the generator 2026. The cathode of LED 1 is connected to the relatively more positive voltage side 2032 of the load 2036 while the anode of LED 2 is connected to the relatively less positive side 2034 of the load 2036 to form the loop circuit 2028 among the LEDs 1 and 2. In this embodiment the load is configured to optimize the lumen produced by the directional circuit, for example the LEDs 1, 2 used to deliver power to the load 2036 which can be a third LED as shown in FIG. 26.

Figure 26:
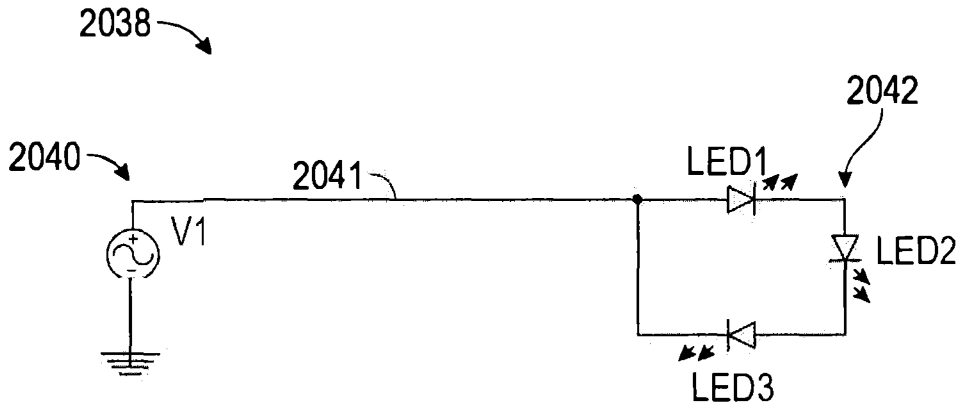
FIG. 26 shows a schematic view of a preferred embodiment of the invention.
Figure 27:
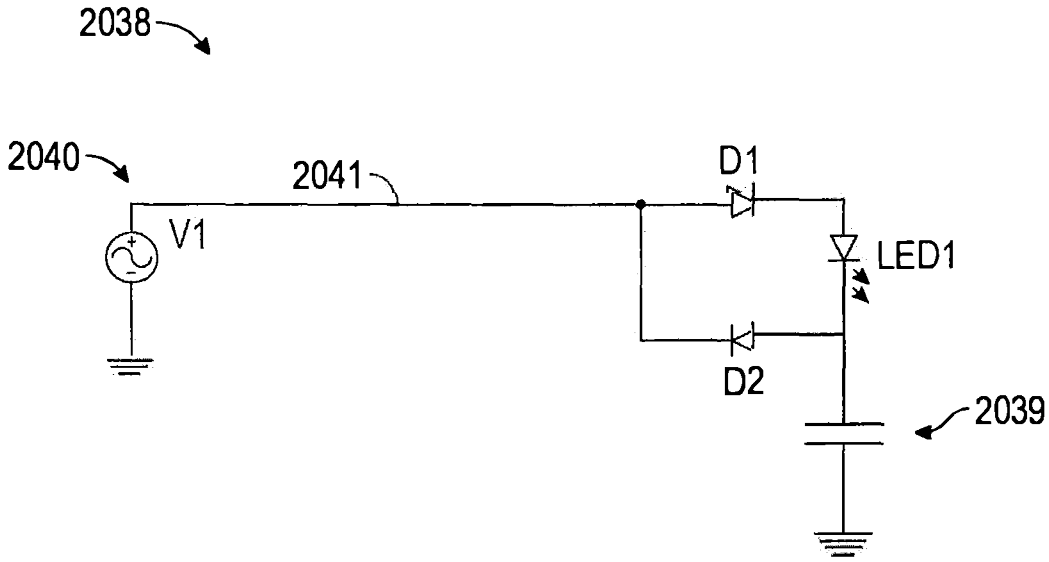
FIG. 27 shows a schematic view of a preferred embodiment of the invention.

FIG. 26 discloses a circuit 2038 according to the invention. In this embodiment, a generator 2040 produces an alternating electric field on transmission conductor 2040. The conductor 2041 is connected to a directional circuit 2042 having circuit elements causing an asymmetrical response to the alternating field and current flow. In particular, circuit 2042 includes three LEDs 1, 2, 3, configured to provide circulation according to the direction of the arrows (see FIG. 26). In this embodiment, all three LEDs 1-3 provide light as an output that can be considered as a load. This shows that relative nature of the positioning of elements in the various directional circuits disclosed herein according to the invention. If light is desired, then each of the diodes may be considered both loads and circuit elements which cause asymmetrical current flow. For example, FIG. 27 discloses the same circuit 2038 with only the substitution of LEDs 1 and 3 by diodes D1 and D2. In this circuit, optimization of the light emitted by LED 2 is of paramount concern, whereas the diodes 1, 2 provide directionality and a DC offset to the AC signal source as will be disclosed in more detail below. In preferred embodiments, the directional circuits, including directional circuit 2014, disclosed herein throughout this invention may be connected to ground through capacitance 2039 at a point within the directional circuit other than the AC signal input point 40 as shown in FIG. 27. This ground connection seems to provide increased circulation current, as it is noted that the LEDs get brighter for a given alternating electromagnetic source. The capacitor 2039 may alternatively be placed on the other side of the AC line 2041. The capacitor is used to drop the voltage from the AC source.

Figure 28:
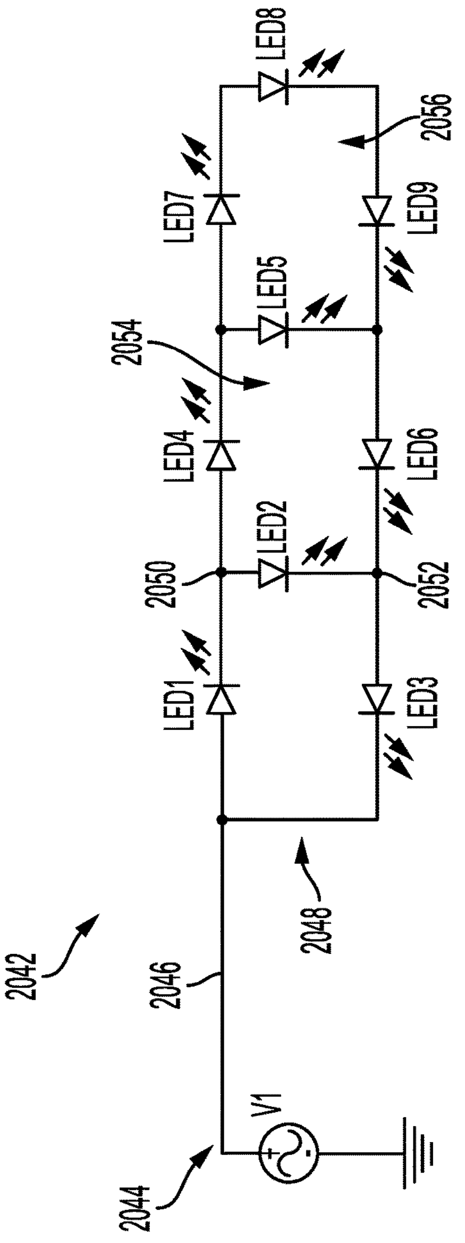
FIG. 28 shows a schematic view of a preferred embodiment of the invention.

FIG. 28 discloses a circuit 2042 having an AC signal generator 2044 inducing an alternating electric field onto transmission conductor 2046 which is connected to a first directional circuit 2048 having LEDs 1-3. LED 2 acting as a load to circuit 2048, provides the relatively high DC potential at point 2050 and a relatively lower DC potential at point 2052 to another directional circuit 2054 comprised of LEDs 4-6. This is repeated for another directional circuit 2056 and LEDs 7-9. Again, the circuit components LEDs 1-9 provide both directionality and useful work as a load in the form of producing light. According to another aspect of the invention, the circuit 2042 discloses the multiplexing possibilities of the directional circuits 2048, 2052, 2056. According to another aspect of the invention, the circuit 2042 discloses a parallel LED directional circuit.

Figure 29:
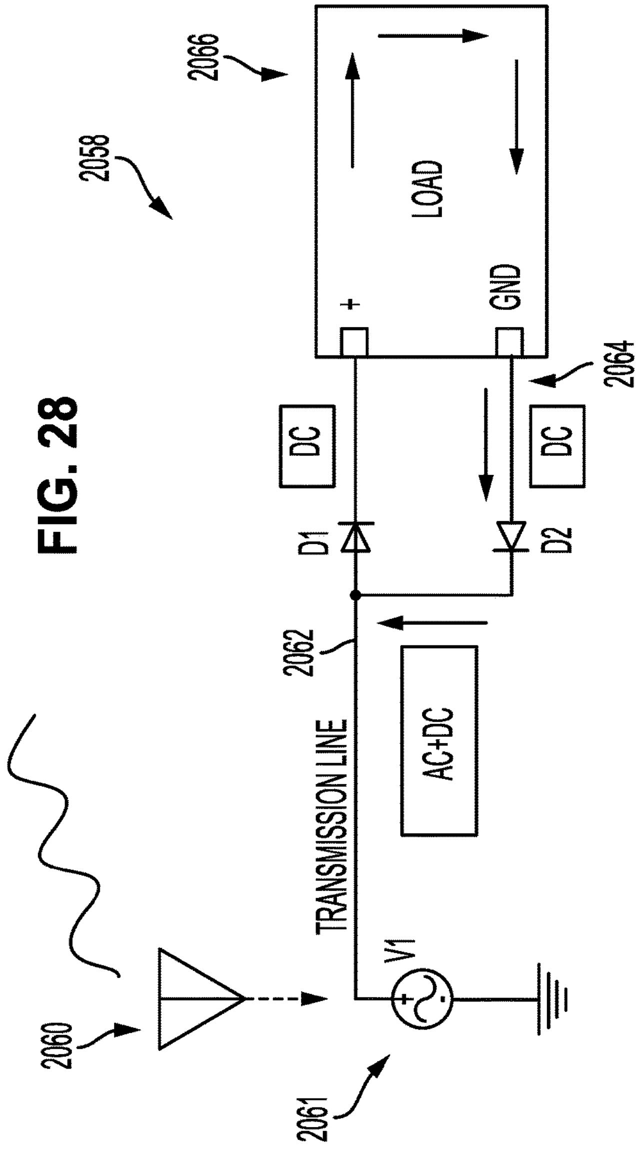
FIG. 29 shows a schematic view of a preferred embodiment of the invention.

FIG. 29 discloses a circuit 2058 to illustrate another aspect of the invention, in particular the transmission of information or data as one may use the terms. Accordingly, the alternating electric field is provided (as it could be with any embodiment disclosed herein) by either an antenna 2060 or a signal generator 2061. The alternating signal source is imposed on transmission conductor 2062. A directional circuit 2064 is comprised of a load 2066 and two diodes D1 and D2. The circuit 2058 discloses the directional DC current flow as well as an AC plus DC current flow and potential indicated by "AC+DC" in FIG. 29. This DC plus AC component is important to the transmission of information or data signals from the generators 2060, 2061.

Figure 30:
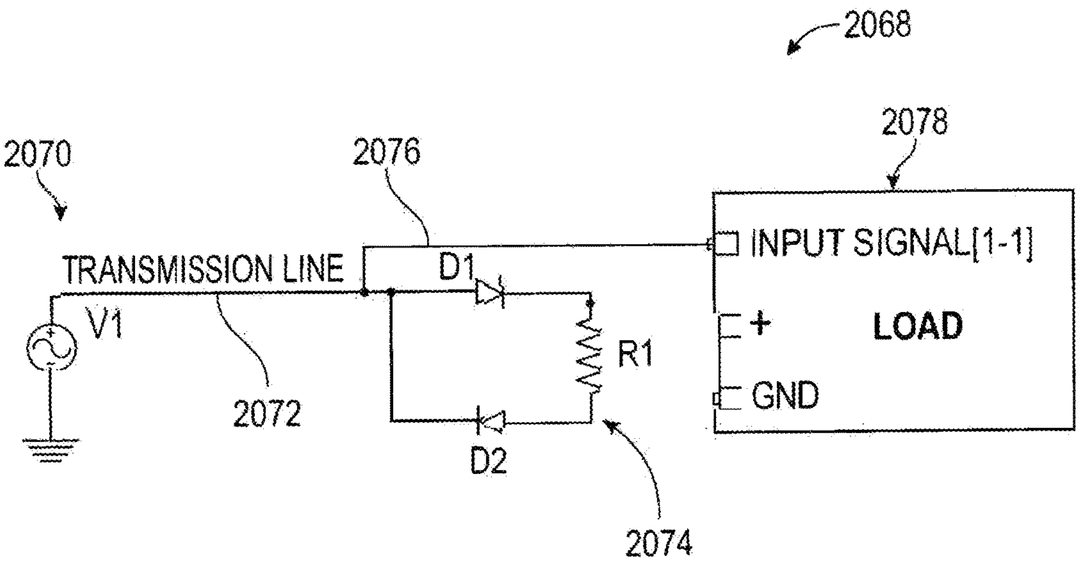
FIG. 30 shows a schematic view of a preferred embodiment of the invention.

In particular, FIG. 30 discloses a circuit 2068 having a signal generator 2070, a transmission conductor 2072, and a directional circuit 2074. The directional circuit has asymmetrical diode elements D1 and D2 and a load R1. In this and the other embodiment disclosed herein (see FIG. 29), the directional circuit 2074 is constructed to permit a DC voltage level to accrue on the transmission conductor 2072 along with the AC signal to provide an offset to the signal. This offset is preferential to the signal as the signal is ungrounded. It is believed that this may prevent noise in the system to be added to the line 2072 as a second alternating field but with reference to ground. Accordingly the noise adds to the DC level but not to the signal level in the same proportions.

Also as disclosed in FIG. 30, an output 2076 is provided which will transmit the AC signals from transmission line 2072 to an information or data signal receiver 2078 which will detect the signal riding the DC level. The DC level can easily be distinguished and handled by such a receiver as is conventional. It should be understood that the signal receiver 2078 may be of any conventional type of TTL logic device, modem, or telecommunications receiver and is believed to operate best with the preferred systems of the invention when it is not connected to earth ground or a battery ground, or a current sink or charge collector (as is the case for the working loads disclosed through out this disclosure).

Figure 31:
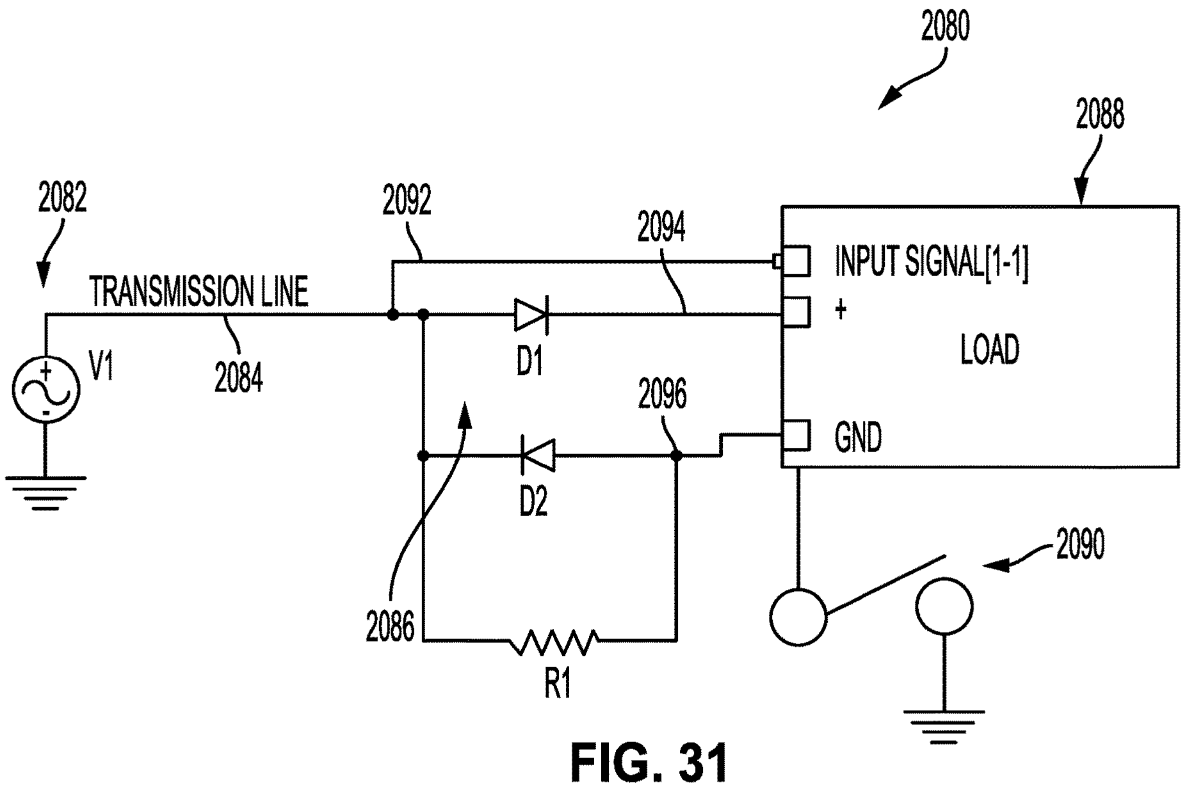
FIG. 31 shows a schematic view of a preferred embodiment of the invention.

According to another embodiment, FIG. 31 discloses another information or data communication circuit 2080. The circuit 2080 includes a signal generator 2082, a transmission conductor 2084, a directional circuit 2086, a data receiver 2088, and a ground switch 2090. In this embodiment, the directional circuit 2086 provides both the DC power for the receiver 2088, and a data signal through output 2092 connected between the receiver input and the common connection between the conductor 2084 and directional circuit input to anode of diode D1 and cathode D2. In the meantime, the receiver is powered on the DC potential difference between D1 the relatively more positive side 2094 and D2 the relatively less positive side 2096 of the directional circuit. In this embodiment, resistor R1 is provided according to another aspect of the invention to regulate or select as desired the level of DC offset the AC data signal will have at line 2092.

According to another aspect of the invention, the ground switch 2090 is provided to provide a non-continuous connection to a circuit, such as the ground circuit disclosed in FIG. 31, to dissipate excessive accumulations of charge or voltage potentials in the circuit 2080. It is contemplated that the switch 2090 be actuated based upon a timing (such as a pre-selected clock pulse) criteria, or by a sensor (not shown) of an undesirable DC level developing in the circuit 2080. Once engaged, the circuit 2090 would dissipate the excess energy to a ground, ground, plane, capacitor, battery ground, or the like.

Figure 32:
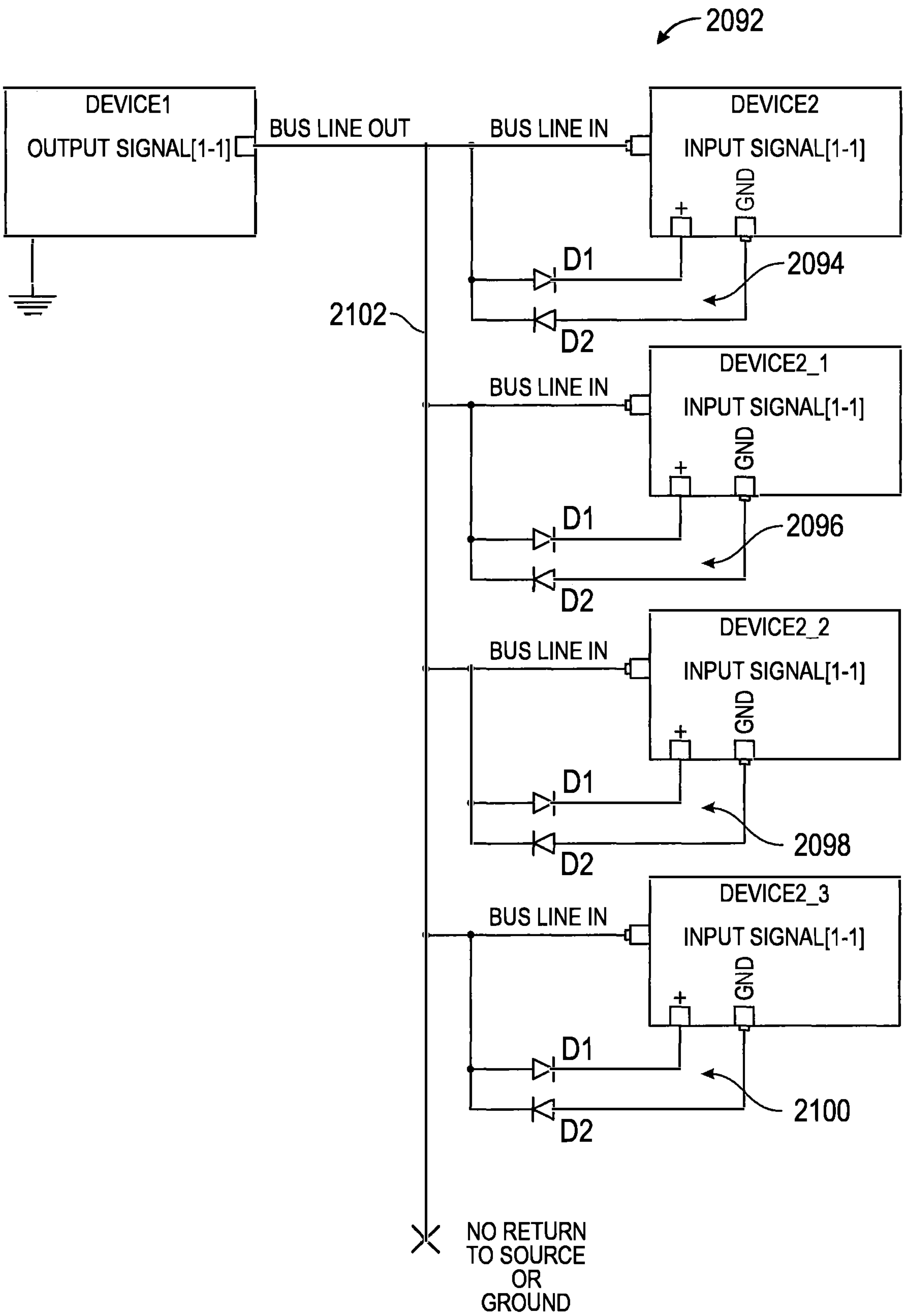
FIG. 32 shows a schematic view of a preferred embodiment of the invention.

FIG. 32 discloses a circuit 2092 wherein directional circuits 2094-2100 are connected through a common bus conductor 2102 to provide DC power and signals from generator 2104 as described previously herein.

Figure 33:
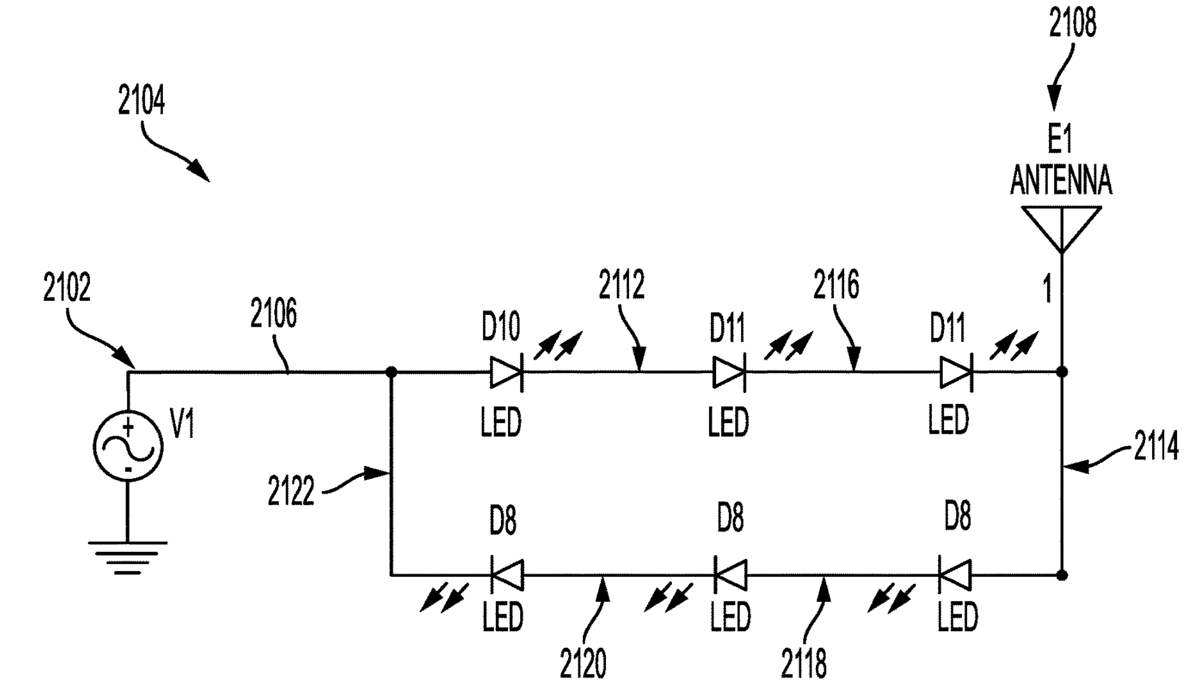
FIG. 33 shows a schematic view of a preferred embodiment of the invention.
Figure 34:
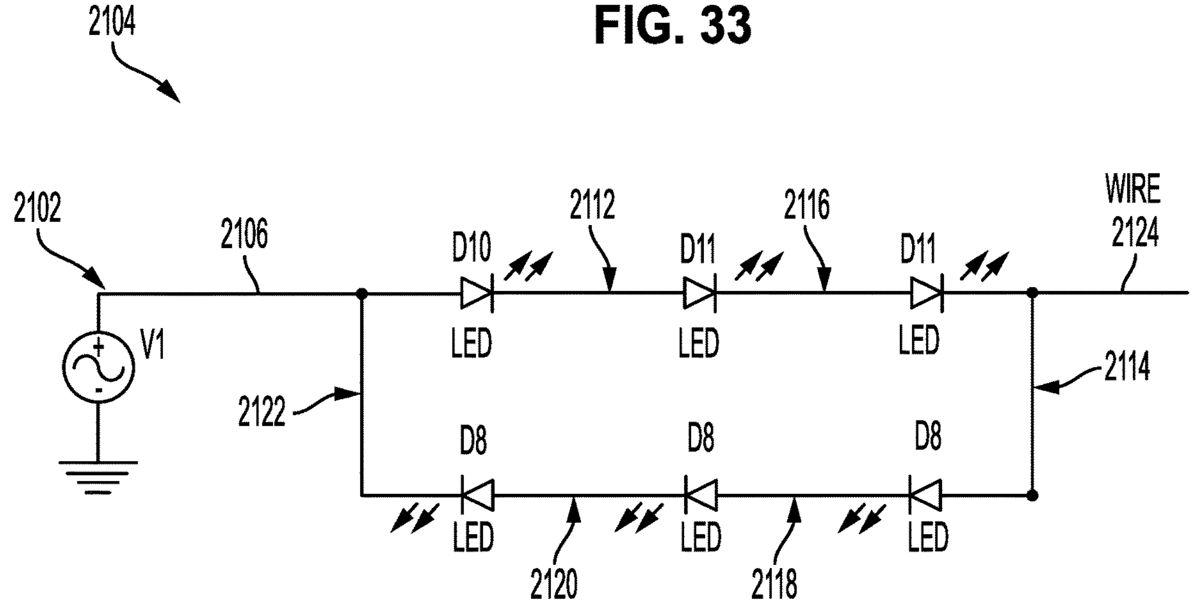
FIG. 34 shows a schematic view of a preferred embodiment of the invention.

FIGS. 33 and 34 disclose a circuit 2104 to illustrate another aspect of the invention. Accordingly, an alternating electric field is provided to a first transmission conductor by a signal generator 2102 and a second transmission conductor is provided by an antenna 2108 (see FIG. 33) or wire 2124 (see FIG. 34) that is connected to a relatively less positive side 2114-2122 within the directional circuit 2110. A difference in DC potential between a relatively more positive side 2112 within the directional circuit, and relatively less positive side 2114-2122 is provided. Another aspect of the invention is sensing proximity with impedance changes within the directional circuits described herein (as it could be with any embodiment disclosed herein) by approaching any of the directional circuits or transmission conductors (also any of which are described herein), for example approaching 2108 (shown in FIG. 33) and/or 2124 (as shown in FIG. 34) with a conductive substance such as a person or metallic material thereby changing the circulation of current flow within the directional circuit by changes in impedance through the capacitance of the conductive substance.

Figure 35:
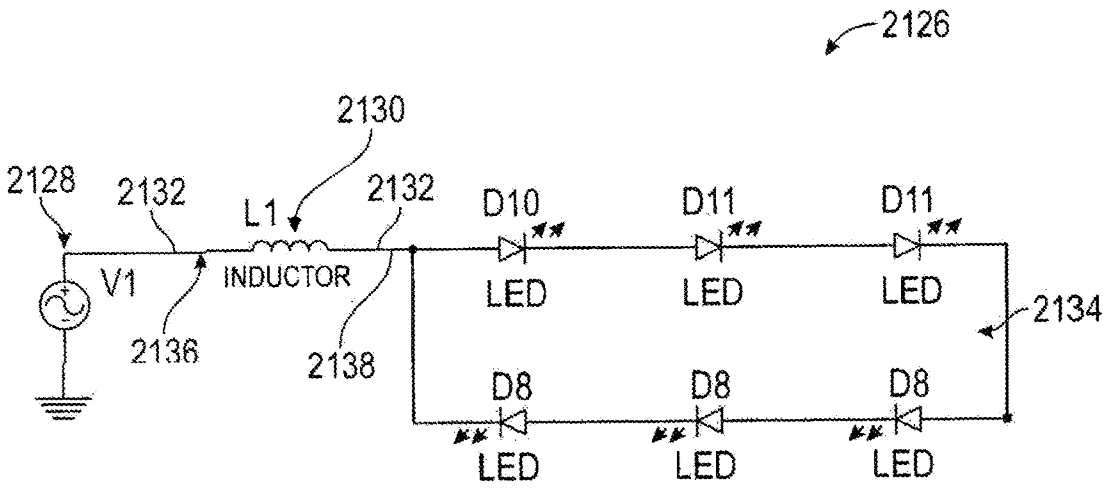
FIG. 35 shows a schematic view of a preferred embodiment of the invention.

FIG. 35 discloses a circuit 2126 to illustrate another aspect of the invention. Accordingly, an alternating electric field is provided to a transmission conductor 2132 by a signal generator 2128 that provides a first voltage level output equal to that provided by the signal generator 2128. A lump inductance 2130 is provided in series of the transmission conductor 2132 between the signal generator 2128 and directional circuit 2134. The lump inductance 2130 provides an increased voltage level from the relatively lower voltage on the transmission conductor 2132 at the point 2136 between the signal generator 2128 and lump inductance 2136 and a relatively higher voltage level on the transmission conductor 2132 at the point 2138 between the lump inductance 2130 and the directional circuit 2134 thereby providing an increase in current flow within the directional circuit 2134 or electromagnetic field energy radiating from the circuit 2126. The amount of current flow within the directional circuits described herein and electromagnetic field energy external of the directional circuits described herein is dependent on the frequency of an AC signal provided to the transmission conductor 2132 (or any of which are described herein). In preferred embodiments, the circuits disclosed in FIGS. 22-35 may be connected to ground through capacitance. This ground connection seems to provide increased circulation current, as it is noted that the LEDs get brighter for a given alternating electromagnetic source.

Figure 36:
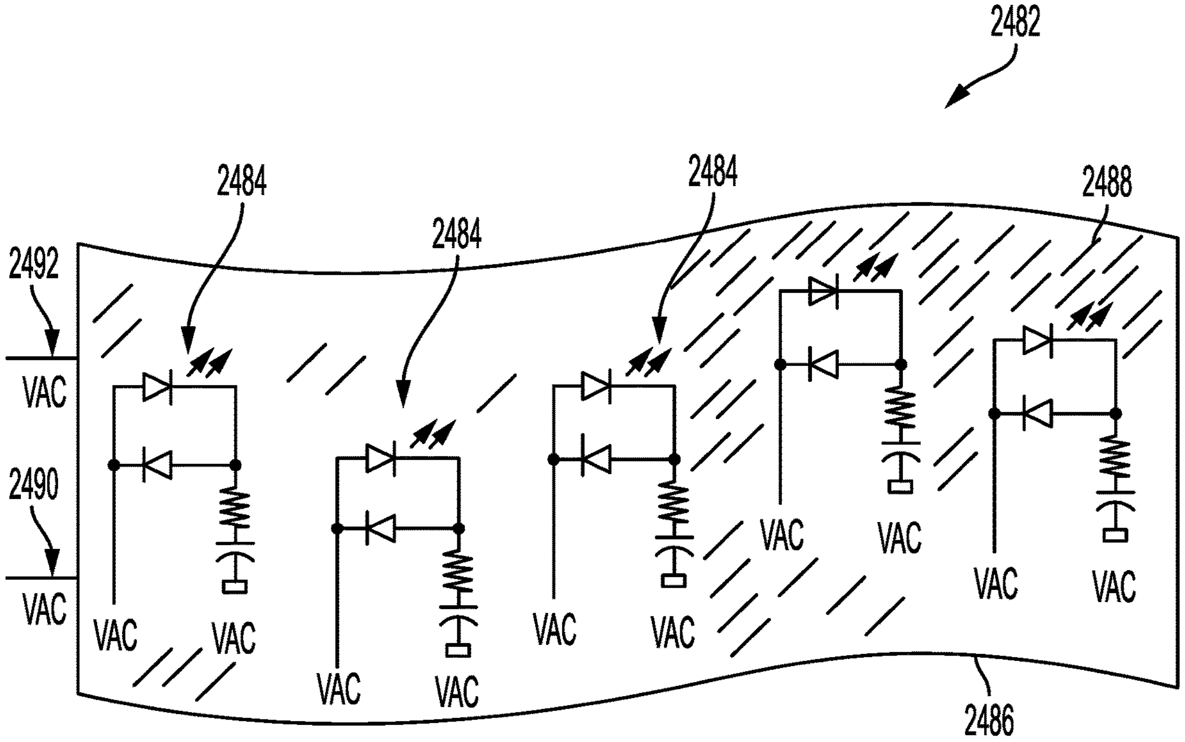
FIG. 36 shows a schematic view of a preferred embodiment of the invention.

FIG. 36 shows a device 2482 comprising individual light emitting diode circuits 2484 on a flexible printed circuit board having a mirror like reflective material or coating 2488 designed into or on the flexible printed circuit board in an area at least near the light emitting diodes for providing more efficient light output from the circuit board areas surrounding the light emitting diodes by having the flexible printed circuit board reflect light rather than absorb it. Power connection points 2490 and 2492 are provided to the board.

Figure 37:
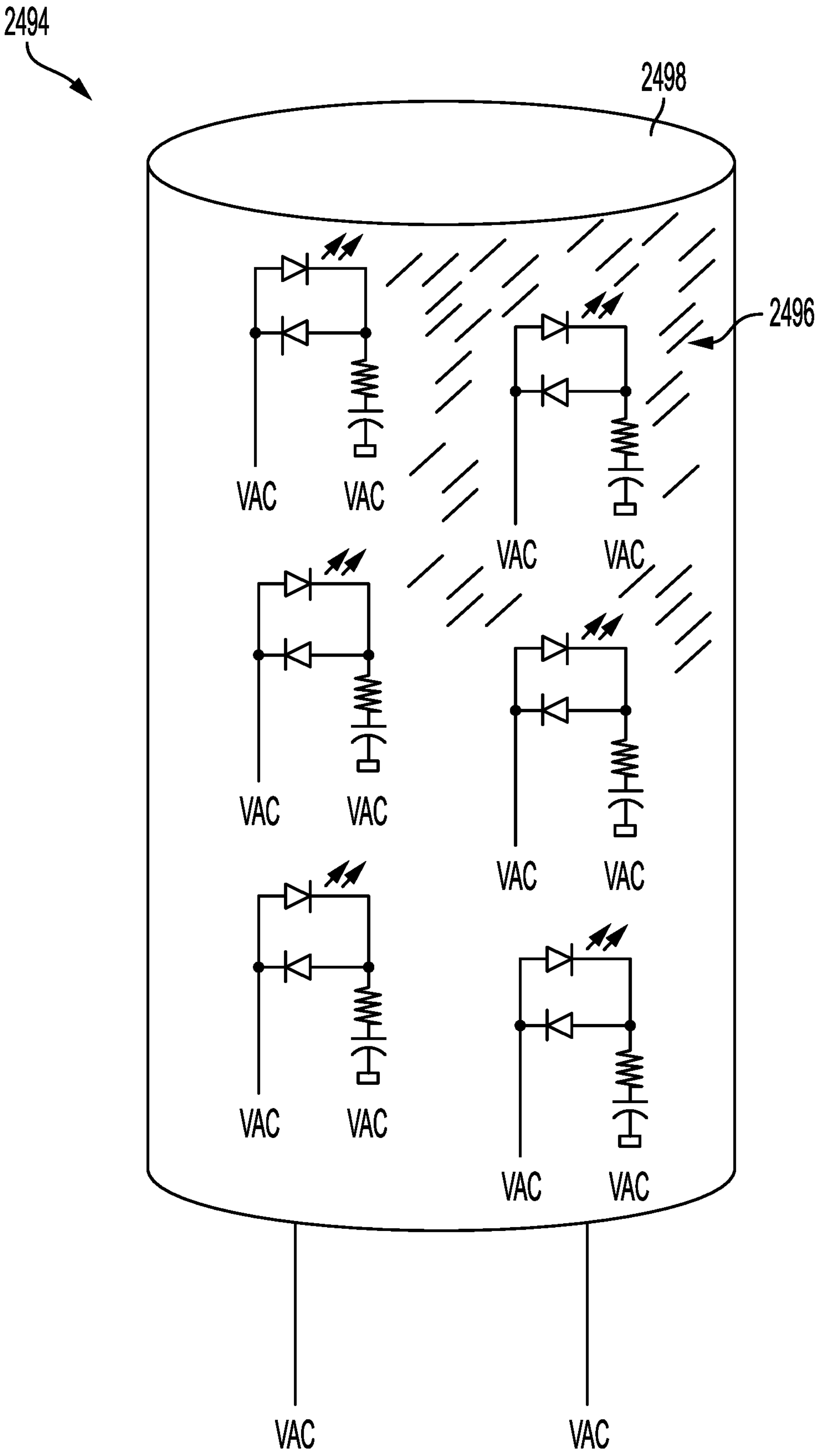
FIG. 37 shows a schematic view of a preferred embodiment of the invention.

FIG. 37 shows a device 2494 comprising a device 2496 identical to the device shown in FIG. 36 adhered to a device 2498 having a cylindrical shape for providing improved uniformity and increased angle of light output from device 2496.

The above-described embodiments of the present invention are intended to be examples only. Alterations, modifications and variations may be effected to the particular embodiments by those of ordinary skill in the art without departing from the scope of the invention, which is defined by the claims appended hereto.

Figure 38:
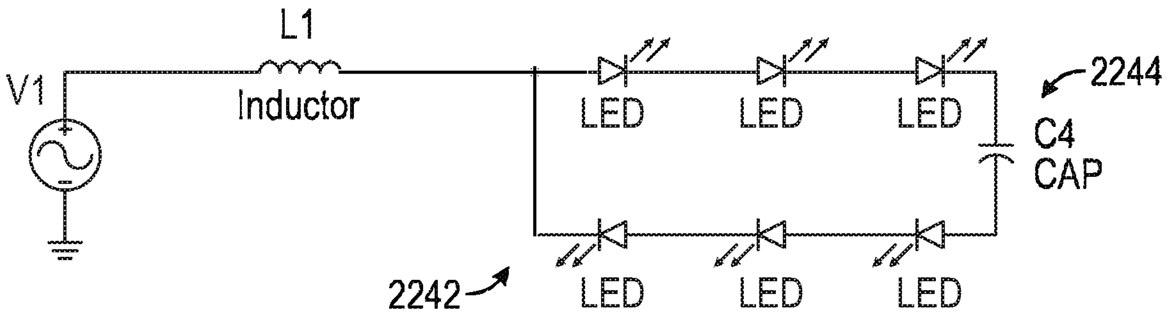
FIG. 38 shows a schematic view of a preferred embodiment of the invention.

FIG. 38 discloses a circuit 2242 identical to circuit 126 (e.g. FIG. 35) but that the circuit has a capacitance added in series within the directional circuit thereby adding to the inherent capacitance of the directional circuit. Another aspect of the invention is to have the added capacitance 2244 adjustable so that the directional circuit 2242 is tuned to resonance by adjusting the capacitance 2244.

Figure 39:
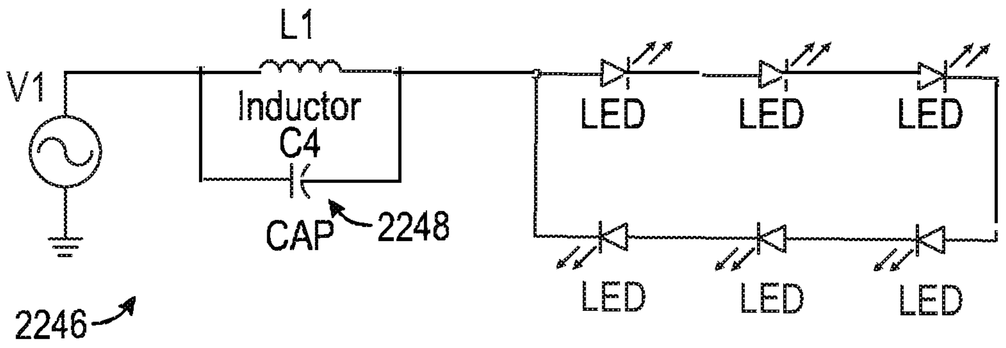
FIG. 39 shows a schematic view of a preferred embodiment of the invention.

FIG. 39 discloses a circuit 2246 identical to circuit 2126 (e.g. FIG. 35) but that the circuit has a capacitance 2248 added in parallel to the inductor 2130 thereby adding to the inherent capacitance of the transmission conductor and inductor 2130. Another aspect of the invention is to have the added capacitance 2248 adjustable so that the directional circuit 2242 is tuned to resonance by adjusting the capacitance 2244.

Figure 40:
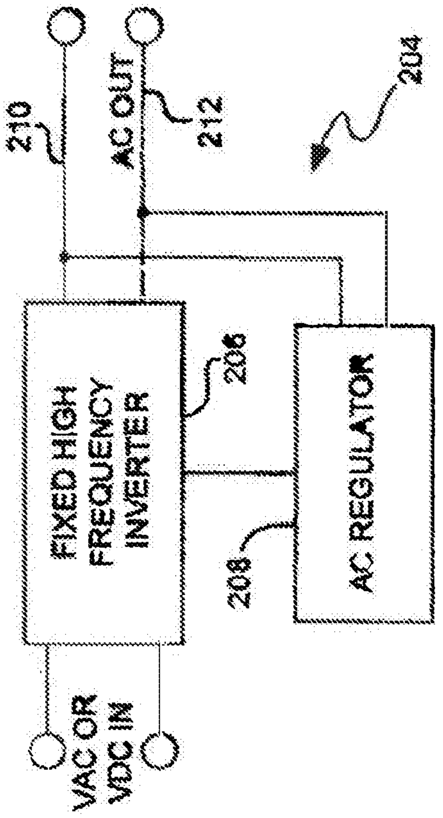
FIG. 40 shows a schematic view of a preferred embodiment of the invention.

FIG. 40 shows a block diagram of an LED circuit driver 204 having a high frequency inverter 206 stage that provides a relatively constant voltage and relatively constant frequency output. The high frequency inverter 206 stage has an internal dual half bridge driver with an internal or external voltage controlled oscillator that can be set to a voltage that fixes the frequency. A resistor or center tapped series resistor diode network within the high frequency inverter 206 stage feeds back a voltage signal to the set terminal input of the oscillator. An AC regulator 208 senses changes to the load at the output lines 210 and 212 of the inverter 206 and feeds back a voltage signal to the inverter 208 in response changes in the load which makes adjustments accordingly to maintain a relatively constant voltage output with the relatively constant frequency output.

FIGS. 41A-E shows a schematic diagram of an LED circuit driver 214 having a voltage source stage 216, a fixed/adjustable frequency stage 218, an AC voltage regulator and measurement stage 220, an AC level response control stage 222, an AC regulator output control stage 224 and a driver output stage 226.

Figure 41A:
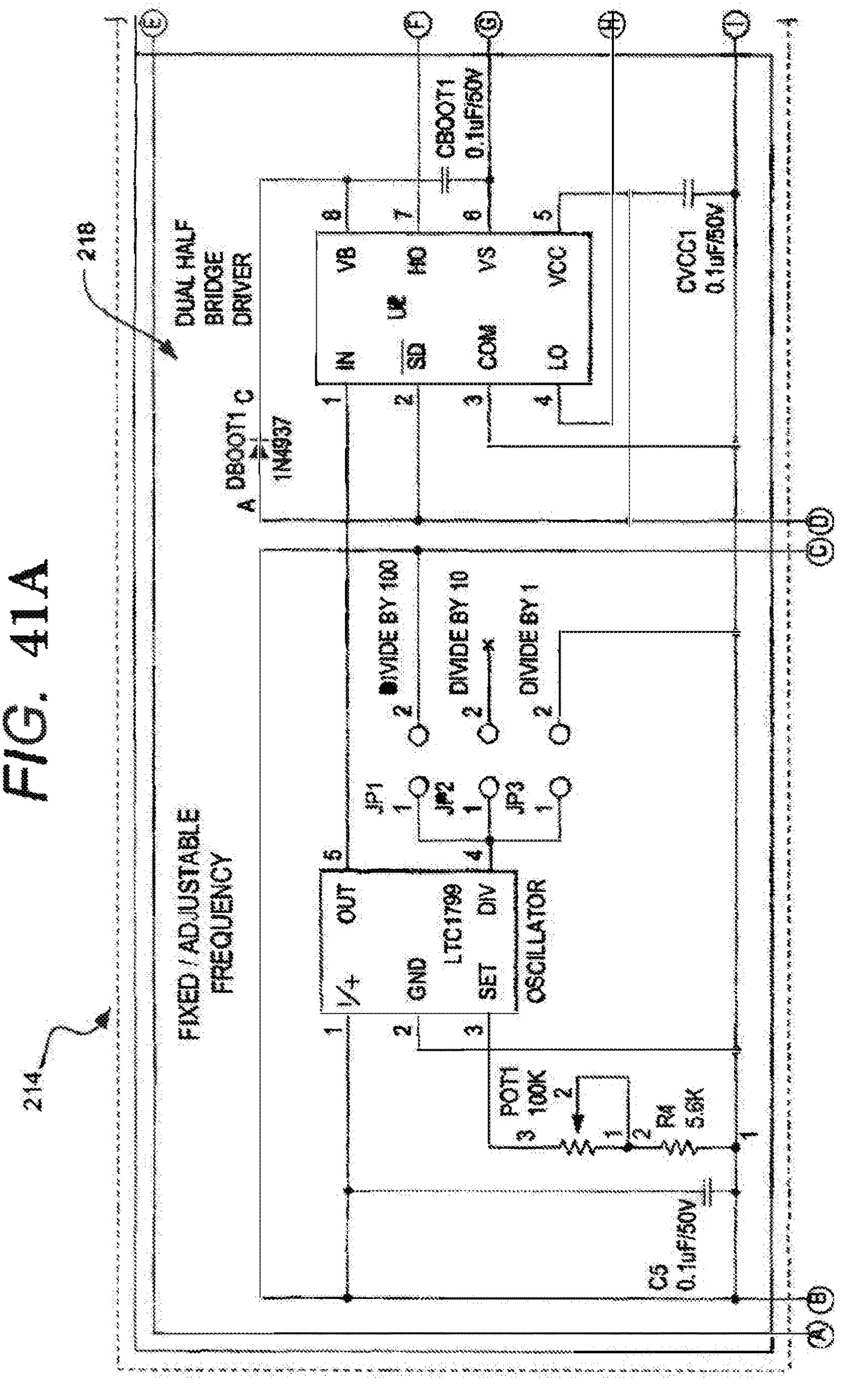
FIGS. 41A-41E show a schematic view of a preferred embodiment of the invention.
Figure 41B:
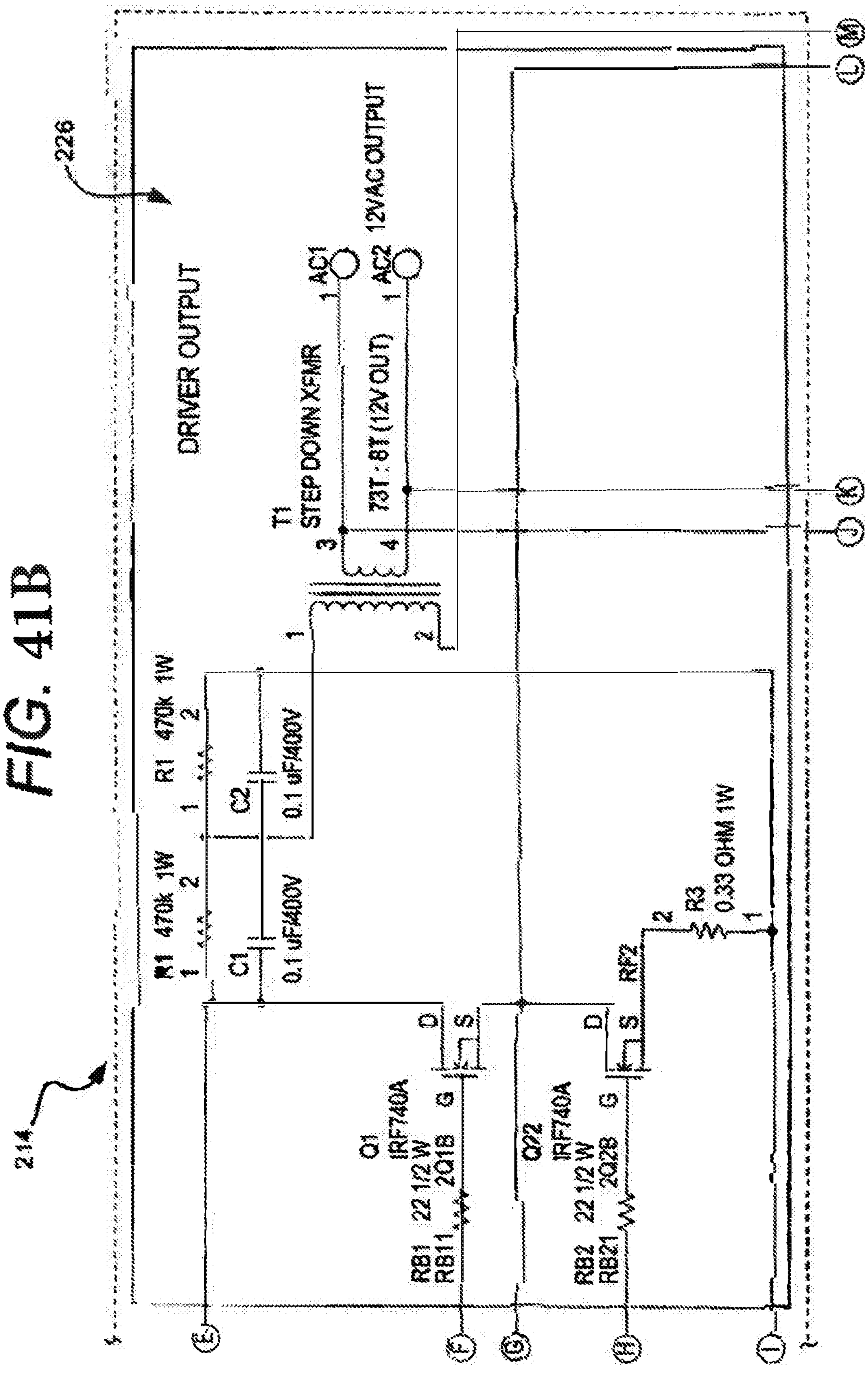
Figure 41C:
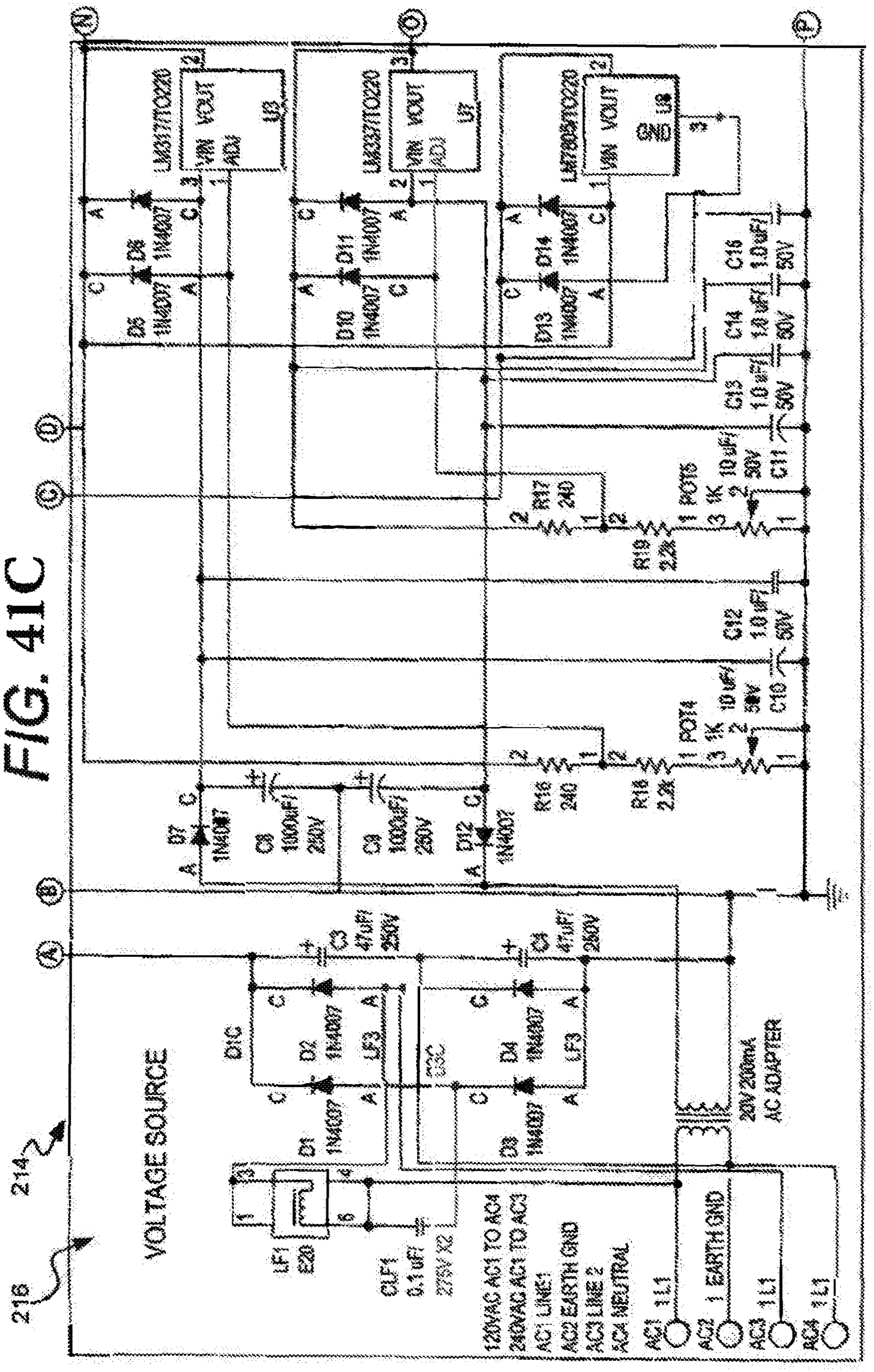
Figure 41D:
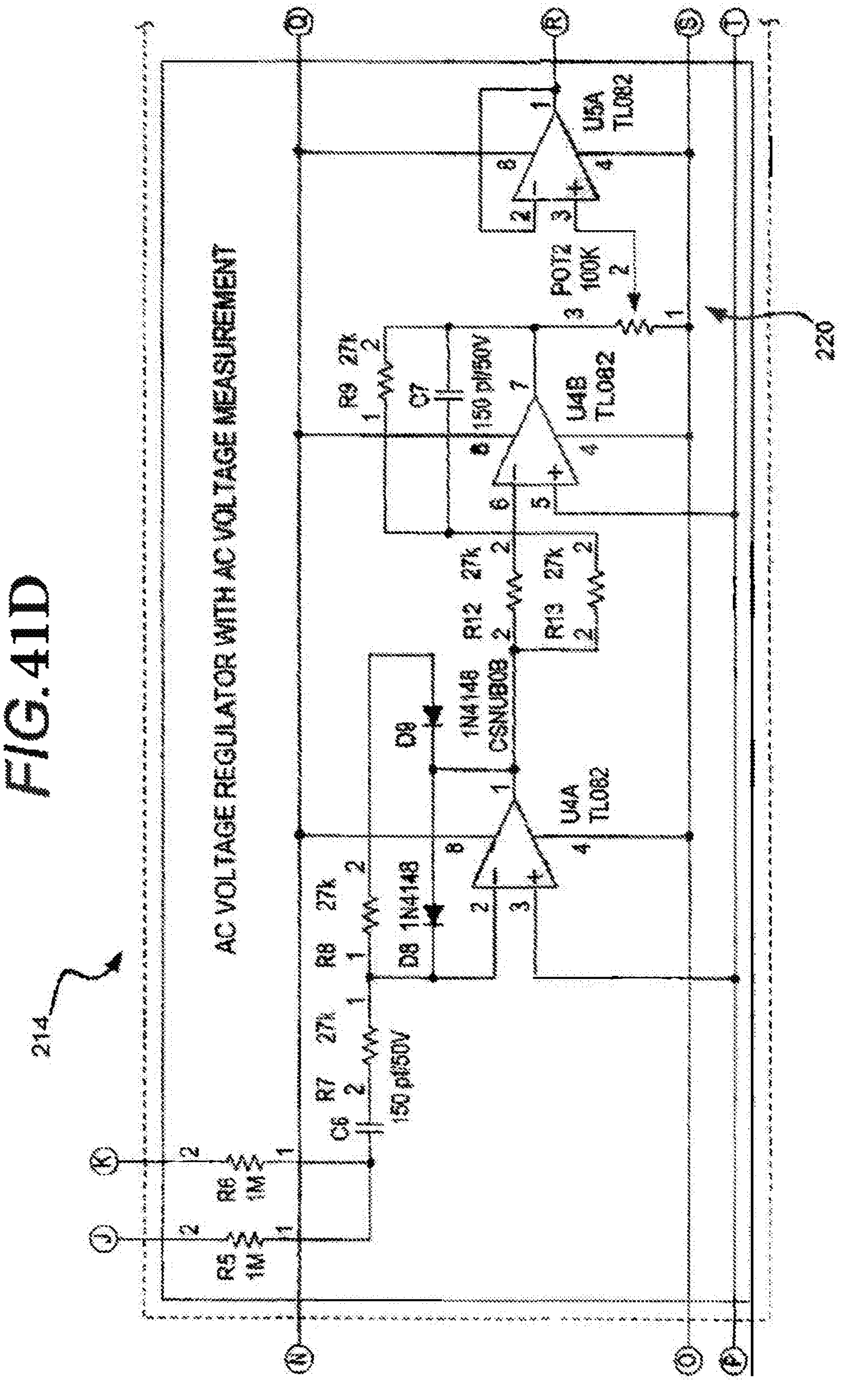
Figure 41E:
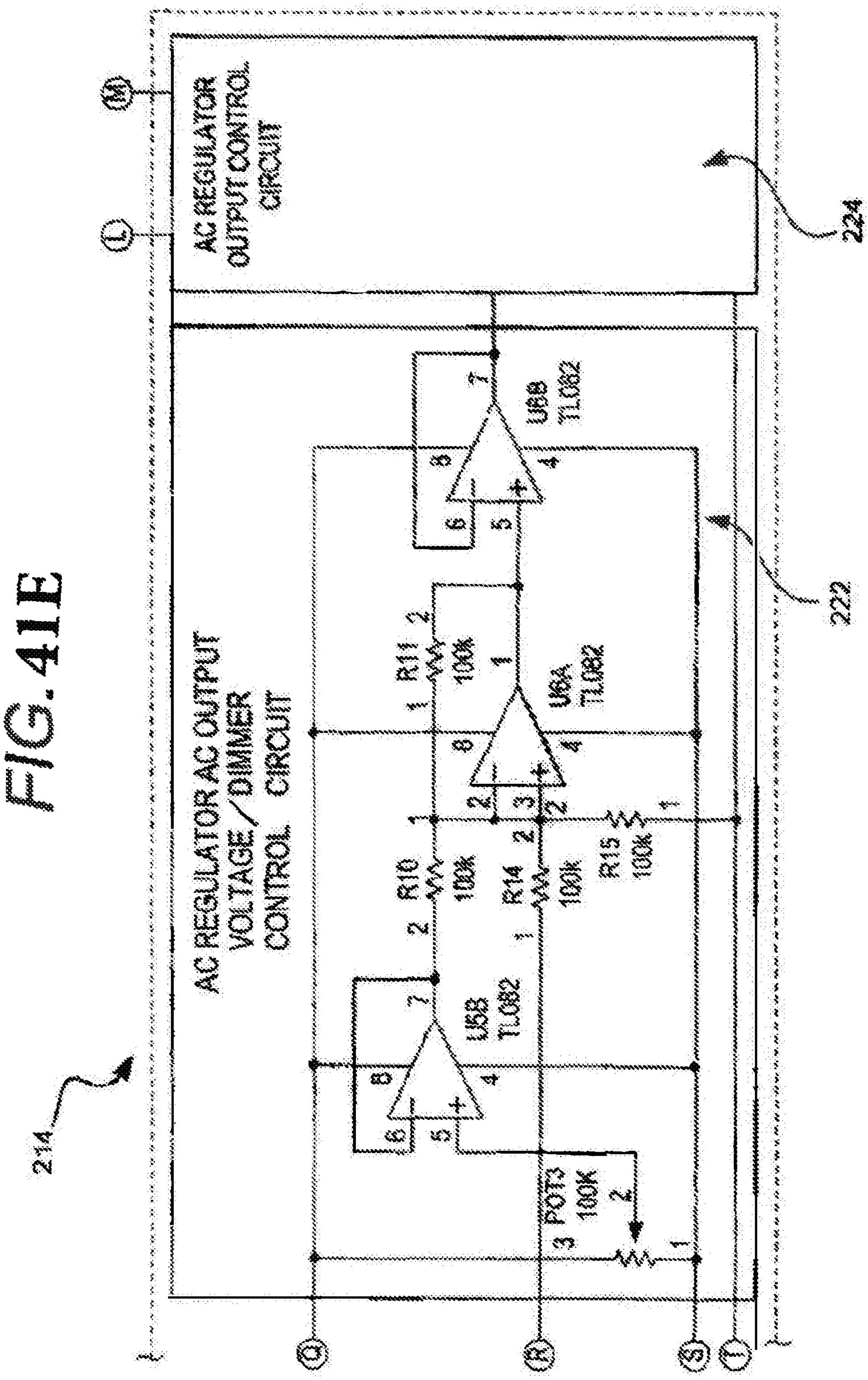
Figure 42:
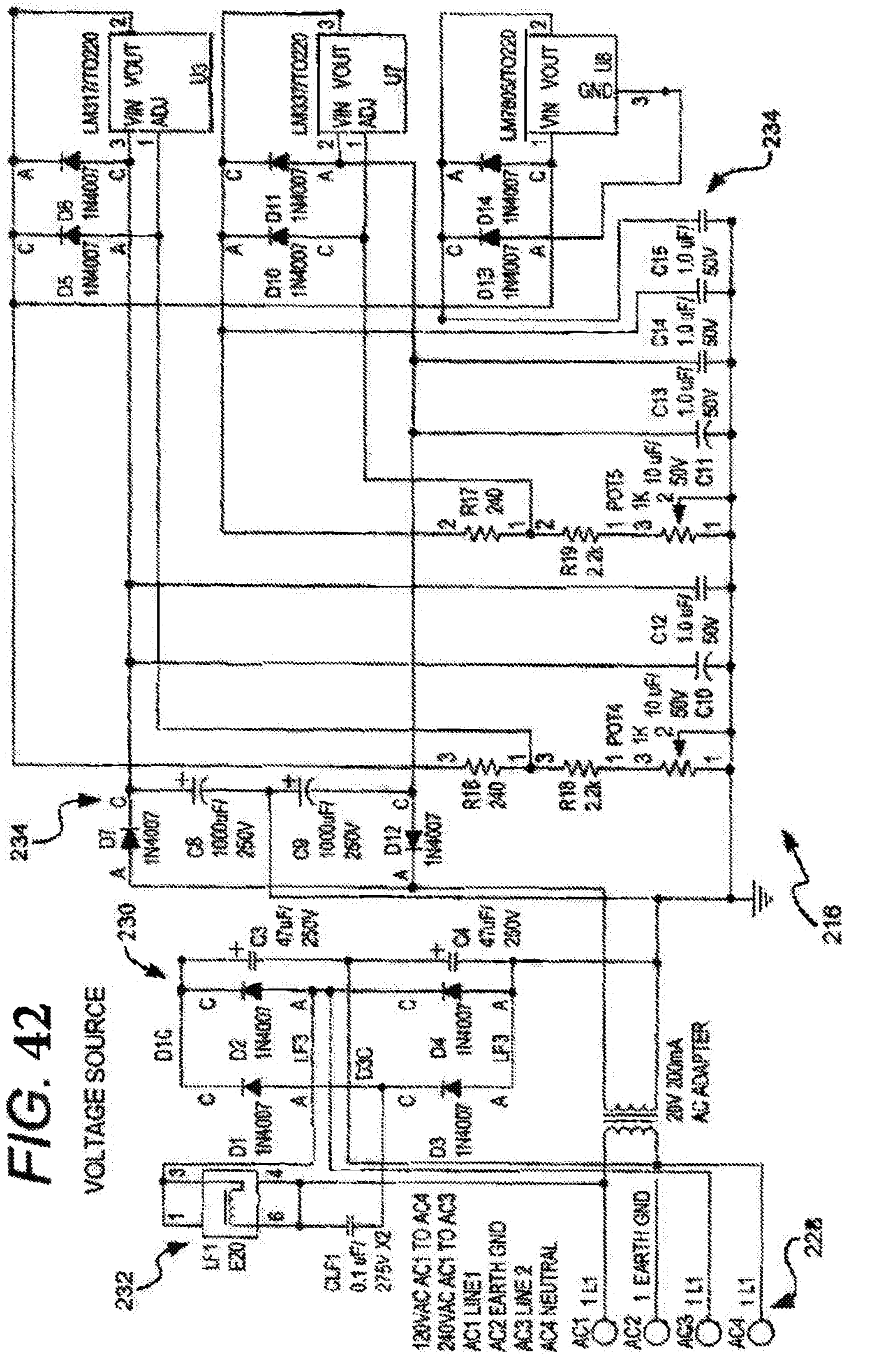
FIG. 42 shows a schematic view of a preferred embodiment of the invention.

FIG. 42 shows a schematic diagram of the voltage source stage 216 described in FIGS. 41A-E. The voltage source stage 216 provides universal AC mains inputs 228 that drive a diode bridge 230 used to deliver DC to the LED circuit driver system 214. Direct DC could eliminate the need for the universal AC input 228. Power factor correction means 232 may be integrated into the LED circuit driver 216 as part of the circuit. The voltage source stage 216 includes a low voltage source circuit 234 that may include more than one voltage and polarity.

Figure 43:
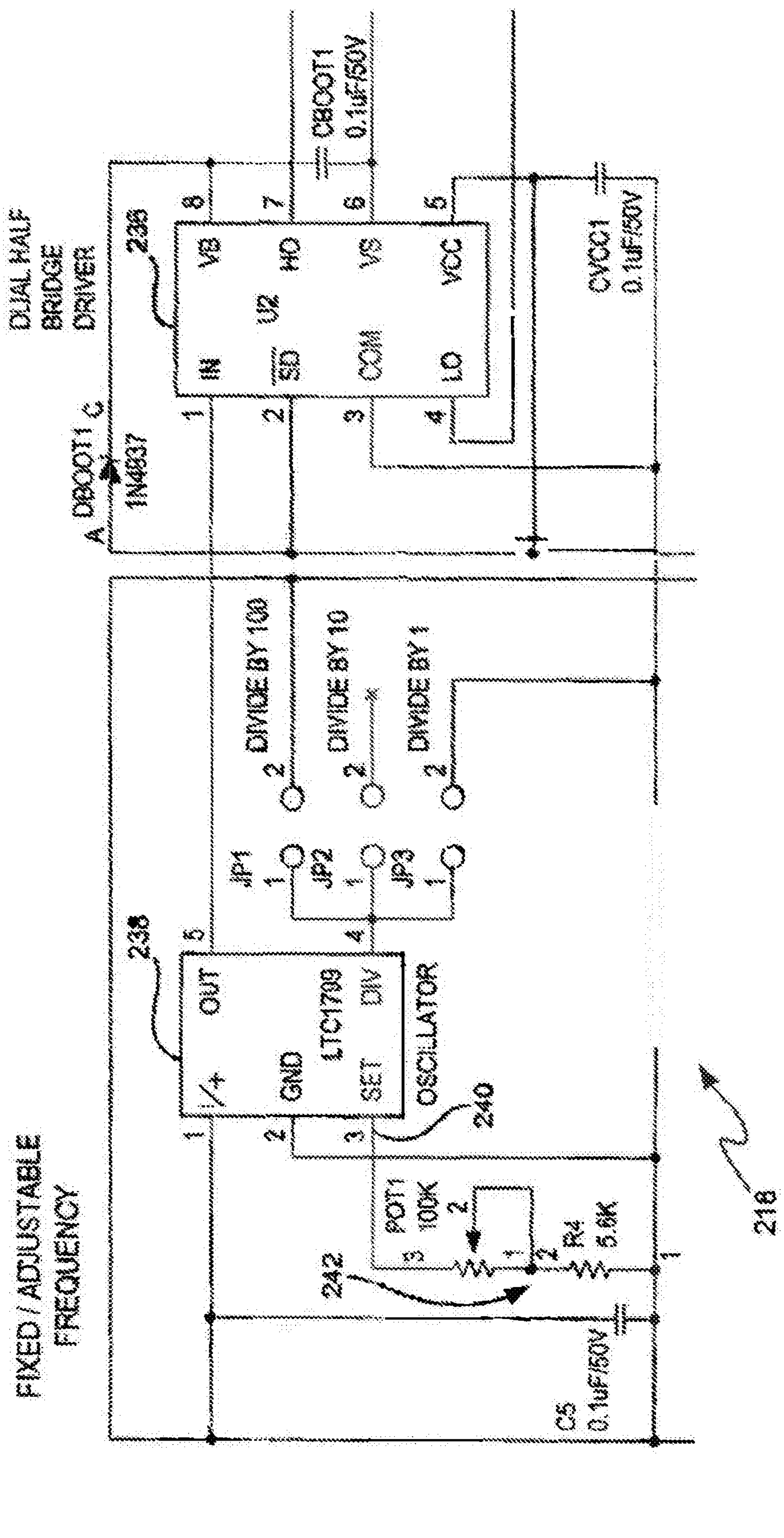
FIG. 43 shows a schematic view of a preferred embodiment of the invention.

FIG. 43 shows a schematic diagram of the fixed/adjustable frequency stage 218. The fixed/adjustable frequency stage 218 includes a bridge driver 236 that may include an integrated or external voltage controlled oscillator 238. The oscillator 23 8 has a set input pin 240 that sets the frequency of the oscillator to a fixed frequency through the use of a resistor or adjustable resistor 242 to ground. The adjustable resistor 242 allows for adjusting the fixed frequency to a different desired value through manual or digital control but keeps the frequency relatively constant based on the voltage at the set terminal 240.

Figure 44:
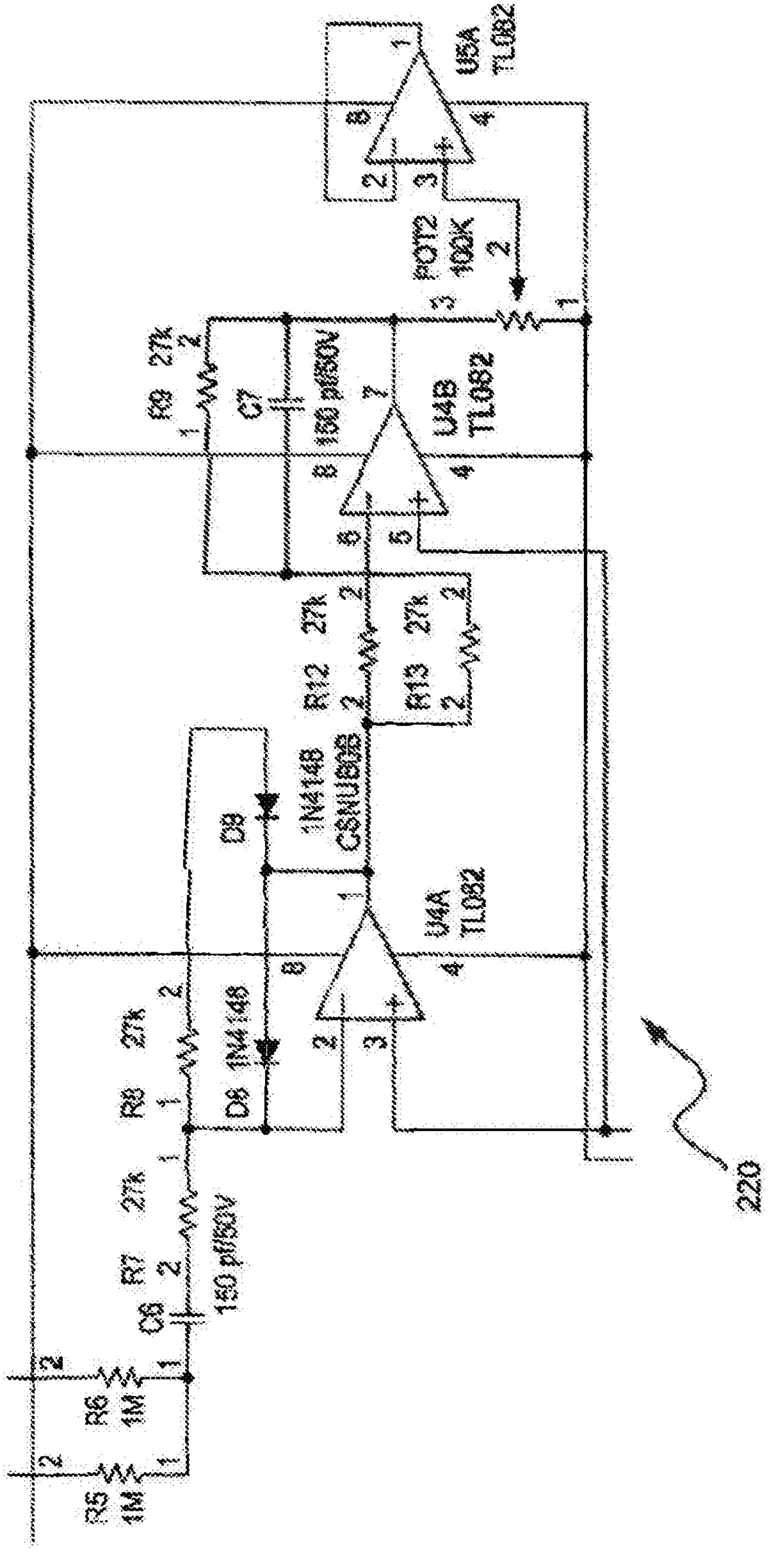
FIG. 44 shows a schematic view of a preferred embodiment of the invention.

FIG. 44 is a schematic diagram of the AC voltage regulator with voltage measurement stage 220 as described in FIG. 41D. The AC voltage regulator with voltage measurement circuit 220 monitors the voltage at the driver output 226 as shown in FIG. 41B and sends a voltage level signal to the AC level response control stage 222 as shown FIGS. 41E.

Figure 45:
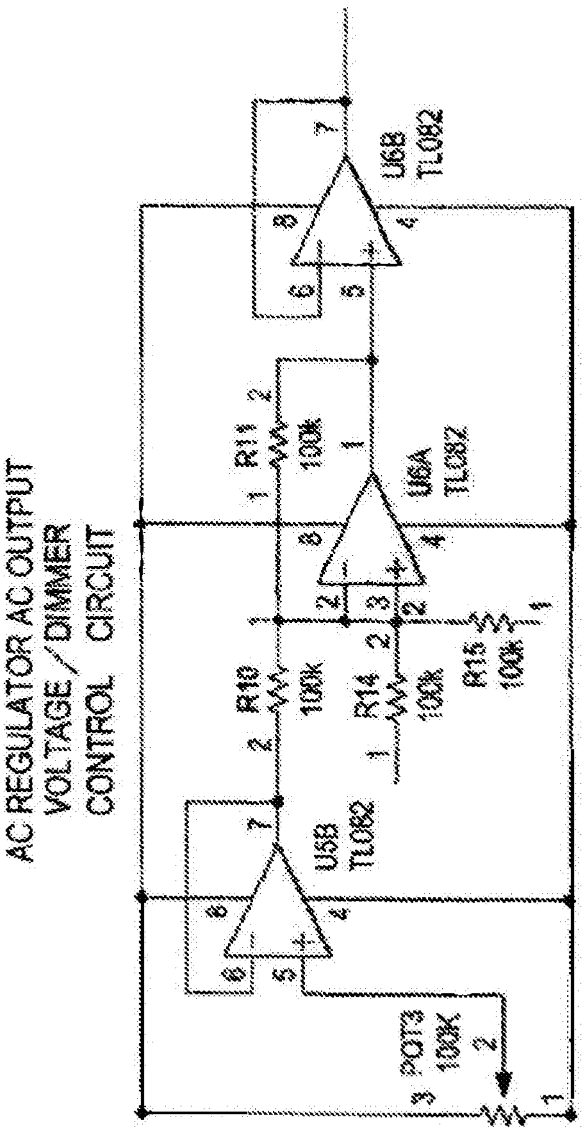
FIG. 45 shows a schematic view of a preferred embodiment of the invention.

FIG. 45 is a schematic diagram of the AC level response control 228 stage. The AC level response control stage 228 receives a voltage level signal from the AC voltage regulator with voltage measurement circuit 220 as shown in FIG. 41D and drives the AC regulator output control stage 224 as shown in FIG. 41E.

FIG. 46 is a schematic diagram of the AC regulator output control stage 230. The AC regulator output control stage 230 varies the resistance between the junction of the drive transistors 232 and the transformer input pin 234 of the driver output 226. The AC regulator output control stage 230 is a circuit or component such as but not necessarily a transistor, a voltage dependent resistor or a current dependent resistor circuit having a means of varying its resistance in response to the voltage or current delivered to it.

Figure 47:
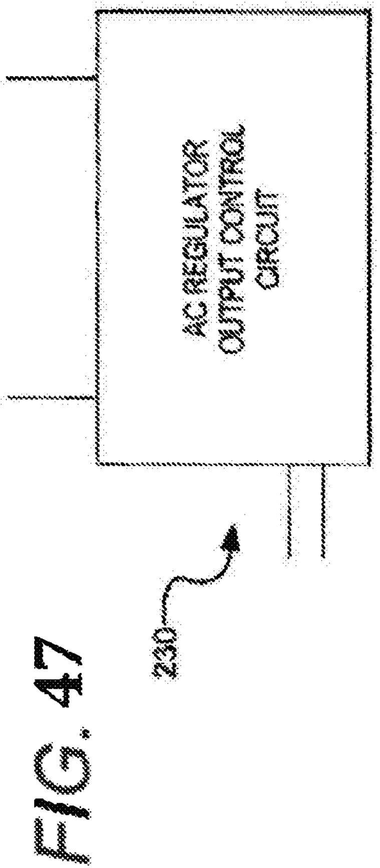
FIG. 47 shows a schematic view of a preferred embodiment of the invention.

FIG. 47 is a schematic diagram of the driver output stage 226. The driver output stage 226 includes drive transistors 232 and the transformer 236 that delivers an AC voltage output 238 to LED circuits at a relatively constant voltage and frequency.

The invention is claimed as follows:

1. An LED light bulb comprising:

a substrate including:

a plurality of more than two LED chips electrically connected in series; and power connection contacts electrically connected to respective input and output ends of the plurality of more than two LED chips that are electrically connected in series, wherein the plurality of more than two LED chips are configured to emit a first color of light;

a phosphor coated over the plurality of more than two LED chips and the substrate configured to produce a change in the first color of light emitted from the plurality of more than two LED chips, wherein the phosphor causes the first color of light emitted from the plurality of more than two LED chips to change to a second different color of light that is emitted from the phosphor and the LED light bulb; and an LED driver circuit integrated within the LED light bulb, wherein the LED driver circuit includes a bridge rectifier, a resistor, a diode, a switch, and a capacitor, wherein the LED driver circuit is configured to receive an AC voltage from a mains voltage power source and operate with the bridge rectifier to provide a DC voltage output to the plurality of more than two LED chips via the power connection contacts, and the switch is connected between the bridge rectifier and the plurality of more than two LED chips and configured to change the DC voltage output provided to the plurality of more than two LED chips through actuation of the switch to different user-selectable positions independent of a voltage level of the AC voltage.

2. The LED light bulb of claim 1, wherein the LED light bulb is configured to change brightness in response to receiving wireless data signals from at least one portable telecommunications device.

3. The LED light bulb of claim 1, wherein the DC voltage output of the LED driver circuit includes a relatively fixed voltage that is less than the AC voltage from the mains voltage power source.

4. The LED light bulb of claim 1, wherein the DC voltage output of the LED driver circuit includes a relatively fixed voltage that is greater than the AC voltage from the mains voltage power source.

5. An LED light bulb comprising:

a first substrate including:

at least two LED circuits connected in parallel, wherein each of the at least two LED circuits comprises more than two LED chips connected in series to provide at least one series parallel LED circuit on the first substrate, and power connection contacts electrically connected to respective input and output ends of the at least one series parallel LED circuit, wherein the LED chips are configured to emit a first color of light;

a phosphor coated over the LED chips configured to produce a change in the first color of light emitted from the LED chips, wherein the phosphor causes the first color of light emitted from the LED chips to change to a second different color of light that is emitted from the phosphor and the LED light bulb; and an LED driver circuit integrated within the LED light bulb, wherein the LED driver circuit includes a bridge rectifier, a resistor, a diode, a switch, and a capacitor, wherein the LED driver circuit is configured to receive an AC voltage from a mains voltage power source and operate with the bridge rectifier to provide a DC voltage output to the LED chips via the power connection contacts, and the switch is connected between the bridge rectifier and the LED chips and configured to change the DC voltage output provided to the LED chips through actuation of the switch by a user to different positions independent of a voltage level of the AC voltage.

6. The LED light bulb of claim 5, further comprising a wireless data communication circuit and an antenna configured to receive wireless data signals from at least one portable telecommunications device, wherein the LED light bulb is configured to change brightness in response to receiving the wireless data signals from the at least one portable telecommunications device.

7. The LED light bulb of claim 6, wherein the at least one portable telecommunications device includes at least one laser diode, at least one phosphor coated LED, and an LED driver, wherein the LED driver is configured to provide a pulsed DC voltage to the at least one phosphor coated LED.

8. The LED light bulb of claim 5, further comprising a second substrate similar to the first substrate, wherein the first and second substrates are electrically connected together in series.

9. The LED light bulb of claim 5, further comprising a second substrate similar to the first substrate, wherein the first and second substrates are electrically connected together in parallel.

10. An LED light bulb comprising:

at least two substrates, each of the at least two substrates including:

a plurality of more than two LED chips electrically connected in series, and power connection contacts electrically connected to respective power input and output ends of the plurality of more than two LED chips electrically connected in series on each of the at least two substrates, wherein the at least two substrates are electrically wired together via at least one of the power connection contacts, and wherein the LED chips are configured to emit a first color of light;

a phosphor coated over the LED chips configured to produce a change in the first color of light emitted from the LED chips, wherein the phosphor causes the first color of light emitted from the LED chips to change to a second different color of light that is emitted from the phosphor and the LED light bulb; and an LED driver circuit integrated within the LED light bulb, wherein the LED driver circuit includes a bridge rectifier, a resistor, a diode, a switch, and a capacitor, wherein the LED driver circuit is configured to receive an AC voltage from a mains voltage power source and operate with the bridge rectifier to provide a DC voltage output to the LED chips via the power connection contacts, and the switch connected between the bridge rectifier and the LED chips and configured to adjust the DC voltage output provided to the LED chips through actuation of the switch to different positions independent of a voltage level of the AC voltage.

11. The LED light bulb of claim 10, wherein the at least two substrates each includes a mirror like reflective material or coating.

12. The LED light bulb of claim 10, further comprising a wireless data communication circuit and an antenna configured to receive wireless data signals from at least one portable telecommunications device, wherein the LED light bulb is configured to change brightness in response to receiving the wireless data signals from the at least one portable telecommunications device.

13. The LED light bulb of claim 12, wherein the at least one portable telecommunications device includes at least one laser diode, at least one phosphor coated LED, and an LED driver, wherein the LED driver is configured to provide a pulsed DC voltage to the at least one phosphor coated LED.

14. The LED light bulb of claim 13, wherein the at least two substrates are configured to emit a different color of light in response to receiving the wireless data signals from the at least one portable telecommunications device.

* * * * *